United States Patent
Inui et al.

(10) Patent No.: US 12,457,040 B2
(45) Date of Patent: Oct. 28, 2025

(54) OPTICAL TRANSMISSION SYSTEM AND TRANSMISSION MODE SELECTING METHOD

(71) Applicant: NTT, Inc., Tokyo (JP)

(72) Inventors: Tetsuro Inui, Tokyo (JP); Hideki Nishizawa, Tokyo (JP); Seiji Okamoto, Tokyo (JP); Akira Hirano, Tokyo (JP); Shokei Kobayashi, Tokyo (JP); Fumikazu Inuzuka, Tokyo (JP); Seiki Kuwabara, Tokyo (JP); Takafumi Tanaka, Tokyo (JP); Kei Kitamura, Tokyo (JP); Takuya Oda, Tokyo (JP)

(73) Assignee: NTT, Inc., Tokyo (JP)

( * ) Notice: Subject to any disclaimer, the term of this patent is extended or adjusted under 35 U.S.C. 154(b) by 311 days.

(21) Appl. No.: 18/086,314

(22) Filed: Dec. 21, 2022

(65) Prior Publication Data

US 2024/0137128 A1 Apr. 25, 2024
US 2024/0235690 A9 Jul. 11, 2024

Related U.S. Application Data

(62) Division of application No. 17/264,938, filed as application No. PCT/JP2019/024152 on Jun. 18, 2019, now Pat. No. 11,546,064.

(30) Foreign Application Priority Data

Aug. 7, 2018 (JP) ................................. 2018-148920

(51) Int. Cl.
*H04B 10/07* (2013.01)
*H04B 10/077* (2013.01)
(Continued)

(52) U.S. Cl.
CPC ....... *H04B 10/516* (2013.01); *H04B 10/0779* (2013.01); *H04J 14/06* (2013.01)

(58) Field of Classification Search
CPC ... H04B 10/516; H04B 10/0779; H04J 14/06; H04L 27/18; H04L 27/34; H04L 1/0003; H04L 1/0009; H04L 1/0016
See application file for complete search history.

(56) References Cited

U.S. PATENT DOCUMENTS

| 7,583,609 B2 * | 9/2009 | Catreux | ................ | H04L 1/0016 370/465 |
| 10,637,570 B1 | 4/2020 | Brinkley et al. | | |

(Continued)

FOREIGN PATENT DOCUMENTS

| EP | 3206311 | 8/2017 |
| JP | 2011-250291 | 12/2011 |

(Continued)

*Primary Examiner* — Tanya T Motsinger
(74) *Attorney, Agent, or Firm* — Fish & Richardson P.C.

(57) ABSTRACT

An optical transmission system including an optical transmission device and an optical reception device that receives, via an optical transmission line, a signal transmitted from the optical transmission device, the optical transmission system including a transmission-mode selection unit that selects transmission mode information in descending order of priority out of transmission mode information, which is combinations of a plurality of parameters concerning transmission performance, the transmission mode information being a plurality of kinds of the transmission mode information common to the transmission performance of the optical transmission device and the optical reception device, a signal transmission unit that transmits, to the optical reception device, a signal modulated based on the selected transmission mode information, and a signal reception unit that (Continued)

receives the signal and modulates the received signal based on the transmission mode information selected by the transmission-mode selection unit.

2 Claims, 27 Drawing Sheets

(51) Int. Cl.
*H04B 10/516* (2013.01)
*H04J 14/06* (2006.01)

(56) References Cited

U.S. PATENT DOCUMENTS

| | | | |
|---|---|---|---|
| 11,212,793 B2 | 12/2021 | Shahid et al. | |
| 11,217,077 B2 | 1/2022 | Shakedd et al. | |
| 11,218,588 B2 | 1/2022 | Horsley | |
| 11,546,064 B2* | 1/2023 | Inui | H04L 1/0016 |
| 2003/0099014 A1 | 5/2003 | Egner et al. | |
| 2006/0270427 A1* | 11/2006 | Shida | H04L 1/0001 |
| | | | 455/512 |
| 2008/0225983 A1* | 9/2008 | Lee | H04B 7/0697 |
| | | | 375/299 |
| 2009/0002235 A1* | 1/2009 | Ito | H04B 7/0615 |
| | | | 342/368 |
| 2009/0196602 A1 | 8/2009 | Saunders et al. | |
| 2010/0020858 A1* | 1/2010 | Suwada | H04L 25/4917 |
| | | | 375/295 |
| 2010/0262664 A1 | 10/2010 | Brown et al. | |
| 2011/0170450 A1 | 7/2011 | Juntti et al. | |
| 2011/0185262 A1* | 7/2011 | Kershaw | H04B 17/336 |
| | | | 714/776 |
| 2011/0255870 A1 | 10/2011 | Grigoryan et al. | |
| 2011/0293266 A1* | 12/2011 | Aoki | H04B 10/5161 |
| | | | 398/25 |
| 2012/0230694 A1 | 9/2012 | Tanaka et al. | |
| 2015/0043364 A1 | 2/2015 | Kahng et al. | |
| 2015/0071640 A1 | 3/2015 | Batshon et al. | |
| 2015/0280892 A1 | 10/2015 | Verbin et al. | |
| 2016/0094305 A1 | 3/2016 | Yamashita et al. | |
| 2016/0191189 A1* | 6/2016 | Mitchell | H04Q 11/0005 |
| | | | 398/48 |
| 2016/0192042 A1 | 6/2016 | Mitchell | |
| 2016/0356152 A1 | 12/2016 | Croux et al. | |
| 2017/0134089 A1 | 5/2017 | Rad et al. | |
| 2018/0034618 A1 | 2/2018 | Rawi et al. | |
| 2018/0302154 A1 | 10/2018 | Ferreira et al. | |
| 2019/0036608 A1 | 1/2019 | Leigh et al. | |
| 2019/0097720 A1 | 3/2019 | Kim et al. | |
| 2019/0097747 A1 | 3/2019 | Kim et al. | |
| 2019/0166009 A1 | 5/2019 | Parvin et al. | |
| 2019/0356378 A1 | 11/2019 | Takeda et al. | |
| 2020/0067624 A1 | 2/2020 | Tsuzuki | |
| 2020/0145995 A1 | 5/2020 | Shahid et al. | |
| 2021/0111959 A1 | 4/2021 | Shahriar et al. | |
| 2021/0258893 A1 | 8/2021 | Zhang et al. | |
| 2021/0314067 A1* | 10/2021 | Inui | H04L 1/0016 |
| 2021/0314120 A1* | 10/2021 | Nammi | H04L 5/0023 |
| 2021/0320856 A1 | 10/2021 | Castaldelli et al. | |
| 2021/0328693 A1 | 10/2021 | Difranco | |
| 2022/0006490 A1 | 1/2022 | Barois et al. | |
| 2022/0006491 A1 | 1/2022 | Barois et al. | |
| 2022/0007237 A1 | 1/2022 | Huang et al. | |
| 2022/0007341 A1 | 1/2022 | Matthews et al. | |
| 2022/0012810 A1 | 1/2022 | Brandnnaier et al. | |
| 2022/0014338 A1 | 1/2022 | Yoshioka et al. | |
| 2024/0357008 A1* | 10/2024 | Mano | H04B 10/80 |

FOREIGN PATENT DOCUMENTS

| | | |
|---|---|---|
| JP | 2012-191452 | 10/2012 |
| JP | 5753604 | 7/2015 |
| JP | 2015-188165 | 10/2015 |
| JP | 2016-072834 | 5/2016 |
| JP | 2018-078377 | 5/2018 |
| WO | WO 2007/128186 A1 | 11/2007 |

\* cited by examiner

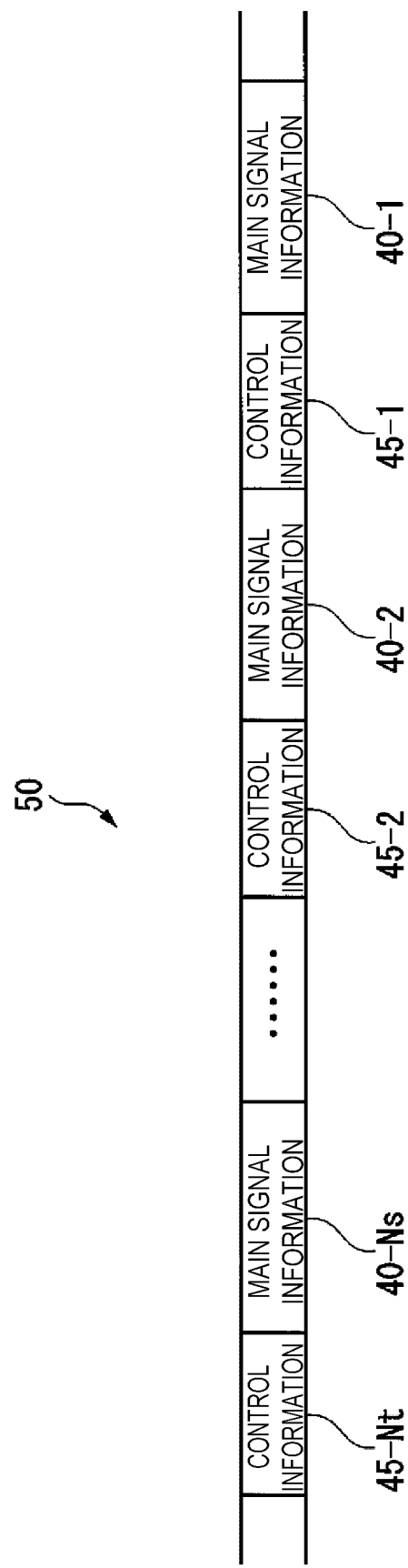

| TRANSMISSION MODE | MODULATION SCHEME | BAUD RATE | ERROR CORRECTION CODE TYPE | TRANSMISSION CAPACITY |
|---|---|---|---|---|
| MODE 1 | BPSK | 32GBaud | RS+LDPC | TRANSMISSION CAPACITY 50G |
| MODE 2 | BPSK | 32GBaud | BCH+LDPC | TRANSMISSION CAPACITY 50G |
| MODE 3 | BPSK | 64GBaud | RS+LDPC | TRANSMISSION CAPACITY 100G |
| MODE 4 | BPSK | 64GBaud | BCH+LDPC | TRANSMISSION CAPACITY 100G |
| MODE 5 | QPSK | 32GBaud | RS+LDPC | TRANSMISSION CAPACITY 100G |
| MODE 6 | QPSK | 32GBaud | BCH+LDPC | TRANSMISSION CAPACITY 100G |
| MODE 7 | QPSK | 64GBaud | RS+LDPC | TRANSMISSION CAPACITY 200G |
| MODE 8 | QPSK | 64GBaud | BCH+LDPC | TRANSMISSION CAPACITY 200G |
| MODE 9 | 8QAM | 32GBaud | RS+LDPC | TRANSMISSION CAPACITY 150G |
| MODE 10 | 8QAM | 32GBaud | BCH+LDPC | TRANSMISSION CAPACITY 150G |
| MODE 11 | 8QAM | 64GBaud | RS+LDPC | TRANSMISSION CAPACITY 300G |
| MODE 12 | 8QAM | 64GBaud | BCH+LDPC | TRANSMISSION CAPACITY 300G |
| MODE 13 | 16QAM | 32GBaud | RS+LDPC | TRANSMISSION CAPACITY 200G |
| MODE 14 | 16QAM | 32GBaud | BCH+LDPC | TRANSMISSION CAPACITY 200G |
| MODE 15 | 16QAM | 64GBaud | RS+LDPC | TRANSMISSION CAPACITY 400G |
| MODE 16 | 16QAM | 64GBaud | BCH+LDPC | TRANSMISSION CAPACITY 400G |
| MODE 17 | 32QAM | 32GBaud | RS+LDPC | TRANSMISSION CAPACITY 250G |
| MODE 18 | 32QAM | 32GBaud | BCH+LDPC | TRANSMISSION CAPACITY 250G |
| MODE 19 | 32QAM | 64GBaud | RS+LDPC | TRANSMISSION CAPACITY 500G |
| MODE 20 | 32QAM | 64GBaud | BCH+LDPC | TRANSMISSION CAPACITY 500G |
| MODE 21 | 64QAM | 32GBaud | RS+LDPC | TRANSMISSION CAPACITY 300G |
| MODE 22 | 64QAM | 32GBaud | BCH+LDPC | TRANSMISSION CAPACITY 300G |
| MODE 23 | 64QAM | 64GBaud | RS+LDPC | TRANSMISSION CAPACITY 600G |
| MODE 24 | 64QAM | 64GBaud | BCH+LDPC | TRANSMISSION CAPACITY 600G |

| TRANSMISSION MODE | MODULATION SCHEME | BAUD RATE | ERROR CORRECTION CODE TYPE | TRANSMISSION CAPACITY |
|---|---|---|---|---|
| MODE 1 | BPSK | 32GBaud | RS+LDPC | TRANSMISSION CAPACITY 50G |
| MODE 3 | BPSK | 64GBaud | RS+LDPC | TRANSMISSION CAPACITY 100G |
| MODE 5 | QPSK | 32GBaud | RS+LDPC | TRANSMISSION CAPACITY 100G |
| MODE 7 | QPSK | 64GBaud | RS+LDPC | TRANSMISSION CAPACITY 200G |
| MODE 9 | 8QAM | 32GBaud | RS+LDPC | TRANSMISSION CAPACITY 150G |
| MODE 11 | 8QAM | 64GBaud | RS+LDPC | TRANSMISSION CAPACITY 300G |
| MODE 13 | 16QAM | 32GBaud | RS+LDPC | TRANSMISSION CAPACITY 200G |
| MODE 15 | 16QAM | 64GBaud | RS+LDPC | TRANSMISSION CAPACITY 400G |
| MODE 17 | 32QAM | 32GBaud | RS+LDPC | TRANSMISSION CAPACITY 250G |
| MODE 19 | 32QAM | 64GBaud | RS+LDPC | TRANSMISSION CAPACITY 500G |
| MODE 21 | 64QAM | 32GBaud | RS+LDPC | TRANSMISSION CAPACITY 300G |
| MODE 23 | 64QAM | 64GBaud | RS+LDPC | TRANSMISSION CAPACITY 600G |

| TRANSMISSION MODE | MODULATION SCHEME | BAUD RATE | ERROR CORRECTION CODE TYPE | TRANSMISSION CAPACITY |
|---|---|---|---|---|
| MODE 1 | BPSK | 32GBaud | RS+LDPC | TRANSMISSION CAPACITY 50G |
| MODE 5 | QPSK | 32GBaud | RS+LDPC | TRANSMISSION CAPACITY 100G |
| MODE 9 | 8QAM | 32GBaud | RS+LDPC | TRANSMISSION CAPACITY 150G |
| MODE 13 | 16QAM | 32GBaud | RS+LDPC | TRANSMISSION CAPACITY 200G |

OPTICAL TRANSMISSION SYSTEM AND TRANSMISSION MODE SELECTING METHOD

CROSS-REFERENCE TO RELATED APPLICATIONS

This application is a divisional application of U.S. National Stage application Ser. No. 17/264,938, filed Feb. 1, 2021, which claims priority to International Application No. PCT/JP2019/024152, having an International Filing Date of Jun. 18, 2019, which claims priority to Japanese Application Serial No. 2018-148920, filed on Aug. 7, 2018. The disclosure of the prior applications are considered part of the disclosure of this application, and are incorporated in their entirety into this application.

TECHNICAL FIELD

The present invention relates to an optical transmission system and an optical transmission mode selecting method.

This application claims priority based on Japanese Patent Application No. 2018-148920 filed on Aug. 7, 2018 in Japan, the content of which is incorporated herein.

BACKGROUND ART

Along with the improvement of functions of digital signal processing (hereinafter referred to as "DSP") for optical transmission, in addition to modulation schemes, various parameters concerning transmission performance such as baud rates, types of error correction codes such as FEC (Forward Error Correction), and the number of carriers have increased, and transmission modes have been diversified. For example, Patent Literature 1 discloses a method of selecting an optimum modulation scheme based on a training signal.

CITATION LIST

Patent Literature

Patent Literature 1: Japanese Patent No. 5753604

SUMMARY OF THE INVENTION

Technical Problem

However, the technique described in Patent Literature 1 has a problem in that an optimum transmission mode cannot be selected in terms of, other than the modulation scheme, the various parameters concerning the transmission performance such as the baud rates, the types of the error correction codes, and the number of carriers.

In view of the circumstances, an object of the present invention is to provide a technique that can select an optimum transmission mode out of transmission modes decided according to combinations of a plurality of parameters concerning transmission performance.

Means for Solving the Problem

An aspect of the present invention is an optical transmission system including an optical transmission device and an optical reception device that receives, via an optical transmission line, a signal transmitted from the optical transmission device, the optical transmission system including: a transmission-mode selection unit that selects transmission mode information in descending order of priority out of transmission mode information, which is combinations of a plurality of parameters concerning transmission performance, the transmission mode information being a plurality of kinds of the transmission mode information common to the transmission performance of the optical transmission device and the optical reception device; a signal transmission unit that transmits, to the optical reception device, a signal modulated based on the selected transmission mode information; and a signal reception unit that receives the signal and modulates the received signal based on the transmission mode information selected by the transmission-mode selection unit.

In the optical transmission system in the aspect of the present invention, the optical transmission system further includes: a signal-quality detection unit that detects signal quality of the received signal; and a signal-quality determination unit that determines, based on information indicating the signal quality detected by the signal-quality detection unit, whether the signal quality of the signal is permissible, and, when the signal-quality determination unit determines that the signal quality of the signal is non-permissible, the transmission-mode selection unit selects the transmission mode information having second highest priority.

In the optical transmission system in the aspect of the invention, the optical transmission device includes: a transmission-mode-candidate transmission unit that transmits, to the optical reception device, transmission-side transmission mode candidate information including the transmission mode information of the own device; a transmission-mode-candidate reception unit that receives, from the optical reception device, reception-side transmission mode candidate information including the transmission mode information of the optical reception device; and the transmission-mode selection unit, and the optical reception device includes: a transmission-mode-candidate reception unit that receives the transmission-side transmission mode candidate information from the optical transmission device; a transmission-mode-candidate transmission unit that transmits the reception-side transmission mode candidate information to the optical transmission device when the transmission-mode-candidate reception unit receives the transmission-side transmission mode candidate information; and the transmission-mode selection unit.

In the optical transmission system in the aspect of the present invention, the transmission-mode-candidate transmission unit of the optical transmission device superimposes the transmission-side transmission mode candidate information on a pilot tone signal, which is a signal sequence in which electric power concentrates on one or more specific frequencies, and causes the signal transmission unit to transmit the transmission-side transmission mode candidate information, and the transmission-mode-candidate reception unit of the optical reception device receives the transmission-side transmission mode candidate information superimposed on the pilot tone signal received by the signal reception unit.

In the optical transmission system in the aspect of the present invention, the transmission-mode-candidate transmission unit of the optical transmission device writes the transmission-side transmission mode candidate information in a reservation field of a signal frame of a main signal included in the signal and causes the signal transmission unit to transmit the transmission-side transmission mode candidate information, and the transmission-mode-candidate reception unit of the optical reception device reads the transmission-side transmission mode candidate information included in the reservation field of the signal frame of the main signal.

In the optical transmission system in the aspect of the present invention, the optical transmission system further includes a control device, the control device includes the transmission-mode selection unit, when selecting the transmission mode information, the transmission-mode selection unit generates a transmission mode designation signal for designating the selected transmission mode information and transmits the generated transmission mode designation signal to the optical transmission device and the optical reception device, and the optical transmission device and the optical reception device operate in a transmission mode corresponding to the transmission mode designation signal transmitted from the transmission-mode selection unit.

In the optical transmission system in the aspect of the present invention, the optical transmission system further includes a management device, the management device includes: a transmission-design-information storage unit that stores information concerning physical characteristic parameters of various modules included in the optical transmission line and the optical transmission device and the optical reception device and the transmission mode information of the optical transmission device and the optical reception device; and a transmission-design processing unit that calculates, for each of the transmission mode information, transmission quality based on the physical characteristic parameters, generates a transmission mode candidate list including a plurality of kinds of transmission mode information selected based on the calculated transmission quality, and transmits the generated transmission mode candidate list to the control device, and the transmission-mode selection unit of the control device selects the transmission mode information in descending order of priority out of the received transmission mode candidate list.

An aspect of the present invention is a transmission mode selecting method in an optical transmission system including an optical transmission device and an optical reception device that receives, via an optical transmission line, a signal transmitted from the optical transmission device, the transmission mode selecting method including: selecting transmission mode information in descending order of priority out of transmission mode information, which is combinations of a plurality of parameters concerning transmission performance, the transmission mode information being a plurality of kinds of the transmission mode information common to the transmission performance of the optical transmission device and the optical reception device; transmitting, to the optical reception device, a signal modulated based on the selected transmission mode information; and receiving the signal and modulating the received signal based on the transmission mode information selected by the transmission-mode selection unit.

In the optical transmission system in the aspect of the present invention, the optical transmission system further includes a management device, the management device includes: a transmission-design-information storage unit that stores information concerning physical characteristic parameters of various modules included in the optical transmission line and the optical transmission device and the optical reception device and the transmission mode information of the optical transmission device and the optical reception device; a transmission-design processing unit that calculates, for each of the transmission mode information, transmission quality based on the physical characteristic parameters and generates a transmission mode candidate list including a plurality of kinds of transmission mode information selected based on the calculated transmission quality; a network-design-information storage unit that collects network information including any one or all of topology information, node information, and path information of the optical transmission line and stores the collected network information; and a network-design processing unit that, by performing, for each of the transmission mode information, using the network information, accommodation design processing for calculating an optical path for improving network use efficiency, transmits the transmission mode candidate list added with information indicating priority for each of the transmission mode information to the control device, and the transmission-mode selection unit of the control device selects the transmission mode information in descending order of priority out of the received transmission mode candidate list.

In the optical transmission system in the aspect of the present invention, the control device further includes: a transmission-design-information storage unit that stores information concerning physical characteristic parameters of various modules included in the optical transmission line and the optical transmission device and the optical reception device and the transmission mode information of the optical transmission device and the optical reception device; and a transmission-design processing unit that calculates, for each of the transmission mode information, transmission quality based on the physical characteristic parameters, generates a transmission mode candidate list including a plurality of kinds of transmission mode information selected based on the calculated transmission quality, and outputs the generated transmission mode candidate list to the transmission-mode selection unit, and the transmission-mode selection unit selects the transmission mode information in descending order of priority out of the output transmission mode candidate list.

In the optical transmission system in the aspect of the present invention, the control device includes: a signal-quality detection unit that detects signal quality of the received signal; and a signal-quality determination unit that determines, based on information indicating the signal quality detected by the signal-quality detection unit, whether the signal quality of the signal is permissible, and, when the signal-quality determination unit determines that the signal quality of the signal is non-permissible, the transmission-mode selection unit selects the transmission mode information having second highest priority.

Effects of the Invention

According to the present invention, it is possible to select an optimum transmission mode out of transmission modes decided according to combinations of a plurality of parameters concerning transmission performance.

BRIEF DESCRIPTION OF DRAWINGS

FIG. 6 is a diagram showing a configuration of a transmission signal format in the first embodiment.

FIG. 7 is a diagram showing a data configuration of a transmission mode information table in the first embodiment.

FIG. 8 is a diagram showing a data configuration of a transmission-side transmission mode information table in the first embodiment.

FIG. 11 is a diagram showing a data configuration of a reception-side transmission mode information table in the first embodiment.

DESCRIPTION OF EMBODIMENTS

First Embodiment

Figure 1:
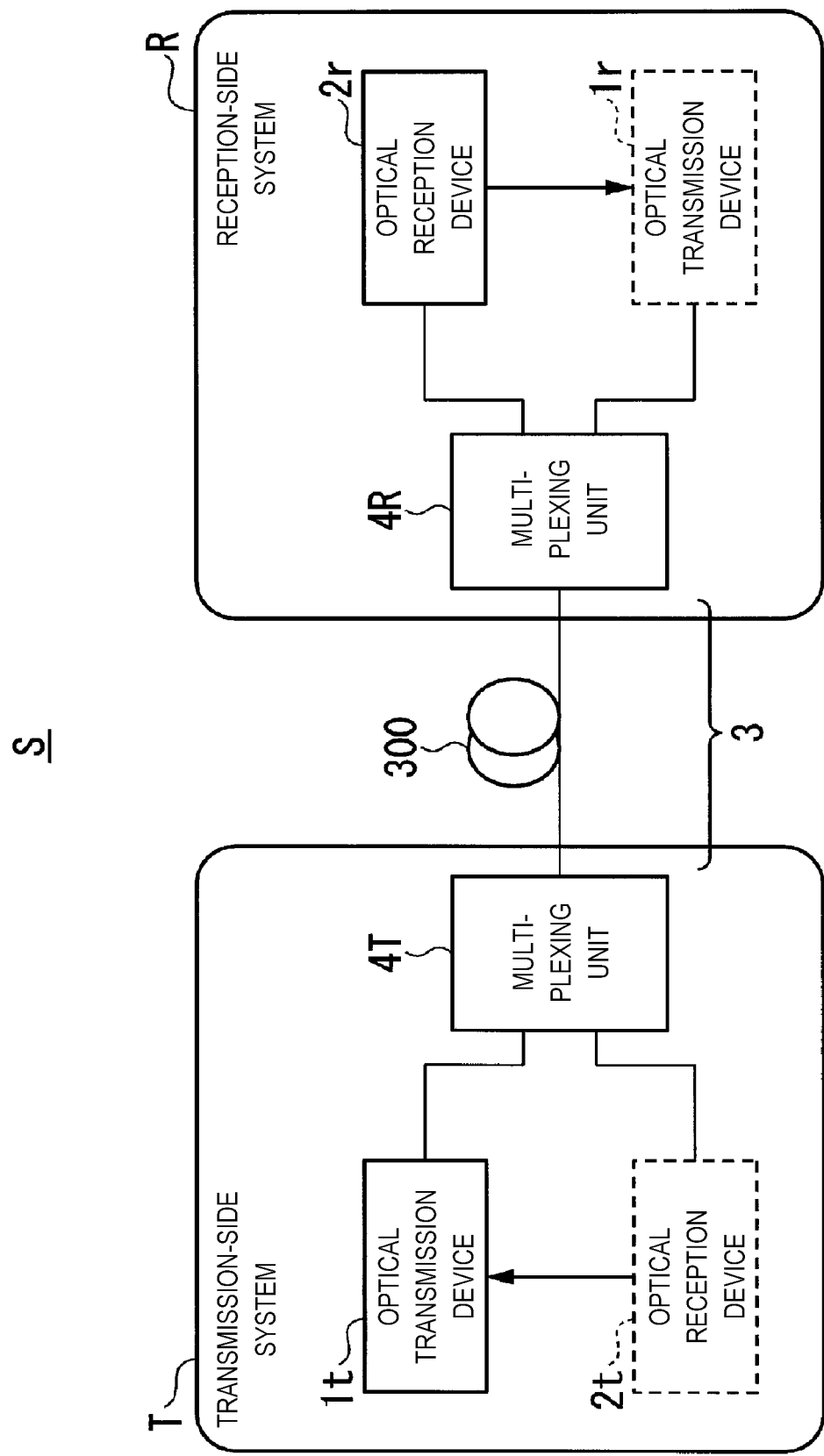
FIG. 1 is a block diagram showing a configuration of an optical transmission system in a first embodiment.

Embodiments of the present invention are explained below with reference to the drawings. FIG. 1 is a block diagram showing a configuration of an optical transmission system S according to a first embodiment. The optical transmission system S includes a transmission-side system T, a reception-side system R, and an optical transmission line 3. The transmission-side system T includes an optical transmission device (optical transmitting apparatus) 1*t*, an optical reception device (optical receiving apparatus) 2*t*, and a multiplexing unit 4T. The reception-side system R includes an optical reception device (optical receiving apparatus) 2*r*, an optical transmission device (optical transmitting apparatus) 1*r*, and a multiplexing unit 4R.

The optical transmission line 3 physically connects the transmission-side system T and the reception-side system R. The optical transmission line 3 performs transmission of signal light between the transmission-side system T and the reception-side system R. The optical transmission line 3 is, for example, an optical fiber 300. The multiplexing units 4T and 4R are connected to both ends of the optical fiber 300.

The multiplexing unit 4T is connected to the optical transmission device 1*t* and the optical reception device 2*t* of the transmission-side system T. The multiplexing unit 4R is connected to the optical reception device 2*r* and the optical transmission device 1*r* of the reception-side system R. Signal light transmitted by the optical transmission device 1*t* of the transmission-side system T is transmitted to the optical reception device 2*r* of the reception-side system R via the optical transmission line 3. Signal light transmitted by the optical transmission device 1*r* of the reception-side system R is transmitted to the optical reception device 2*t* of the transmission-side system T via the optical transmission line 3. The multiplexing units 4T and 4R may be functional units that perform wavelength multiplexing or may be functional units that do not perform the wavelength multiplexing. For example, as an application of the present invention, an opposed configuration of the transmission-side system T and the reception-side system R having only one wavelength that do not perform the wavelength multiplexing is also included. That is, a configuration in which the multiplexing units 4T and 4R do not perform the wavelength multiplexing and are included in the transmission-side system T and the reception-side system R as portions (multiplexing units) that multiplex the optical transmission device 1*t* and the optical reception device 2*r* is also included.

In the optical transmission system S, the optical transmission device 1*t* and the optical reception device 2*r* are in an opposed relation, that is, a relation in which transmission modes are matched and signal light is transmitted from the optical transmission device 1*t* to the optical reception device 2*r*. Similarly, the optical transmission device 1*r* and the optical reception device 2*t* are in an opposed relation.

In FIG. 1, a transmission mode between the transmission-side system T and the reception-side system R is determined. However, usually, the transmission mode is the same in both directions in the opposed relation. Therefore, the optical transmission device 1*t* of the transmission-side system T and the optical reception device 2*r* of the reception-side system R and units between the optical transmission device 1*t* and the optical reception device 2*r* mainly explained are indicated by solid lines. The optical reception device 2*t* and the optical transmission device 1*r* are indicated by broken lines. Note that, considering that the transmission-side system is a downstream side and the reception-side system is an upstream side, when transmission modes of an uplink from the transmission side to the reception side and a downlink from the reception side to the transmission side are different, an optimum transmission mode may be already determined between the optical reception device 2*t* and the optical transmission device 1r in the downlink. The optical reception device 2t and the optical transmission device 1r may be in a normal operation state. The same processing may be performed between the optical transmission device 1t and the optical reception device 2r to determine a transmission mode.

The "transmission side" of the transmission-side system T and the "reception side" of the reception-side system R are convenient names for explanation. The meaning indicates that the optical transmission device 1t is on a side that transmits a pilot tone signal when processing for selecting a transmission mode between the optical transmission device 1t and the optical reception device 2r is performed and the optical reception device 2r is on a side that receives the pilot tone signal. Therefore, conversely, when processing for selecting a transmission mode between the optical transmission device 1r and the optical reception device 2t indicated by the broken lines is performed, the reception-side system R is a transmission-side system and the transmission-side system T is a reception-side system.

(Configuration of Optical Transmission Device in First Embodiment)

The optical transmission device 1t of the transmission-side system T and the optical transmission device 1r of the reception-side system R have the same configuration. In the following explanation, the optical transmission device 1t of the transmission-side system T is explained as an example with reference to FIG. 2.

Figure 2:
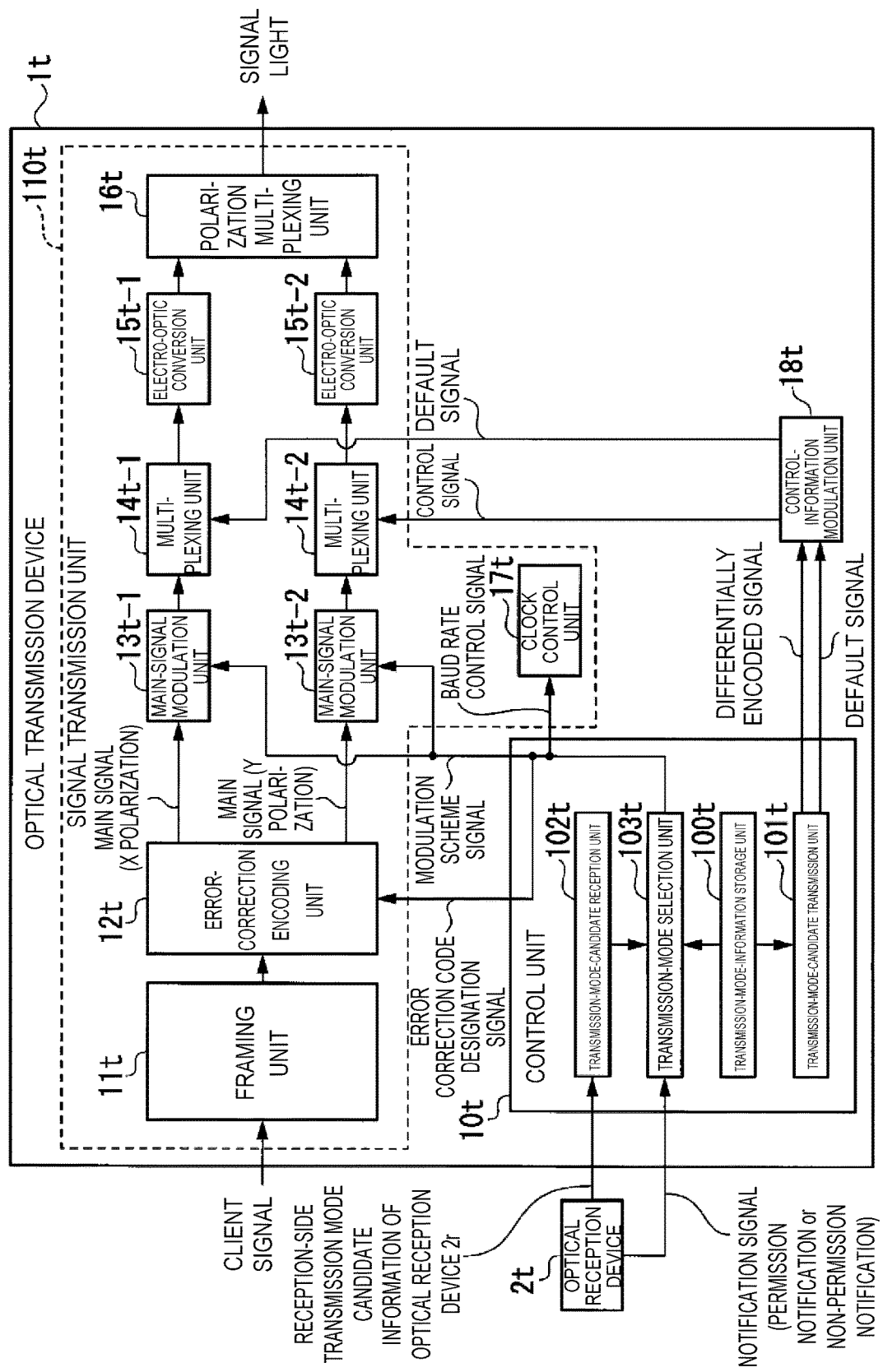
FIG. 2 is a block diagram showing an internal configuration and a connection relation with other devices of an optical transmission device in the first embodiment.

The optical transmission device 1t modulates a main signal, which is information concerning a transmission target, to generate signal light and sends the generated signal light to the optical transmission line 3. As shown in FIG. 2, the optical transmission device 1t has a configuration for transmitting the main signal in parallel using two orthogonal polarizations, that is, X polarization and Y polarization.

The optical transmission device 1t includes a framing unit 11t, an error-correction encoding unit 12t, main-signal modulation units 13t-1 and 13t-2, multiplexing units 14t-1 and 14t-2, electro-optic conversion units 15t-1 and 15t-2, a polarization multiplexing unit 16t, a clock control unit 17t, a control-information modulation unit 18t, and a control unit 10t. Note that, in FIG. 2, a component including the framing unit 11t, the error-correction encoding unit 12t, the main-signal modulation units 13t-1 and 13t-2, the multiplexing units 14t-1 and 14t-2, the electro-optic conversion units 15t-1 and 15t-2, the polarization multiplexing unit 16t, and the clock control unit 17t is referred to as a signal transmission unit (signal transmitter) 110t.

Figure 3:
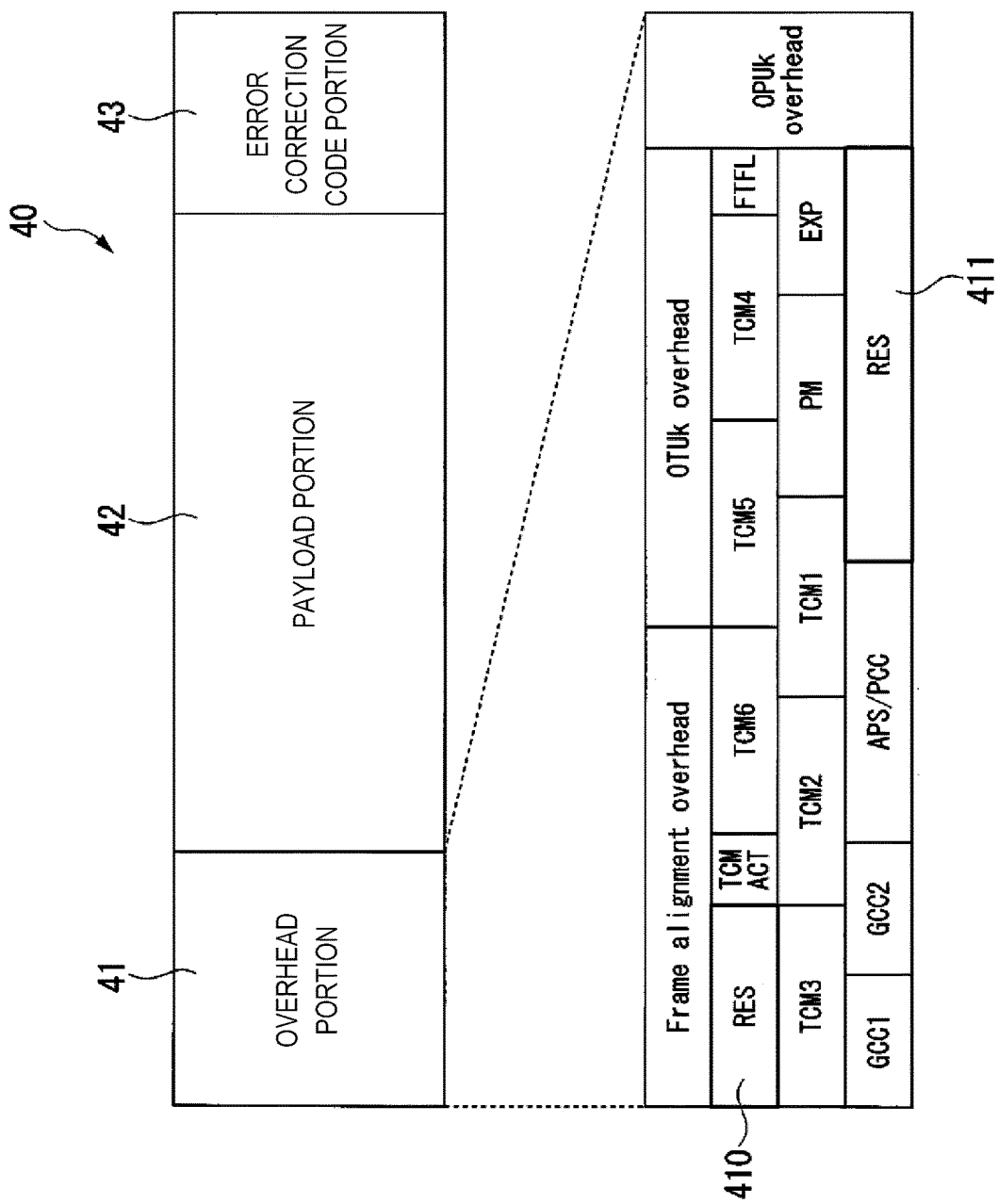
FIG. 3 is a diagram (No. 1) showing a configuration of an OTN frame in the first embodiment.

The framing unit 11t receives a client signal transmitted by an IP-based device such as an IP (Internet Protocol) router or an Ethernet (registered trademark) switch connected to the optical transmission device 1t and forms a signal frame including the received client signal. As the signal frame, for example, an OTN (Optical Transport Network) frame 40 recommended by ITU-T G.709 shown in FIG. 3 is applied. In the signal frame of the OTN frame 40, the framing unit 11t writes information or the like used for monitoring in an overhead portion 41 and writes the received client signal in a payload portion 42.

The error-correction encoding unit 12t receives an error correction code designation signal from the control unit 10t and performs, on the signal frame output by the framing unit 11t, encoding of an error correction encoding scheme indicated by the error correction code designation signal to generate an error correction code. The error-correction encoding unit 12t writes the generated error correction code in an error correction code portion 43 of the OTN frame 40.

Figure 4:
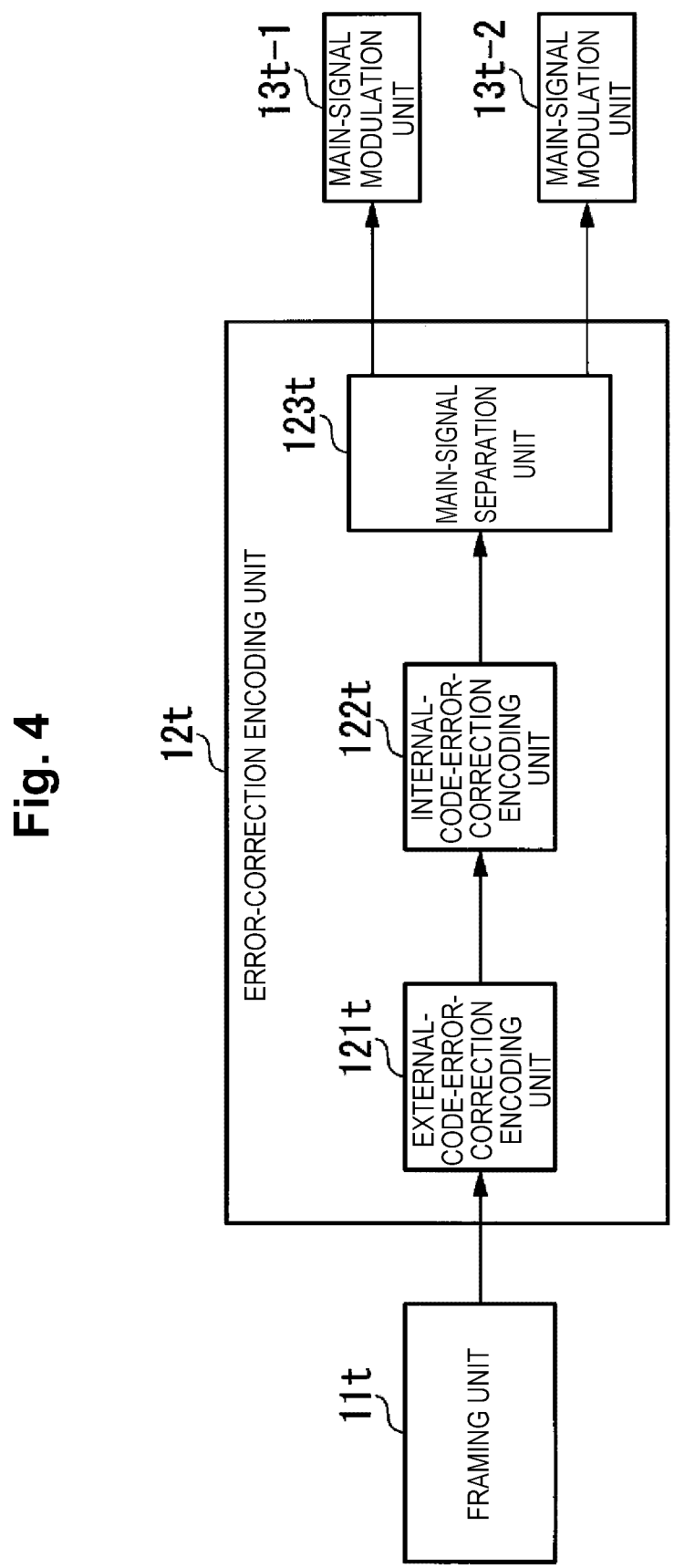
FIG. 4 is a block diagram showing an internal configuration and a connection relation with other functional units of an error-correction encoding unit in the first embodiment.

The error-correction encoding unit 12t includes, for example, as shown in FIG. 4, an external-code-error-correction encoding unit 121t, an internal-code-error-correction encoding unit 122t, and a main-signal separation unit 123t.

The internal-code-error-correction encoding unit 122t performs, for example, encoding based on a soft decision error correction technique. The soft decision error correction technique is a technique for identifying a signal with a plurality of thresholds and performing decision also having likelihood information representing "likelihood" such as "1 near 0" and "1 near 1" and is capable of realizing an error correction ability close to an ideal Shannon limit.

The external-code-error-correction encoding unit 121t performs, for example, encoding based on a hard decision error correction technique. The hard decision technique is a technique for identifying a signal with one threshold and performing decision as a value of 0 or 1. The soft decision error correction technique by the internal code error correction encoding unit 122t tends to cause, in return for realizing an error correction ability close to the ideal Shannon limit, an error floor in which a bit error ratio after correction trails. Therefore, it is possible to realize an extremely high error correction ability by removing the error floor with the hard decision error correction technique by the external-code-error-correction encoding unit 121t. A scheme for using, for an internal code, the encoding based on the soft decision error correction technique and using, for the external code, encoding by the hard decision error correction technique in connection is called connection encoding scheme.

As the soft decision error correction technique, for example, a low-density parity check code (hereinafter referred to as "LDPC") is applied. As the hard decision error correction technique, for example, a Reed-Solomon (hereinafter referred to as "RS") code, which is a block encoding technique, a BCH (Bose-Chaudhuri-Hocquenghem) code, or the like is applied. In each of the internal-code-error-correction encoding unit 122t and the external-code-error-correction encoding unit 121t, rearrangement of bits, that is, interleave may be performed to improve burst error resistance. As an example, encoding by an RS-FED error correction technique in which an NCG (Net Coding Gain) at a bit error rate (hereinafter referred to as "BER") to a BPSK signal of "$10^{-12}$" is "8.35 dB" and an FEC overhead is "6.7%" may be applied.

Figure 5:
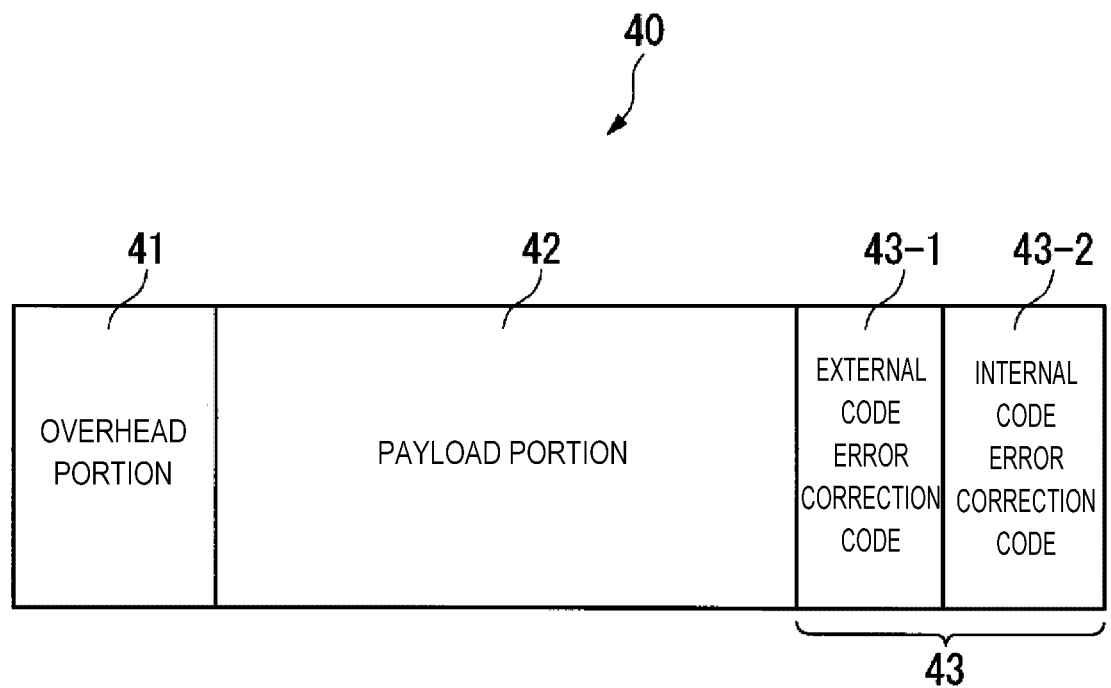
FIG. 5 is a diagram (No. 2) showing the configuration of the OTN frame in the first embodiment.

Note that, in FIG. 4, based on the premise that a high error correction ability is requested, the connection encoding scheme including the external-code-error-correction encoding unit 121t and the internal-code-error-correction encoding unit 122t is applied. In this case, as shown in FIG. 5, an external code error correction code 43-1 encoded by the external-code-error-correction encoding unit 121t and an internal code error correction code 43-2 encoded by the internal-code-error-correction encoding unit 122t are written in the error correction code portion 43 of the OTN frame 40 shown in FIG. 3.

On the other hand, when the requested error correction ability is not so high, the error-correction encoding unit 12t may include only one error-correction encoding unit, for example, the external-code-error-correction encoding unit 121t that performs the encoding by the hard decision error correction technique. In that case, only the external code error correction code 43-1 encoded by the external-code-error-correction encoding unit 121t is written in the error correction code portion 43.

In the error-correction encoding unit 12t, the main-signal separation unit 123t converts a serial signal output by the internal-code-error-correction encoding unit 122t into a parallel signal and generates two main signals for X polarization and the Y polarization, which are binary sequence information. The main-signal separation unit 123*t* outputs the generated main signal for X polarization to the main-signal modulation unit 13*t*-1 and outputs the generated main signal for Y polarization to the main-signal modulation unit 13*t*-2.

The respective main-signal modulation units 13*t*-1 and 13*t*-2 receive a modulation scheme signal from the control unit 10*t* and modulate, based on a modulation scheme indicated by the modulation scheme signal, that is, a mapping rule, the main signals output by the error-correction encoding unit 12*t*, that is, the main signal for X polarization and the main signal for Y polarization corresponding to the respective main-signal modulation units 13*t*-1 and 13*t*-2. The main-signal modulation units 13*t*-1 and 13*t*-2 generate transmission symbol sequences through modulation and output the generated transmission symbol sequences to the multiplexing units 14*t*-1 and 14*t*-2 connected to the respective main-signal modulation units 13*t*-1 and 13*t*-2. As the modulation scheme, for example, BPSK (Binary Phase Shift Keying) modulation, QPSK (Quadrature Phase Shift Keying) modulation, or QAM (Quadrature Amplitude Modulation) modulation is applied. Note that the applied modulation scheme may be a modulation scheme other than these modulation schemes.

The multiplexing unit 14*t*-1 for X polarization captures the transmission symbol sequence for X polarization output by the main-signal modulation unit 13*t*-1 and captures a default signal output by the control-information modulation unit 18*t*. The multiplexing unit 14*t*-1 inserts, for each captured transmission symbol sequence for X polarization, the captured default signal to thereby perform time division multiplexing and generates a signal sequence for X polarization.

The multiplexing unit 14*t*-2 for Y polarization captures the transmission symbol sequence for Y polarization output by the main-signal modulation unit 13*t*-2 and captures a control signal output by the control-information modulation unit 18*t*. The multiplexing unit 14*t*-2 inserts, for each captured transmission symbol sequence for Y polarization, the captured control signal to thereby perform time division multiplexing and generates a signal sequence for Y polarization.

The electro-optic conversion unit 15*t*-1 performs electro-optic conversion of the signal sequence for X polarization output by the multiplexing unit 14*t*-1 and outputs an optical signal for X polarization to the polarization multiplexing unit 16*t*. The electro-optic conversion unit 15*t*-2 performs electro-optic conversion of the signal sequence for Y polarization output by the multiplexing unit 14*t*-2 and outputs an optical signal for Y polarization to the polarization multiplexing unit 16.

The polarization multiplexing unit 16*t* is connected to the multiplexing unit 4T of the optical transmission line 3. The polarization multiplexing unit 16*t* polarization-multiplexes the optical signal for X polarization and the optical signal for Y polarization output by the respective electro-optic conversion units 15*t*-1 and 15*t*-2 to thereby generate polarization-multiplexed time-division multiplexing signal light. The polarization multiplexing unit 16*t* sends the generated signal light to the optical transmission line 3. A transmission signal format of signal light 50 sent by the polarization multiplexing unit 16*t* is formed by, as shown in FIG. 6, Nt (Nt≥1, Nt is a positive integer) time-division multiplexing control information 45-1 to 45-Nt among main signal information 40-1 to 40-Ns, which are Ns (Ns≥1, Ns is a positive integer) transmission symbol sequences. Note that the control information 45-1 to 45-Nt are default signals in the X polarization of the signal light 50 and are control signals in the Y polarization of the signal light 50.

The clock control unit 17*t* receives a baud rate control signal from the control unit 10*t* and sets a clock frequency of a clock included in the inside by the optical transmission device 1*t* such that a baud rate of the main signal is a baud rate designated by the baud rate control signal. For example, when receiving a baud rate control signal for setting a baud rate of the main signal to 32 GBaud from the control unit 10*t*, the clock control unit 17*t* sets the clock frequency to be the baud rate. When receiving a baud rate control signal for changing the baud rate of the main signal from the state of 32 GBaud to 64 GBaud, the clock control unit 17*t* performs clock-up, that is, increases the clock frequency and sets the baud rate of the main signal to 64 GBaud. Conversely, when receiving a baud rate control signal for changing the baud rate of the main signal from the state of 64 GBaud to 32 GBaud, the clock control unit 17*t* performs clock-down, that is, reduces the clock frequency and sets the baud rate of the main signal to 32 GBaud.

The control unit 10*t* includes a transmission-mode-information storage unit 100*t*, a transmission-mode-candidate transmission unit (transmission-mode-candidate transmitter) 101*t*, a transmission-mode-candidate reception unit (transmission-mode-candidate receiver) 102*t*, and a transmission-mode selection unit (transmission-mode selector) 103*t*. Transmission mode information is explained with reference to FIG. 7. The transmission mode information is information obtained by combining various parameters concerning transmission performance, for example, parameters of a modulation scheme, a baud rate, and an error correction code type. In a transmission mode information table 1000 shown in FIG. 7, for example, twenty-four kinds of transmission mode information obtained by combining parameters of six kinds of modulation schemes, two kinds of baud rates, and two kinds of error correction code type are shown. In this example, a transmission capacity in each of the twenty-four combinations is also described in the transmission mode information. As shown in an item of "transmission mode", transmission mode numbers such as "mode 1" and "mode 2" are given to each of the transmission mode information.

As shown in FIG. 7, the six kinds of modulation schemes are BPSK, QPSK, 8QAM, 16QAM, 32QAM, and 64QAM as shown in an item of "modulation scheme". The two kinds of baud rates are 32 GBaud and 64 GBaud as shown in an item of "baud rate". As shown in an item of "error correction code type", one of the two kinds of error correction code types is a connection code FEC of RS-LDPC obtained by combining Reed-Solomon with an external code and combining a low-density parity check code (LDPC) with an internal code. The other is a connection code FEC of BCH-LDPC obtained by combining a BCH code with an external code and combining a low-density parity check code (LDPC) with an internal code.

Each of the optical transmission device 1*t* and the optical reception device 2*r* stores a table having a data configuration such as the transmission mode information table 1000 shown in FIG. 7. Therefore, if only a transmission mode number is transmitted and received between the optical transmission device 1*t* and the optical reception device 2*r*, the respective devices collate the transmission mode number with the table and can determine a modulation scheme, a baud rate and an error correction code type. For example, in the case of a "mode 5", the optical transmission device 1*t* and the optical reception device 2*r* can determine that the modulation scheme is QPSK, the baud rate is 32 GBaud, and the error correction code type is RS+LDPC. In the case of a "mode 16", the optical transmission device 1*t* and the optical reception device 2*r* can determine that the modulation scheme is 16QAM, the baud rate is 64 GBaud, and the error correction code type is BCH+LDPC. Information stored in the transmission mode information table 1000 is not limited to twenty-four kinds shown in FIG. 7 and may be changed as appropriate according to development of technologies and addition of new functions. For example, in the transmission mode information table 1000, twenty-four kinds or more modes may be set in a combination of three kinds of the modulation scheme, the baud rate, and the error correction code type or information other than the three kinds of the modulation scheme, the baud rate, and the error correction code type may be added anew.

In the control unit 10*t*, the transmission-mode-information storage unit 100*t* stores, in advance, for example, a transmission-side transmission mode information table 1001*t* having a data configuration shown in FIG. 8. The transmission-side transmission mode information table 1001*t* stores transmission mode information that can be transmitted in the optical transmission device 1*t*. FIG. 8 shows an example of the transmission-side transmission mode information table 1001*t* that stores transmission mode information, the error correction code type of which is RS+LDPC, as a function of the transmission side in the transmission mode information table 1000 shown in FIG. 7.

The transmission-mode-candidate transmission unit 101*t* generates, as transmission information, transmission-side transmission mode candidate information including all transmission mode numbers stored in an item of "transmission mode" of the transmission-side transmission mode information table 1001*t* stored by the transmission-mode-information storage unit 100*t*. When information is given from the outside, the transmission-mode-candidate transmission unit 101*t* captures the given information as the transmission information.

The transmission-mode-candidate transmission unit 101*t* sets the transmission information as a signal sequence, differentially encodes the signal sequence for each one bit, and outputs a differentially encoded signal to the control-information modulation unit 18*t*. The transmission-mode-candidate transmission unit 101*t* generates a signal sequence in which electric power concentrates on one or more specific frequencies and outputs the generated signal sequence to the control-information modulation unit 18*t* as a default signal.

The transmission-mode-candidate reception unit 102*t* receives, from the optical reception device 2*t* of the transmission-side system T, reception-side transmission mode candidate information including a transmission mode number indicating transmission mode information that can be transmitted in the optical reception device 2*r* of the reception-side system R. The reception-side transmission mode candidate information of the optical reception device 2*r* of the reception-side system R is information that the optical reception device 2*r* of the reception-side system R transmits to the optical transmission device 1*r* and the optical transmission device 1*r* transmits to the optical reception device 2*t* of the transmission-side system T via the optical transmission line 3. The transmission-mode-candidate reception unit 102*t* outputs the received reception-side transmission mode candidate information to the transmission-mode selection unit 103*t*.

The transmission-mode selection unit 103*t* extracts transmission mode numbers common in all the transmission mode numbers stored in the item of "transmission mode" of the transmission-side transmission mode information table 1001*t* stored by the transmission-mode-information storage unit 100*t* and the reception-side transmission mode candidate information output by the transmission-mode-candidate reception unit 102*t*.

The transmission-mode selection unit 103*t* selects a transmission mode number having the highest priority among the extracted common transmission mode numbers. The priority is information indicating a predetermined priority degree. For example, transmission mode information including a modulation scheme having a higher multi-value degree and a higher baud rate is transmission mode information having higher priority. For example, in the transmission mode information shown in the transmission mode information table 1000 shown in FIG. 7, priority of a transmission mode number having a large transmission capacity (a high multi-value degree and a high baud rate) is high.

The transmission-mode selection unit 103*t* includes a storage region on the inside and writes the selected transmission mode number in the storage region on the inside and causes the storage region to store the transmission mode number. The transmission-mode selection unit 103*t* performs the following processing. For example, when a notification included in a notification signal is a signal quality non-permission notification, the transmission-mode selection unit 103*t* refers to the storage region on the inside and selects a transmission mode number of transmission mode information having second highest priority following transmission mode information selected at that point in time. The notification signal is transmitted in-line from the optical transmission device 1*r* of the reception-side system R to the optical reception device 2*t* of the transmission-side system T not via an external line.

The transmission-mode selection unit 103*t* reads information indicating a modulation scheme in the item of "modulation scheme" of transmission mode information corresponding to the selected transmission mode number, a value of a baud rate in the item of "baud rate", and information indicating an error correction encoding scheme in the item of "error correction code type". The transmission-mode selection unit 103*t* generates a modulation scheme signal including the read-out information indicating the modulation scheme and outputs the modulation scheme signal to the main-signal modulation units 13*t*-1 and 13*t*-2. The transmission-mode selection unit 103*t* generates a baud rate control signal including the read-out value of the baud rate and outputs the baud rate control signal to the clock control unit 17*t*. The transmission-mode selection unit 103*t* outputs an error correction code designation signal including the read-out information indicating the error correction encoding scheme to the error-correction encoding unit 12*t*.

The control-information modulation unit 18*t* receives the default signal and the differentially encoded signal output by the transmission-mode-candidate transmission unit 101*t* and modulates the default signal with the differentially encoded signal to generate a control signal. The control-information modulation unit 18*t* outputs the default signal to the multiplexing unit 14*t*-1 for X polarization and outputs the control signal to the multiplexing unit 14*t*-2 for Y polarization.

The default signal and the control signal are time-division multiplexed with the main signal by the multiplexing units 14*t*-1 and 14*t*-2 and thereafter converted into optical signals by the electro-optic conversion units 15*t*-1 and 15*t*-2. A signal generated by polarization-multiplexing the optical signals of the default signal and the control signal with the polarization multiplexing unit 16*t* is a pilot tone signal, which is a signal sequence in which electric power concentrates on one or more specific frequencies.

Note that, conversely to the configuration explained above, the control-information modulation unit 18*t* may output the control signal to the multiplexing unit 14*t*-1 for X polarization and output the default signal to the multiplexing unit 14*t*-2 for Y polarization. In that case, the control information 45-1 to 45-Nt are the control signal in the X polarization of the signal light 50 and are the default signal in the Y polarization of the signal light 50.

(Configuration of Optical Reception Device in First Embodiment)

The optical reception device 2*r* of the reception-side system R and the optical reception device 2*t* of the transmission-side system T have the same configuration. In the following explanation, the optical reception device 2*r* of the reception-side system R is explained as an example with reference to FIG. 9.

The optical reception device 2*r* receives signal light sent by the optical transmission device 1*t* and transmitted by the optical transmission line 3. The optical reception device 2*r* performs coherent reception on the received signal light using a laser for local oscillation included in the inside and demodulates an original signal from the signal light.

Figure 9:
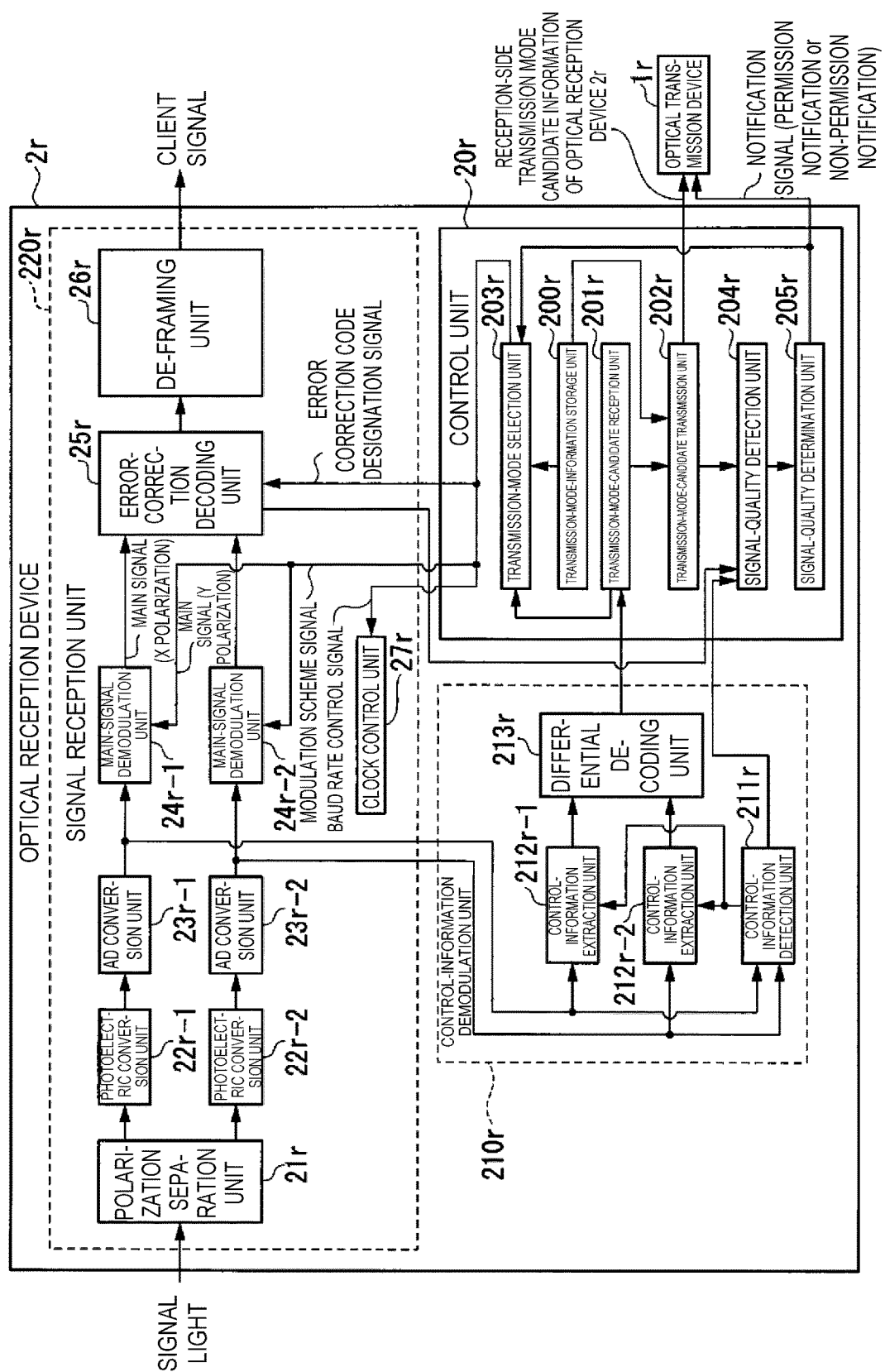
FIG. 9 is a block diagram showing an internal configuration and a connection relation with other devices of an optical reception device in the first embodiment.

The optical reception device 2*r* has an internal configuration shown in FIG. 9 and includes a polarization separation unit 21*r*, photoelectric conversion units 22*r*-1 and 22*r*-2, AD (Analog-to-Digital) conversion units 23*r*-1 and 23*r*-2, main-signal demodulation units 24*r*-1 and 24*r*-2, an error-correction decoding unit 25*r*, a de-framing unit 26*r*, a clock control unit 27*r*, a control-information demodulation unit 210*r*, and a control unit 20*r*. Note that, in FIG. 9, a component including the polarization separation unit 21*r*, the photoelectric conversion units 22*r*-1 and 22*r*-2, the AD conversion units 23*r*-1 and 23*r*-2, the main-signal demodulation units 24*r*-1 and 24*r*-2, the error-correction decoding unit 25*r*, the de-framing unit 26*r*, and the clock control unit 27*r* is referred to as a signal reception unit (signal receiver) 220*r*.

The polarization separation unit 21*r* is connected to the multiplexing unit 4R of the optical transmission line 3 and receives signal light sent by the optical transmission device 1*t* and transmitted by the optical transmission line 3. The signal light is signal light obtained by polarization-multiplexing the signal time-division multiplexed as explained above. The polarization separation unit 21*r* performs polarization separation on the received signal light in an optical region, separates the signal light into two orthogonal X polarization and Y polarization, and outputs each of the separated X polarization and Y polarization to the photoelectric conversion units 22*r*-1 and 22*r*-2.

Specifically, the polarization separation unit 21*r* includes, for example, a polarization diversity 90-degree hybrid coupler and a laser for local oscillation on the inside and performs polarization separation using the polarization diversity 90-degree hybrid coupler and the laser for local oscillation. The polarization separation unit 21*r* outputs the separated X polarization to the photoelectric conversion unit 22*r*-1 and outputs the separated Y polarization to the photoelectric conversion unit 22*r*-2.

The photoelectric conversion unit 22*r*-1 on the X polarization side captures the signal light of the X polarization output by the polarization separation unit 21*r*, converts the signal light into an electric analog signal, and outputs the converted electric analog signal to the AD conversion unit 23*r*-1. The photoelectric conversion unit 22*r*-2 on the Y polarization side captures the signal light of the Y polarization output by the polarization separation unit 21*r*, converts the signal light into an electric analog signal, and outputs the converted electric analog signal to the AD conversion unit 23*r*-2.

The respective AD conversion units 23*r*-1 and 23*r*-2 convert the electric analog signals output by the photoelectric conversion units 22*r*-1 and 22*r*-2 respectively connected to the AD conversion units 23*r*-1 and 23*r*-2 into digital signals to thereby generate digital reception signals. The respective AD conversion units 23*r*-1 and 23*r*-2 output the generated digital reception signals to the main-signal demodulation units 24*r*-1 and 24*r*-2 respectively connected to the AD conversion units 23*r*-1 and 23*r*-2. The AD conversion units 23*r*-1 and 23*r*-2 output the generated digital reception signals to the control-information demodulation unit 210*r* and the control unit 20*r*.

The main-signal demodulation units 24*r*-1 and 24*r*-2 receive a modulation scheme signal from the control unit 20*r* and modulate main signals included in the digital reception signals output by the AD conversion units 23*r*-1 and 23*r*-2 respectively connected to the main-signal demodulation units 24*r*-1 and 24*r*-2 according to a demodulation scheme corresponding to a modulation scheme indicated by the modulation scheme signal, that is, a de-mapping rule. The main signal demodulated by the main-signal demodulation unit 24*r*-1 is a main signal corresponding to the signal light of the X polarization. The main signal demodulated by the main-signal demodulation unit 24*r*-2 is a main signal corresponding to the signal light of the Y polarization.

The error-correction decoding unit 25*r* receives an error correction code designation signal from the control unit 20*r* and performs, on the main signals demodulated by the main-signal demodulation units 24*r*-1 and 24*r*-2, processing of decoding corresponding to an error correction encoding scheme indicated by the error correction code designation signal. As an error correction code used by the error-correction decoding unit 25*r* when performing the processing of the decoding, information concerning an error correction code included in the error correction code portion 43 of the OTN frame 40 of the main signal may be used.

Figure 10:
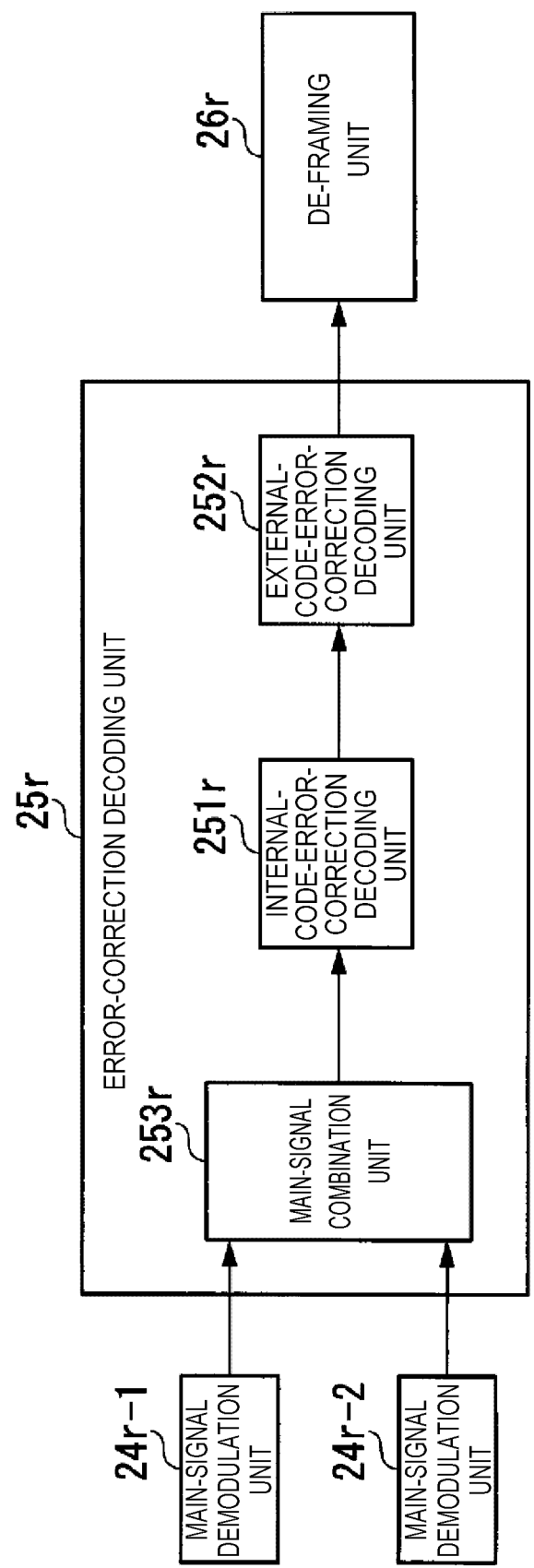
FIG. 10 is a block diagram showing an internal configuration and a connection relation with other functional units of an error-correction decoding unit in the first embodiment.

The error-correction decoding unit 25*r* includes, for example, as shown in FIG. 10, an internal-code-error-correction decoding unit 251*r* and an external-code-error-correction decoding unit 252*r* corresponding to the external-code-error-correction encoding unit 121*t* and the internal-code-error-correction encoding unit 122*t* included in the error-correction encoding unit 12*t* of the optical transmission device 1*t*. The internal-code-error-correction decoding unit 251*r* performs, for example, decoding by the soft decision error correction technique by the LDPC. The external-code-error-correction decoding unit 252*r* performs decoding by the hard decision error correction technique such as RS-FEC or BCH-FEC. Note that, when the error-correction encoding unit 12*t* of the optical transmission device 1*t* includes only the external-code-error-correction encoding unit 121*t*, the error-correction decoding unit 25*r* also includes only the external-code-error-correction decoding unit 252*r*.

In the error-correction decoding unit 25*r*, a main-signal combination unit 253*r* converts a parallel signal including the main signal corresponding to the signal light of the X polarization output by the main-signal demodulation unit 24*r*-1 and the main signal corresponding to the signal light of the Y polarization output by the main-signal demodulation unit 24*r*-2 into a serial signal and outputs the serial signal to the internal-code-error-correction decoding unit 251*r*.

The de-framing unit 26r reads a client signal from the payload portion 42 of the OTN frame 40 shown in FIG. 3 and outputs the read-out client signal to an IP-based device such as an IP router or an Ethernet (registered trademark) switch connected to the optical reception device 2r.

The clock control unit 27r receives a baud rate control signal from the control unit 20r and sets a clock frequency of a clock of the optical reception device 2r such that a baud rate in receiving the main signal is a baud rate designated by the baud rate control signal. For example, when receiving a baud rate control signal for setting a baud rate to 32 GBaud from the control unit 20r, the clock control unit 27r sets the clock frequency to be the baud rate. When receiving a baud rate control signal for changing the baud rate from the state of 32 GBaud to 64 GBaud, the clock control unit 27r performs clock-up, that is, increases the clock frequency and sets the baud rate to 64 GBaud. Conversely, when receiving a baud rate control signal for changing the state of 64 GBaud to 32 GBaud, the clock control unit 27r performs clock-down, that is, reduces the clock frequency and sets the baud rate to 32 GBaud.

The control-information demodulation unit 210r includes a control-information detection unit 211r, control-information extraction units 212r-1 and 212r-2, and a differential decoding unit 213r. In the control-information demodulation unit 210r, the control-information detection unit 211r captures the digital reception signals, which are obtained by time-division multiplexing the main signal information and the control information, output by the respective AD conversion units 23r-1 and 23r-2 and detects, based on a specific frequency of the pilot tone signal out of the captured digital reception signals, positions of the control information 45-1, 45-2, . . . , and 45-Nt included in the signal light 50 shown in FIG. 6. Note that the specific frequency of the pilot tone signal transmitted by the optical transmission device 1t is given to the optical reception device 2r beforehand. The control-information detection unit 211r outputs the detected positions of the control information 45-1, 45-2, . . . , and 45-Nt to the control-information extraction units 212r-1 and 212r-2 as timing information.

Note that, as explained above, the control information 45-1 to 45-Nt are the default signal in the X polarization and are the control signal in the Y polarization. Therefore, the default signal is included in the control information of the digital reception signal output by the AD conversion unit 23r-1 and the control signal is included in the control information of the digital reception signal output by the AD conversion unit 23r-2.

The respective control-information extraction units 212r-1 and 212r-2 detect, based on the timing information output by the control-information detection unit 211r, a section including the control information 45-1, 45-2, . . . , and 45-Nt out of the digital reception signals output by the AD conversion units 23r-1 and 23r-2 respectively connected to the control-information extraction units 212r-1 and 212r-2 and output a signal of the detected section to the differential decoding unit 213r. The differential decoding unit 213r performs differential decoding processing using signals output by the control-information extraction units 212r-1 and 212r-2 to thereby generate a differentially decoded signal and outputs the generated differentially decoded signal to the control unit 20r.

The control unit 20r includes a transmission-mode-information storage unit 200r, a transmission-mode-candidate reception unit (transmission-mode-candidate receiver) 201r, a transmission-mode-candidate transmission unit (transmission-mode-candidate transmitter) 202r, a transmission-mode selection unit 203r, a signal-quality detection unit (signal-quality detector) 204r, and a signal-quality determination unit (signal-quality determiner) 205r.

In the control unit 20r, the transmission-mode-information storage unit 200r stores, in advance, a reception-side transmission mode information table 2001r having a data configuration shown in FIG. 11. The reception-side transmission mode information table 2001r stores transmission mode information that can be transmitted in the optical reception device 2r. FIG. 11 shows an example of the reception-side transmission mode information table 2001r that stores transmission mode information having transmission mode numbers "mode 1", "mode 5", "mode 9", and "mode 13" in the transmission mode information table 1000 shown in FIG. 7.

The transmission-mode-candidate reception unit 201r demodulates the differentially decoded signal output by the differential decoding unit 213r and acquires transmission-side transmission mode candidate information of the optical transmission device 1t from the differentially decoded signal. The transmission-mode-candidate reception unit 201r outputs the acquired transmission-side transmission mode candidate information to the transmission-mode selection unit 203r. When acquiring the transmission-side transmission mode candidate information, the transmission-mode-candidate reception unit 201r outputs, to the transmission-mode-candidate transmission unit 202r, a reception-side transmission mode candidate information transmission instruction signal for transmitting the reception-side transmission mode candidate information.

When receiving the reception-side transmission mode candidate information transmission instruction signal from the transmission-mode-candidate reception unit 201r, the transmission-mode-candidate transmission unit 202r generates reception side transmission candidate information including all transmission mode numbers stored in the item of "transmission mode" of the reception-side transmission mode information table 2001r stored by the transmission-mode-information storage unit 200r.

The transmission-mode-candidate transmission unit 202r is connected to a transmission-mode-candidate transmission unit 101r of the optical transmission device 1r of the reception-side system R. The transmission-mode-candidate transmission unit 202r transmits the generated reception-side transmission mode candidate information to the transmission-mode-candidate transmission unit 101r of the optical transmission device 1r. The transmission-mode-candidate transmission unit 202r transmits the generated reception-side transmission mode candidate information to the transmission-mode-candidate transmission unit 101r of the optical transmission device 1r and thereafter outputs, to the signal-quality detection unit 204r, a signal quality detection instruction signal for detecting signal quality.

The transmission-mode selection unit 203r extracts transmission mode numbers common in all the transmission mode numbers stored in the item of "transmission mode" of the reception-side transmission mode information table 2001r stored by the transmission-mode-information storage unit 200r and the transmission-side transmission mode candidate information of the optical transmission device 1t output by the transmission-mode-candidate reception unit 201r.

The transmission-mode selection unit 203r selects a transmission mode number having the highest priority among the extracted common transmission mode numbers. Note that priority serving as a reference in the selection by the transmission-mode selection unit 203r is the same as the priority of the transmission-mode selection unit 103t of the optical transmission device 1t. Accordingly, the transmission mode number selected by the transmission-mode selection unit 203r according to the priority and the transmission mode number selected by the transmission-mode selection unit 103t of the optical transmission device 1t according to the priority are the same transmission mode number.

The transmission-mode selection unit 203r includes a storage region on the inside and writes the selected transmission mode number in the storage region on the inside and causes the storage region to store the transmission mode number. When receiving a notification signal from the signal-quality determination unit 205r, when a notification included in the notification signal is a signal quality non-permission notification, the transmission-mode selection unit 203r refers to the storage region on the inside and selects a transmission mode number of transmission mode information having second highest priority following transmission mode information selected at that point in time.

The transmission-mode selection unit 203r reads information indicating a modulation scheme in the item of "modulation scheme" of the transmission mode information corresponding to the selected transmission mode number, a value of a baud rate in the item of "baud rate", and information indicating an error correction encoding scheme in the item of "error correction code type". The transmission-mode selection unit 203r generates a modulation scheme signal including the read-out information indicating the modulation scheme and outputs the modulation scheme signal to the main-signal demodulation units 24r-1 and 24r-2. The transmission-mode selection unit 203r generates a baud rate control signal including the read-out value of the baud rate and outputs the baud rate control signal to the clock control unit 27r. The transmission-mode selection unit 203r outputs an error correction code designation signal including the read-out information indicating the error correction encoding scheme to the error-correction decoding unit 25r.

When transmission mode information is selected anew in the optical transmission device 1t, the signal-quality detection unit 204r detects signal quality of signal light transmitted by the optical transmission device 1t according to a transmission mode selected anew.

The signal-quality detection unit 204r includes a region of a flag on the inside. An initial value of the flag is "OFF". When receiving a signal quality detection instruction signal from the transmission-mode-candidate transmission unit 202r, the signal-quality detection unit 204r sets the flag to "ON". The signal-quality detection unit 204r detects signal quality in a state in which the flag is "ON". Note that the signal-quality detection unit 204r may not use the flag. In this case, when receiving the signal quality detection instruction signal, the signal-quality detection unit 204r detects an OSNR from control information based on the timing information detected by the control-information detection unit 211r using the pilot tone signal.

For example, the signal-quality detection unit 204r detects a signal-to-noise ratio (hereinafter referred to as an "SN" ratio) from the intensity of a specific frequency of the pilot tone signal and sets the detected signal-to-noise ratio as information indicating signal quality. Note that the information indicating the signal quality is not limited to the SN ratio. The intensity itself of the specific frequency may be set as information indicating the signal quality. A bit error ratio (BER) may be set as the information indicating the signal quality. The signal-quality detection unit 204r may be connected to two output ends of the polarization separation unit 21r. The signal-quality detection unit 204r may detect an optical signal-to-noise ratio (hereinafter referred to as "OSNR") and set the detected OSNR as the information indicating the signal quality.

As signal quality detection method, the signal-quality detection unit 204r may use information obtained from a measurement device such as an OTDR (Optical Time Domain Reflectometer), an optical spectrum analyzer, or a power meter. It is possible to determine a signal deterioration position and improve accuracy of signal quality detection according to the information obtained from the measurement device. It is possible to obtain information that cannot be obtained only with the optical transmission system in the past. In this case, the measurement device may be prepared separately from the optical transmission system S or a measurement function may be included in the optical transmission system S.

The signal-quality detection unit 204r outputs the detected information indicating the signal quality to the signal-quality determination unit 205r and sets the flag to "OFF". When an output from the control-information detection unit 211r is obtained in a state in which the flag is "OFF", the signal-quality detection unit 204r does not detect the signal quality. This is because the output is not a digital reception signal obtained when a transmission mode is selected anew in the optical transmission device 1t.

The signal-quality determination unit 205r determines, based on the information indicating the signal quality detected by the signal-quality detection unit 204r and a threshold decided in advance according to signal quality to be detected, whether the signal quality is permissible quality.

When determining that the signal quality is the permissible quality, the signal-quality determination unit 205r transmits a notification signal of a signal quality permission notification to the optical reception device 2t of the transmission-side system T inline via the optical transmission device 1r of the reception-side system R. The signal-quality determination unit 205r outputs the notification signal of the signal quality permission notification to the transmission-mode selection unit 203r.

When determining that the signal quality is non-permissible quality, the signal-quality determination unit 205r transmits a notification signal of a signal quality non-permission notification to the optical reception device 2t of the transmission-side system T inline via the optical transmission device 1r of the reception-side system R. The signal-quality determination unit 205r outputs the notification signal of the signal quality non-permission notification to the transmission-mode selection unit 203r.

(About Optical Transmission Device 1r of Reception-Side System R)

As explained above, the optical transmission device 1r of the reception-side system R has the same configuration as the optical transmission device 1t of the transmission-side system T. Accordingly, in the following explanation, when functional units of the optical transmission device 1r are explained, the alphabet "t" of a sign is replaced with "r". For example, when a transmission-mode selection unit of the optical transmission device 1r is explained, the transmission-mode selection unit is explained as "transmission-mode selection unit 103r".

Figure 12:
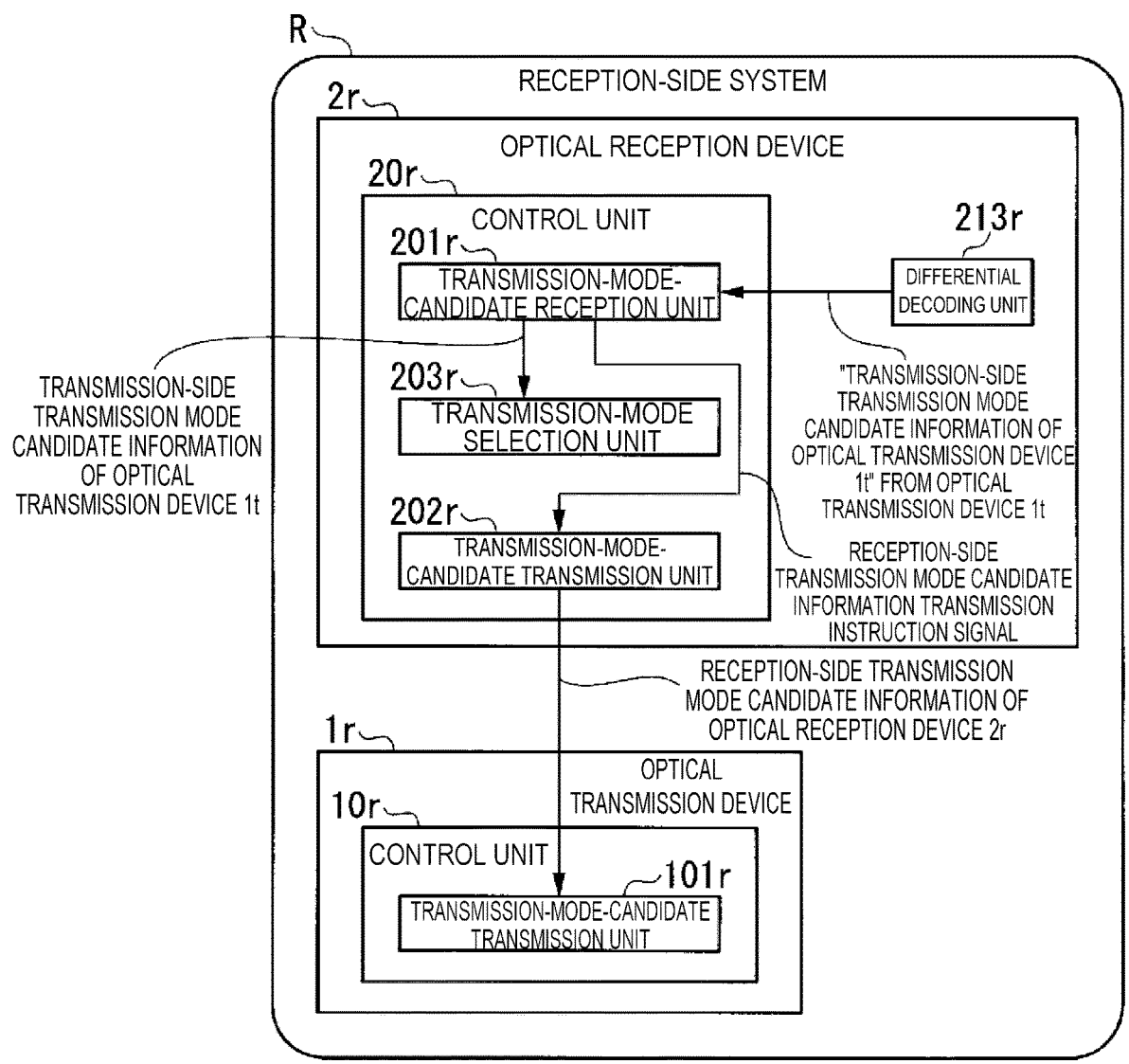
FIG. 12 is a diagram (No. 1) showing a connection relation between an optical reception device and an optical transmission device in a reception-side system in the first embodiment.

As explained above, the optical transmission device 1r of the reception-side system R receives the reception-side transmission mode candidate information transmitted by the optical reception device 2r. The optical transmission device 1r transmits the received reception-side transmission mode candidate information of the optical reception device 2r to the optical reception device 2t of the transmission-side system T via the optical transmission line 3. Accordingly, as shown in FIG. 12, the transmission-mode-candidate transmission unit 101r of the optical transmission device 1r of the reception-side system R is connected to the transmission-mode-candidate transmission unit 202r of the optical reception device 2r. The transmission-mode-candidate transmission unit 101r receives the reception-side transmission mode candidate information of the optical reception device 2r transmitted by the transmission-mode-candidate transmission unit 202r of the optical reception device 2r.

The transmission-mode-candidate transmission unit 101r of the optical transmission device 1r captures the received reception-side transmission mode candidate information of the optical reception device 2r as transmission information. The transmission-mode-candidate transmission unit 101r of the optical transmission device 1r sets the transmission signal as a signal sequence, differentially encodes the signal sequence for each one bit, and outputs a differentially encoded signal to a control-information modulation unit 18r. The transmission-mode-candidate transmission unit 101r generates a signal sequence in which electric power concentrates on one or more specific frequencies and outputs the generated signal sequence to the control-information modulation unit 18r as a default signal. Consequently, the reception-side transmission mode candidate information of the optical reception device 2r is superimposed on the pilot tone signal and transmitted to the optical reception device 2t of the transmission-side system T by the optical transmission line 3.

(About Optical Reception Device 2t of Transmission-Side System T)

As explained above, the optical reception device 2t of the transmission-side system T has the same configuration as the optical reception device 2r of the reception-side system R. Accordingly, in the following explanation, when functional units of the optical reception device 2t are explained, the alphabet "r" of a sign is replaced with "t". For example, when a transmission-mode selection unit of the optical reception device 2t is explained, the transmission-mode selection unit is explained as "transmission-mode selection unit 203t".

Figure 13:
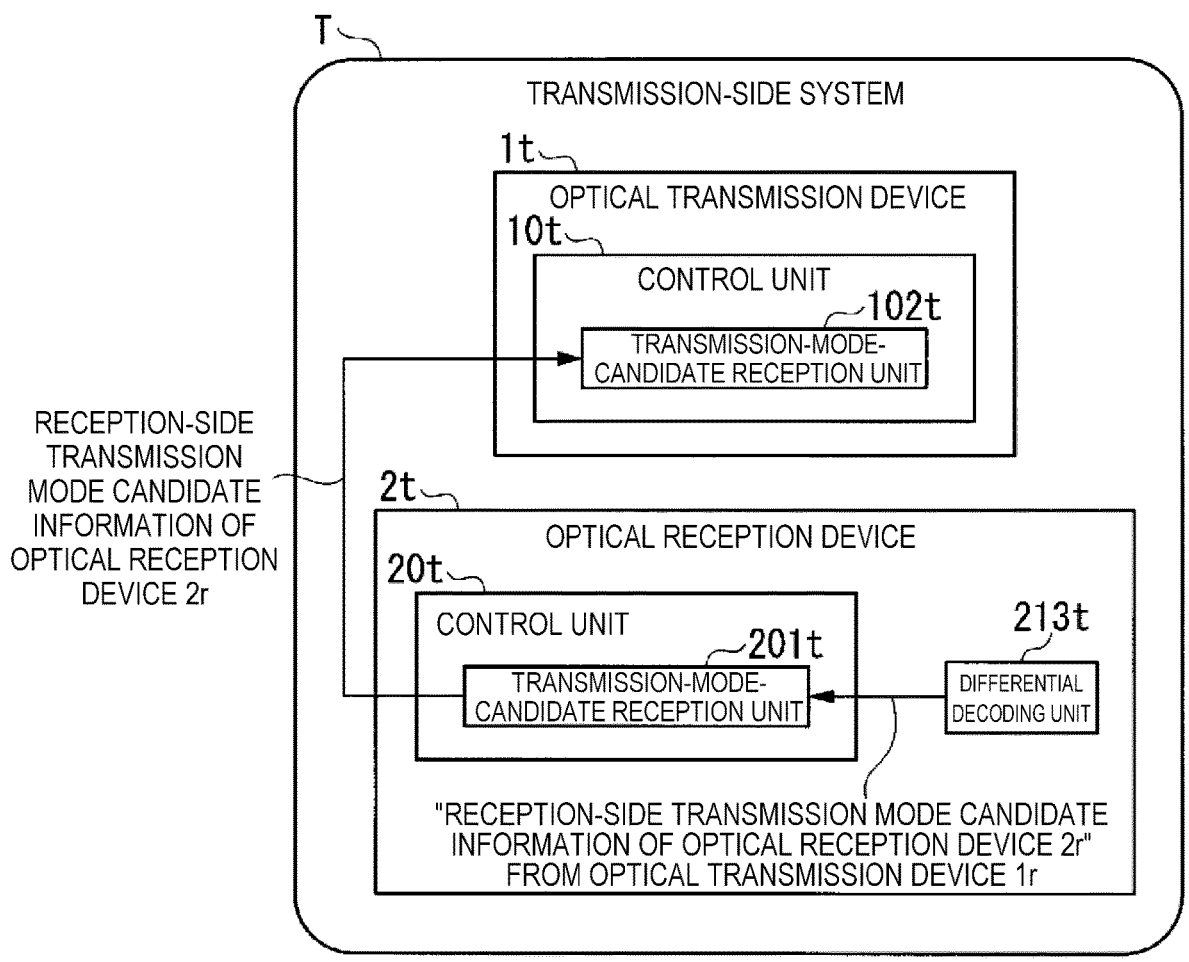
FIG. 13 is a diagram (No. 1) showing a connection relation between an optical transmission device and an optical reception device in a transmission-side system in the first embodiment.

As explained above, the optical reception device 2t of the transmission-side system T receives the reception-side transmission mode candidate information of the optical reception device 2r transmitted by the optical transmission device 1r of the reception-side system R. The optical reception device 2t transmits the received reception-side transmission mode candidate information of the optical reception device 2r to the optical transmission device 1t of the transmission-side system T. Accordingly, as shown in FIG. 13, a transmission-mode-candidate reception unit 201t of the optical reception device 2t of the transmission-side system T is connected to the transmission-mode-candidate reception unit 102t of the optical transmission device 1t.

The transmission-mode-candidate reception unit 201t of the optical reception device 2t demodulates the differentially decoded signal output by a differential decoding unit 213t and acquires the reception-side transmission mode candidate information of the optical reception device 2r from the differentially decoded signal. The transmission-mode-candidate reception unit 201t transmits the acquired reception-side transmission mode candidate information of the optical reception device 2r to the transmission-mode-candidate reception unit 102t of the optical transmission device 1t. Consequently, the transmission-mode-candidate reception unit 102t of the optical transmission device 1t of the transmission-side system T can acquire the reception-side transmission mode candidate information of the optical reception device 2r of the reception-side system R.

(Transmission Mode Selection Processing in First Embodiment)

Figure 14:
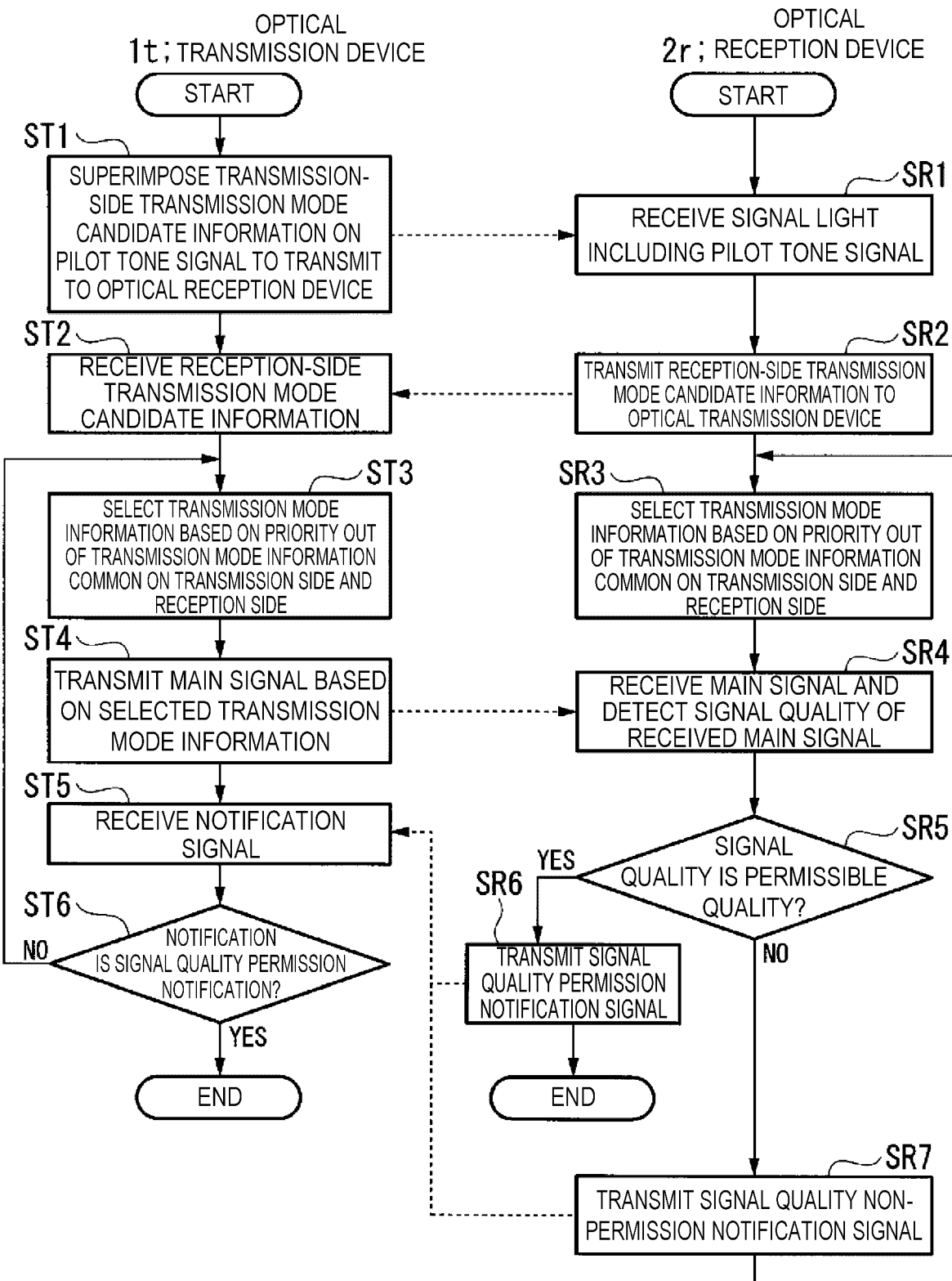
FIG. 14 is a flowchart showing a flow of transmission mode selection processing in the first embodiment.

FIG. 14 is a flowchart showing a flow of transmission mode selection processing by the optical transmission system S in the first embodiment. Broken line arrows indicate transmission and reception of information between the optical transmission device 1t and the optical reception device 2t.

(Processing in Step ST1 of Optical Transmission Device 10

The transmission-mode-candidate transmission unit 101t of the control unit 10t of the optical transmission device 1t starts processing according to operation by a user or at timing of a start of the optical transmission device 1t. The transmission-mode-candidate transmission unit 101t generates transmission-side transmission mode candidate information including all the transmission mode numbers stored in the item of "transmission mode" of the transmission-side transmission mode information table 1001t stored by the transmission-mode-information storage unit 100t.

The transmission-mode-candidate transmission unit 101t sets the generated transmission-side transmission mode candidate information as a signal sequence and differentially encodes the signal sequence for each one bit and outputs a differentially encoded signal to the control-information modulation unit 18t. The transmission-mode-candidate transmission unit 101t generates a signal sequence in which electric power concentrates on one or more specific frequencies and outputs the generated signal sequence to the control-information modulation unit 18t as a default signal.

Differential encoding performed by the transmission-mode-candidate transmission unit 101t is explained. In the differential encoding, when n-th (n≥0, n is an integer) is represented as C(n) (C(n) is a binary value of 1 or 0), an n-th output (differentially encoded signal) D(n) can be represented as exclusive OR of C(n) and D(n−1) as indicated by the following Formula (1). In Formula (1), D(−1)=1.

[Expression 1]

$$D(n)=C(n)\oplus D(n-1) \tag{1}$$

Next, the default signal, that is, the signal sequence in which electric power concentrates on specific frequencies is explained. As the signal sequence in which electric power concentrates on specific frequencies, for example, an alternating signal in a relation of point symmetry with respect to the origin on an IQ plane can be used. As an example, when a BPSK signal is generated, an alternating signal alternately repeating two signal points like −S, S, −S, S, −S, and S only has to be used.

When a QPSK signal is generated, when a signal point is represented as (real part, imaginary part), an alternating signal alternately repeating two signal points like (S, S), (−S, −S), (S, S), (−S, −S), (S, S), and (−S, −S) or (S, −S), (−S, S), (S, −S), (−S, S), (S, −S), and (−S, S) only has to be used. S represents any real number. (real part a, imaginary part p) can be represented as a complex number α+jβ; j is an imaginary number unit. This alternating signal can generate electric power concentrating on specific frequencies in two parts.

An alternating signal repeating one each signal twice like −S, −S, S, S, −S, −S, S, S, −S, −S, S, and S may be used. An alternating signal repeating one each signal M times (M is an integer larger than 0) may be used. By multiplying or convoluting an alternating signal with a plurality of times of repetition in this way, it is possible to concentrate electric power on specific frequencies in four or more parts. By superimposing a plurality of sine waves having different cycles, it is also possible to generate a signal in which electric power concentrates on two or more specific frequencies. By superimposing a signal only on a specific subcarrier using an orthogonal frequency division multiplexing (OFDM) scheme, it is also possible to generate a signal having a specific frequency. Further, by diffusing a signal using a specific frequency band signal sequence and other signal sequences, it is also possible to expand a frequency band on which electric power concentrates.

The control-information modulation unit 18t receives the default signal and the differentially encoded signal output by the transmission-mode-candidate transmission unit 101t and modulates the default signal with the differentially encoded signal to generate a control signal. Specifically, when the default signal output by the transmission-mode-candidate transmission unit 101t is −S, S, −S, S, ..., −S, and S, the control-information modulation unit 18t outputs −S, S, −S, S, −S, and S as the control signal when the differentially encoded signal is D(n)=1. When the differentially encoded signal is D(n)=0, the control-signal modulation unit 18t inverts the sign and outputs S, −S, S, −S, S, and −S as the control signal. Note that the inversion of the sign may be opposite in D(n)=1 and D(n)=0, that is, S, −S, S, −S, S, and −S may be output when D(n)=1 and −S, S, −S, S, −S, and S may be output when D(n)=0.

The control-information modulation unit 18t outputs the default signal to the multiplexing unit 14t-1 for X polarization and outputs the control signal to the multiplexing unit 14t-2 for Y polarization. The multiplexing unit 14t-1 for X polarization inserts, for each transmission symbol sequence for X polarization output by the main-signal modulation unit 13t-1, the default signal output by the control-information modulation unit 18t to thereby perform time-division multiplexing and generate a signal sequence for X polarization. The multiplexing unit 14t-2 for Y polarization inserts, for each transmission symbol sequence for Y polarization output by the main-signal modulation unit 13t-2, the control signal output by the control-information modulation unit 18t to thereby perform time-division multiplexing and generate a signal sequence for Y polarization.

The respective electro-optic conversion units 15t-1 and 15t-2 perform electro-optic conversion of the signal sequences for X polarization and the Y polarization output by the multiplexing units 14t-1 and 14t-2 and output optical signals for X polarization and the Y polarization to the polarization multiplexing unit 16t.

The polarization multiplexing unit 16t polarization-multiplexes the optical signal for X polarization and the optical signal for Y polarization output by each of the electro-optic conversion units 15t-1 and 15t-2 to thereby generate a polarization-multiplexed time-division multiplexing signal light. At this time, when the differentially encoded signal is D(n)=0, control information in a signal output from one polarization is a signal obtained by inverting a phase of control information of the other polarization.

The polarization multiplexing unit 16t sends the generated signal light to the optical transmission line 3. Consequently, a signal light including a pilot tone signal superimposed with the transmission-side transmission mode candidate information of the optical transmission device 1t is transmitted to the optical reception device 2r by the optical transmission line 3.

(Processing in Step SR1 of Optical Reception Device 2r)

The polarization separation unit 21r of the optical reception device 2r receives the signal light including the pilot tone signal transmitted by the optical transmission line 3. The polarization separation unit 21r performs polarization separation on the received signal light in an optical region, separates the signal light into two orthogonal X polarization and Y polarization, and outputs each of the separated X polarization and Y polarization to the photoelectric conversion units 22r-1 and 22r-2. The respective photoelectric conversion units 22r-1 and 22r-2 capture the signal light of the X polarization and the Y polarization output by the polarization separation unit 21r, convert the signal light into electric analog signals and output the converted electric analog signals to the AD conversion units 23r-1 and 23r-2 respectively corresponding to the photoelectric conversion units 22r-1 and 22r-2.

The AD conversion units 23r-1 and 23r-2 convert electric analog signals output from the photoelectric conversion units 22r-1 and 22r-2 respectively connected to the AD conversion units 23r-1 and 23r-2 into digital signals to thereby generate digital reception signals and output the generated digital reception signals to the main-signal demodulation units 24r-1 and 24r-2 respectively connected to the AD conversion units 23r-1 and 23r-2. The AD conversion units 23r-1 and 23r-2 output the generated digital reception signals to the control-information detection unit 211r and the control-information extraction units 212r-1 and 212r-2 of the control-information demodulation unit 210r.

The control-information detection unit 211r receives the time-division multiplexed digital reception signals output by the AD conversion units 23r-1 and 23r-2 and detects, out of the received digital reception signals, based on a specific frequency of a known pilot tone signal, positions of the control information 45-1, 45-2, ..., and 45-Nt included in the signal light 50 shown in FIG. 6.

As an approach of detecting the positions of the control information 45-1, 45-2, ..., and 45-Nt, for example, there is an approach in which the control-information detection unit 211r detects, as insertion positions of the control information 45-1, 45-2, ..., and 45-Nt, positions where electric power concentrates on specific frequencies in the digital reception signals. The positions where electric power concentrates are, for example, when signal power having the specific frequencies of the digital reception signals are calculated, positions at the time when the calculated signal power exceeds a predetermined threshold or positions where the signal power is the largest in the signal power exceeding the predetermined threshold. The control-information detection unit 211r outputs the detected positions to the control-information extraction units 212r-1 and 212r-2 as timing information.

The respective control-information extraction units 212r-1 and 212r-2 detect, based on the timing information output by the control-information detection unit 211r, out of the digital reception signals output by the AD conversion units 23r-1 and 23r-2 respectively connected to the control-information extraction units 212r-1 and 212r-2, a section including the control information 45-1, 45-2, ..., and 45-Nt and outputs signals of the detected section to the differential decoding unit 213r.

The differential decoding unit 213r performs differential decoding processing using signals output by the control-information extraction units 212r-1 and 212r-2, generates a differentially decoded signal, and outputs the generated differentially decoded signal to the transmission-mode-candidate reception unit 201r. For example, when output signals of the respective control-information extraction units 212r-1 and 212r-2 in an n-th frame are represented as Rx(n, k) and Ry(n, k), a differentially decoded signal Z(n) is represented by the following Formula (2).

[Expression 2]

$$Z(n) = \sum_{K=0}^{K-1} Rx(n, k)Rx^*(n-1, k) + \sum_{K=0}^{K-1} Ry(n, k)Ry^*(n-1, k) \quad (2)$$

In Formula (2), "*" indicates a complex conjugate. "K" represents the length of digital reception signals stored in buffer units of the respective control-information extraction units 212r-1 and 212r-2; K>k≥0.

The transmission-mode-candidate reception unit 201r captures the differentially decoded signal output by the differential decoding unit 213r, demodulates the captured differentially decoded signal, and acquires the transmission-side transmission mode candidate information of the optical transmission device 1t from the differentially decoded signal. When a differentially decoded signal in an n-th frame is represented as Z(n), a determination result P(n) is represented by the following Formula (3). In Formula (3), $P_{th}$ (>0) is a determination threshold.

[Expression 3]

$$P(n) = \begin{cases} 0, & \text{if } |Z(n)| \geq P_{th} \\ 1, & \text{otherwise} \end{cases} \quad (3)$$

A modulation and demodulation approach by the control-information modulation unit 18t, the control-information demodulation unit 210r, and the transmission-mode-candidate reception unit 201r explained above does not depend on a modulation scheme. Accordingly, even under a communication environment in which a modulation scheme for a main signal of signal light transmitted by the optical transmission device 1t cannot be identified in the optical reception device 2r because a transmission mode is not determined, it is possible to transmit the transmission-side transmission mode candidate information of the optical transmission device 1t.

The transmission-mode-candidate reception unit 201r outputs the acquired transmission-side transmission mode candidate information of the optical transmission device 1t to the transmission-mode selection unit 203r. When acquiring the transmission-side transmission mode candidate information of the optical transmission device 1t, the transmission-mode-candidate reception unit 201r outputs, to the transmission-mode-candidate transmission unit 202r, a reception-side transmission mode candidate information transmission instruction signal for transmitting reception-side transmission mode candidate information.

(Processing in Step SR2 of Optical Reception Device 2r)

When receiving the reception-side transmission mode candidate information transmission instruction signal from the transmission-mode-candidate reception unit 201r, the transmission-mode-candidate transmission unit 202r generates reception-side transmission mode candidate information including all transmission mode numbers stored in the item of "transmission mode" of the reception-side transmission mode information table 2001r stored by the transmission-mode-information storage unit 200r. The transmission-mode-candidate transmission unit 202r transmits the generated reception-side transmission mode candidate information to the transmission-mode-candidate transmission unit 101r of the optical transmission device 1r of the reception-side system R.

After transmitting the generated reception-side transmission mode candidate information to the transmission-mode-candidate transmission unit 101r of the optical transmission device 1r, the transmission-mode-candidate transmission unit 202r outputs a signal quality detection instruction signal for detecting signal quality to the signal-quality detection unit 204r. The signal-quality detection unit 204r receives the signal quality detection instruction signal and sets the flag to "ON".

The transmission-mode-candidate transmission unit 101r of the optical transmission device 1r performs the same processing as the processing performed by the transmission-mode-candidate transmission unit 101t of the optical transmission device 1t of the transmission-side system T when superimposing the transmission-side transmission mode candidate information on the pilot tone signal and transmitting the transmission-side transmission mode candidate information in step ST1. That is, the transmission-mode-candidate transmission unit 101r of the optical transmission device 1r superimposes the reception-side transmission mode candidate information of the optical reception device 2r on the pilot tone signal and transmits the reception-side transmission mode candidate information to the optical reception device 2t via the optical transmission line 3.

(Processing in Step SR3 of Optical Reception Device 2r)

The transmission-mode selection unit 203r of the optical reception device 2r of the reception-side system R extracts transmission mode numbers common in all the transmission mode numbers stored in the item of "transmission mode" of the reception-side transmission mode information table 2001r stored by the transmission-mode-information storage unit 200r and the transmission-side transmission mode candidate information of the optical transmission device 1t received from the transmission-mode-candidate reception unit 201r. The transmission-mode selection unit 203r selects a transmission mode number having the highest priority among the extracted common transmission mode numbers.

In the transmission-side transmission mode information table 1001t shown in FIG. 8 and the reception-side transmission mode information table 2001r shown in FIG. 11, the common transmission mode information is "mode 1", "mode 5", "mode 9", and "mode 13". When the priority sets the level of a multi-value degree of a modulation scheme as first priority and sets the level of a baud rate as second priority, the transmission-mode selection unit 203r selects the "mode 13" including a 16QAM modulation scheme having the highest multi-value degree out of the "mode 1", the "mode 5", the "mode 9", and the "mode 13".

The transmission-mode selection unit 203r writes the "mode 13", which is the selected transmission mode number, in the storage region on the inside and causes the storage region to store the "mode 13". The transmission-mode selection unit 203r reads transmission mode information corresponding to the selected transmission mode number "mode 13" from the reception-side transmission mode information table 2001r of the transmission-mode-information storage unit 200r. The transmission-mode selection unit 203r reads "16QAM", which is information indicating a modulation scheme in the item of "modulation scheme" of the read-out transmission mode information, a value "32 GBaud" of a baud rate in the item of "baud rate", and information "RS+LDPC" indicating an error correction encoding scheme in the item of "error correction code type".

The transmission-mode selection unit 203r generates a modulation scheme signal including the read-out information "16QAM" indicating the modulation scheme and outputs the modulation scheme signal to the main-signal demodulation units 24r-1 and 24r-2. The transmission-mode selection unit 203r generates a baud rate control signal including the read-out value "32 GBaud" of the baud rate and outputs the baud rate control signal to the clock control unit 27r. The transmission-mode selection unit 203r outputs an error correction code designation signal including the read-out information "RS+LDPC" indicating the error correction encoding scheme to the error-correction decoding unit 25r.

Consequently, the transmission mode selected by the transmission-mode selection unit 203r, that is, the main-signal demodulation units 24r-1 and 24r-2 perform demodulation in the modulation scheme of 16QAM. A clock of the optical reception device 2r set by the clock control unit 27r operates at a clock frequency for setting the baud rate to "32 GBaud". The error-correction decoding unit 25r performs error correction decoding in the scheme of "RS+LDPC".

(Processing in Step ST2 of Optical Transmission Device 10

The transmission-mode-candidate reception unit 201t of the optical reception device 2t of the transmission-side system T performs the same processing as the processing performed by the transmission-mode-candidate reception unit 201r of the optical reception device 2r of the reception-side system R explained above when receiving the pilot tone signal superimposed with the transmission-side transmission mode candidate information and acquiring the transmission-side transmission mode candidate information in step SR1. That is, the transmission-mode-candidate reception unit 201t of the optical reception device 2t of the transmission-side system T receives a pilot tone signal transmitted by the optical transmission device 1r and acquires reception-side transmission mode candidate information of the optical reception device 2r superimposed on the pilot tone signal.

The transmission-mode-candidate reception unit 201t of the optical reception device 2t of the transmission-side system T transmits the acquired reception-side transmission mode candidate information of the optical reception device 2r to the transmission-mode-candidate reception unit 102t of the optical transmission device 1t. The transmission-mode-candidate reception unit 102t of the optical transmission device 1t receives the reception-side transmission mode candidate information of the optical reception device 2r. The transmission-mode-candidate reception unit 102t of the optical transmission device 1t outputs the received reception-side transmission mode candidate information of the optical reception device 2r of the reception-side system R to the transmission-mode selection unit 103t.

(Processing in Step ST3 of Optical Transmission Device 10

The transmission-mode selection unit 103t extracts transmission mode numbers common in all the transmission mode numbers stored in the item of "transmission mode" of the transmission-side transmission mode information table 1001t stored by the transmission-mode-information storage unit 100t and the reception-side transmission mode candidate information of the optical reception device 2r received from the transmission-mode-candidate reception unit 102t.

The transmission-mode selection unit 103t selects a transmission mode number having the highest priority among the extracted common transmission mode number. Note that, as explained above, the priority serving as the reference in the selection by the transmission-mode selection unit 103t is the same as the priority of the transmission-mode selection unit 203r of the optical reception device 2r. Therefore, in step SR3, the transmission-mode selection unit 103t selects the same transmission mode number "mode 13" as the transmission mode number selected by the transmission-mode selection unit 203r of the optical reception device 2r. The transmission-mode selection unit 103t writes the "mode 13", which is the selected transmission mode number, in the storage region on the inside and causes the storage region to store the "mode 13".

The transmission-mode selection unit 103t reads transmission mode information corresponding to the selected transmission mode number "mode 13" from the transmission-side transmission mode information table 1001t of the transmission-mode-information storage unit 100t. The transmission-mode selection unit 103t reads the information "16QAM" indicating the modulation scheme in the item of "modulation scheme", the value "32 GBaud" of the baud rate in the item of "baud rate", and the information "RS+LDPC" indicating the error correction encoding scheme in the item of "error correction code type" of the read-out transmission mode information. The transmission-mode selection unit 103t generates a modulation scheme signal including the read-out information "16QAM" indicating the modulation scheme and outputs the modulation scheme signal to the main-signal modulation units 13t-1 and 13t-2. The transmission-mode selection unit 103t generates a baud rate control signal including the read-out value "32 GBaud" of the baud rate and outputs the baud rate control signal to the clock control unit 17t. The transmission-mode selection unit 103t outputs an error correction code designation signal including the read-out information "RS+LDPC" indicating the error correction encoding scheme to the error-correction encoding unit 12t.

Consequently, the transmission mode selected by the transmission-mode selection unit 103t, that is, the main-signal modulation units 13t-1 and 13t-2 perform modulation in the modulation scheme of 16QAM. A clock of the optical transmission device 1t set by the clock control unit 17t operates at a clock frequency for setting the baud rate to "32 GBaud". The error-correction encoding unit 12t performs error correction encoding in the scheme of "RS+LDPC".

(Processing in Step ST4 of Optical Transmission Device it)

The signal transmission unit 110t of the optical transmission device 1t of the transmission-side system T generates a main signal. That is, in the signal transmission unit 110t, the framing unit 11t captures a client signal, writes the captured client signal in the payload portion 42 of the OTN frame 40, writes information or the like used for monitoring in the overhead portion 41, and outputs a signal frame to the error-correction encoding unit 12t. The error-correction encoding unit 12t performs, on the signal frame output by the framing unit 11t, encoding in the error correction encoding scheme of "RS+LDPC" indicated by the error correction code designation signal received from the transmission-mode selection unit 103t and generates an error correction code. The error-correction encoding unit 12t writes the generated error correction code in the error correction code portion 43 of the OTN frame 40 and outputs the OTN frame 40 to the main-signal modulation units 13t-1 and 13t-2.

The respective main-signal modulation units 13t-1 and 13t-2 modulate, according to the modulation scheme "16QAM" indicated by the modulation scheme signal received from the transmission-mode selection unit 103t, main signals output by the error-correction encoding unit 12t, that is, a main signal for X polarization and a main signal for Y polarization respectively corresponding to the main-signal modulation units 13*t*-1 and 13*t*-2. The main-signal modulation units 13*t*-1 and 13*t*-2 generate transmission symbol sequences through the modulation and output the generated transmission symbol sequences to the multiplexing units 14*t*-1 and 14*t*-2 respectively connected to the main-signal modulation units 13*t*-1 and 13*t*-2. The multiplexing units 14*t*-1 and 14*t*-2 time-division multiplex the transmission symbol sequences of the main signals and control information. The electro-optic conversion units 15*t*-1 and 15*t*-2 convert electric signals output by the multiplexing units 14*t*-1 and 14*t*-2 into optical signals. The polarization multiplexing unit 16*t* polarization-multiplexes the optical signals and sends the optical signals to the optical transmission line 3.

(Processing in Step SR4 of Optical Reception Device 2*r*)

The polarization separation unit 21*r* of the optical reception device 2*r* of the reception-side system R receives signal light including a main signal transmitted by the optical transmission line 3. The polarization separation unit 21*r* performs polarization separation on the received signal light in an optical region, separates the signal light into two orthogonal X polarization and Y polarization, and outputs the separated X polarization and Y polarization respectively to the photoelectric conversion units 22*r*-1 and 22*r*-2. The respective photoelectric conversion units 22*r*-1 and 22*r*-2 capture signal light of the X polarization and the Y polarization output from the polarization separation unit 21*r*, convert the signal light into electric analog signals, and output the converted electric analog signals to the AD conversion units 23*r*-1 and 23*r*-2 respectively corresponding to the photoelectric conversion units 22*r*-1 and 22*r*-2.

The AD conversion units 23*r*-1 and 23*r*-2 convert the electric analog signals output by the photoelectric conversion units 22*r*-1 and 22*r*-2 respectively connected to the AD conversion units 23*r*-1 and 23*r*-2 into digital signals and generate digital reception signals. The AD conversion units 23*r*-1 and 23*r*-2 output the generated digital reception signals to the main-signal demodulation units 24*r*-1 and 24*r*-2 respectively connected to the AD conversion units 23*r*-1 and 23*r*-2. The AD conversion units 23*r*-1 and 23*r*-2 output the generated digital reception signals to the control-information detection unit 211*r* and the control-information extraction units 212*r*-1 and 212-*r*-2 of the control-information demodulation unit 210*r*.

Since the flag is "ON", the signal-quality detection unit 204*r* detects signal quality, for example, an SN ratio obtained from the intensity of specific frequencies of the digital reception signals using a pilot tone signal. The signal-quality detection unit 204*r* outputs information indicating the detected signal quality, that is, a value of the detected SN ratio to the signal-quality determination unit 205*r* and sets the flag to "OFF".

(Processing in Steps SR5, SR6, and SR7 of Optical Reception Device 2*r*)

The signal-quality determination unit 205*r* of the optical reception device 2*r* determines, based on the information indicating the signal quality detected by the signal-quality detection unit 204*r* and a predetermined threshold, whether the signal quality is permissible quality (step SR5). For example, when the information indicating the signal quality is an SN ratio and a value of the SN ratio is equal to or larger than the threshold, the signal-quality determination unit 205*r* determines that the signal quality is the permissible quality (step SR5: Yes). When determining that the signal quality is the permissible quality, the signal-quality determination unit 205*r* transmits a notification signal of a signal quality permission notification to the optical transmission device 1*r* and outputs the notification signal of the signal quality permission notification to the transmission-mode selection unit 203*r* (step SR6).

On the other hand, when the value of the SN ratio is smaller than the threshold, the signal-quality determination unit 205*r* determines that the signal quality is non-permissible quality (step SR5: No). When determining that the signal quality is the non-permissible quality, the signal-quality determination unit 205*r* transmits a notification signal of a signal quality non-permission notification to the optical transmission device 1*r* and outputs the notification signal of the signal quality non-permission notification to the transmission-mode selection unit 203*r* (step SR7).

When receiving the notification signal of the signal quality permission notification from the signal-quality determination unit 205*r*, the transmission-mode selection unit 203*r* of the optical reception device 2*r* determines, as transmission mode information used in operation, transmission mode information selected at that point in time and ends the processing.

On the other hand, when receiving the notification signal of the signal quality non-permission notification from the signal-quality determination unit 205*r*, the transmission-mode selection unit 203*r* of the optical reception device 2*r* performs processing in step SR3 and subsequent steps. In step SR3, the transmission-mode selection unit 203*r* selects, out of the common transmission mode information, "mode 9", which is a transmission mode number of transmission mode information having second highest priority following the transmission mode information selected at that point in time.

(Processing in Steps ST5 and ST6 of Optical Transmission Device 10

The transmission-mode selection unit 103*t* of the optical transmission device 1*t* receives a notification signal from the signal-quality determination unit 205*r* of the optical reception device 2*r* (step ST5). Specifically, the transmission-mode selection unit 103*t* of the optical transmission device 1*t* receives a notification signal output from the signal-quality determination unit 205*r* of the optical reception device 2*r* and transmitted from the optical transmission device 1*r* of the reception-side system R to the optical reception device 2*t* inline. The transmission-mode selection unit 103*t* determines whether the received notification signal is a signal quality permission notification (step ST6). When determining that the received notification signal is the signal quality permission notification (step ST6: Yes), the transmission-mode selection unit 103*t* determines, as transmission mode information used in operation, transmission mode information selected at that point in time and ends the processing.

On the other hand, when the received communication signal is not the signal quality permission notification, that is, the received communication signal is a signal quality non-permission notification (step ST6: No), the transmission-mode selection unit 103*t* of the optical transmission device 1*t* performs processing in step ST3 and subsequent steps. In step ST3, the transmission-mode selection unit 103*t* selects, out of the common transmission mode information, "mode 9", which is a transmission mode number of transmission mode information having second highest priority following transmission mode information selected at that point in time.

With the configuration in the first embodiment explained above, in the optical transmission system S, the transmission-mode selection units 103*t* and 203*r* selects transmission mode information in descending order of priority out of transmission mode information, which is combinations of a plurality of parameters concerning transmission performance and is a plurality of kinds of transmission mode information common to transmission performance of the optical transmission device 1*t* and the optical reception device 2*r*. The signal transmission unit 110*t* of the optical transmission device 1*t* transmits, via the optical transmission line 3, a signal modulated based on the transmission mode information selected by the transmission-mode selection unit 103*t*. The signal reception unit 220*r* of the optical reception device 2*r* receives the signal transmitted by the optical transmission line 3 and demodulates the received signal based on the transmission mode information selected by the transmission-mode selection unit 203*r*. The signal-quality detection unit 204*r* of the optical reception device 2*r* detects signal quality of the signal received by the signal reception unit 220*r*. The signal-quality determination unit 205*r* of the optical reception device 2*r* determines, based on information indicating the signal quality detected by the signal-quality detection unit 204*r*, whether the signal quality of the signal is permissible. When the signal-quality determination unit 205*r* determines that the signal quality of the signal is non-permissible, the transmission-mode selection units 103*t* and 203*r* select transmission mode information having second highest priority.

Consequently, the optical transmission device 1*t* of the transmission-side system T and the optical reception device 2*r* of the reception-side system R can select transmission mode information having high priority and high signal quality out of a plurality of kinds of transmission mode information common to the optical transmission device 1*t* and the optical reception device 2*r* and start operation by a transmission mode indicated by the selected transmission mode information. As explained above, modulation schemes increase and the baud rate becomes variable according to improvement of functions of digital signal processing (DSP) for optical transmission. Therefore, an occupied frequency band is variously different depending on a transmission mode. Further, since the parameter of the error correction code type is added, transmission modes are diversified. The optical transmission system S makes it possible to select an optimum transmission mode out of such diversified transmission modes.

In other words, in the configuration in the first embodiment, the optical transmission device 1*t* transmits a list of transmission mode numbers indicating transmission mode information of the own device to the optical reception device 2*r* according to operation by the user or at timing of a start. When receiving the list of the transmission mode numbers from the optical transmission device 1*t*, the optical reception device 2*r* transmits, to the optical transmission device 1*t*, a list of transmission mode numbers indicating transmission mode information of the own device. The optical transmission device 1*t* and the optical reception device 2*r* exchange the lists of the transmission mode numbers indicating the transmission mode information of the optical transmission device 1*t* and the optical reception device 2*r* each other. When the exchange ends, the optical transmission device 1*t* and the optical reception device 2*r* select, out of the common transmission modes, on condition that signal quality is satisfied, a transmission mode including a modulation scheme having a higher multi-value degree and a higher baud rate, and an error correction code type matching between transmission and reception. A flow of this processing is a so-called auto negotiation processing procedure. In the first embodiment, the procedure makes it possible to establish a link in an optimum transmission mode.

In the configuration in the first embodiment explained above, when the transmission-side transmission mode candidate information of the optical transmission device 1*t* is transmitted from the optical transmission device 1*t* of the transmission-side system T to the optical reception device 2*r* of the reception-side system R and when the reception-side transmission mode candidate information of the optical reception device 2*r* is transmitted from the optical transmission device 1*r* of the reception-side system R to the optical reception device 2*t* of the transmission-side system T, a pilot tone signal that can perform transmission and reception even in a state in which a modulation scheme is not successfully identified is used. Accordingly, even if preprocessing for, for example, determining modulation schemes on the transmission side and the reception side in advance is not performed, for example, in a state in which a device other than the optical transmission device 1*t* is started, it is possible to start the processing shown in FIG. 14 simultaneously with the start of the optical transmission device 1*t*.

Note that, as the premise of the processing shown in FIG. 14 explained above, the same transmission mode is selected between the optical reception device 2*t* and the optical transmission device 1*r* in the other opposed relation. However, this premise is not an essential precondition. The optical transmission device 1*r* and the optical reception device 2*t* perform the processing in FIG. 14 in parallel to the optical transmission device 1*t* and the optical reception device 2*r* performing the processing in FIG. 14 such that the present invention can be applied even when transmission mode in an uplink and a downlink are different. Consequently, it is possible to perform the processing for selecting an optimum transmission mode between the optical transmission device 1*r* and the optical reception device 2*t* in parallel to processing in which the optical transmission device 1*t* and the optical reception device 2*r* perform the processing for selecting an optimum transmission mode.

Figure 15:
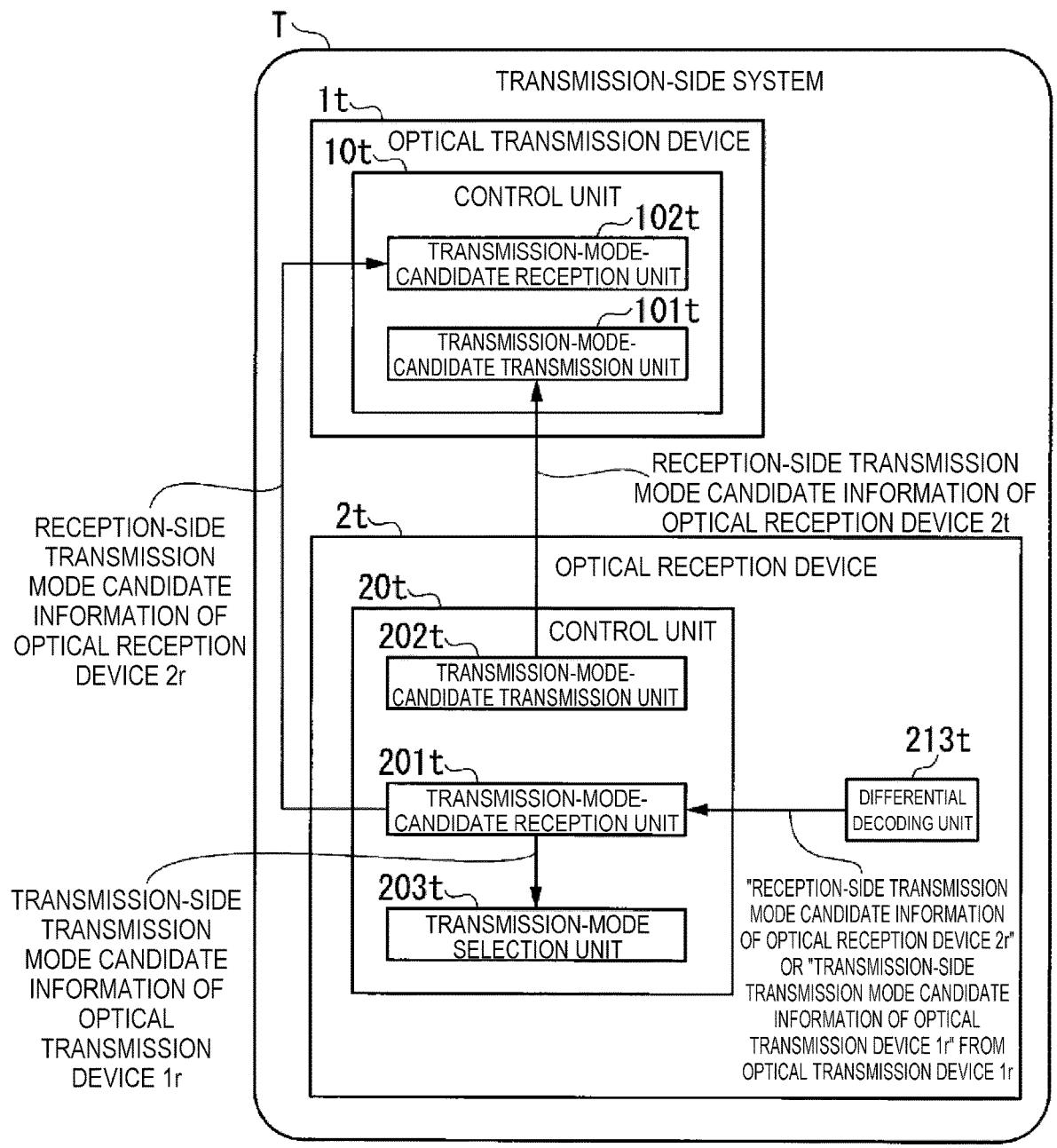
FIG. 15 is a diagram (No. 2) showing the connection relation between the optical transmission device and the optical reception device in the transmission-side system in the first embodiment.

In this case, a connection relation between the optical transmission device 1*t* and the optical reception device 2*t* of the transmission-side system T is a relation shown in FIG. 15. In FIG. 13, which is the configuration in the case in which selection of a transmission mode is already completed between the optical reception device 2*t* and the optical transmission device 1*r*, the differential decoding unit 213*t* of the optical reception device 2*t* outputs only a differentially decoded signal including "reception-side transmission mode candidate information of the optical reception device 2*r*". On the other hand, when the processing shown in FIG. 14 by the optical transmission device 1*r* and the optical reception device 2*t* is performed in parallel, the differential decoding unit 213*t* of the optical reception device 2*t* further outputs a differentially decoded signal including "transmission-side transmission mode candidate information of the optical transmission device 1*r*". Accordingly, the transmission-mode-candidate reception unit 201*t* of a control unit 20*t* in the optical reception device 2*t* needs to branch the processing based on content of information included in the differentially decoded signal output by the differential decoding unit 213*t*.

When the transmission-mode-candidate reception unit 201*t* demodulates the differentially decoded signal output by the differential decoding unit 213*t* and acquires the "transmission-side transmission mode candidate information of the optical transmission device 1*r*", the transmission-mode-candidate reception unit 201*t* outputs the acquired information to the transmission-mode selection unit 203*t*. On the other hand, when the transmission-mode-candidate reception unit 201t demodulates the differentially decoded signal output by the differential decoding unit 213t and acquires the "reception-side transmission mode candidate information of the optical reception device 2r", the transmission-mode-candidate reception unit 201t outputs the acquired information to the transmission-mode-candidate reception unit 102t of the optical transmission device 1t.

In order to transmit "reception-side transmission mode candidate information of the optical reception device 2r" to the optical transmission device 1r of the reception-side system R, as shown in FIG. 15, a transmission-mode-candidate transmission unit 202t of the optical reception device 2t transmits the "reception-side transmission mode candidate information of the optical reception device 2r" to the transmission-mode-candidate transmission unit 101t of the optical transmission device 1t.

Figure 16:
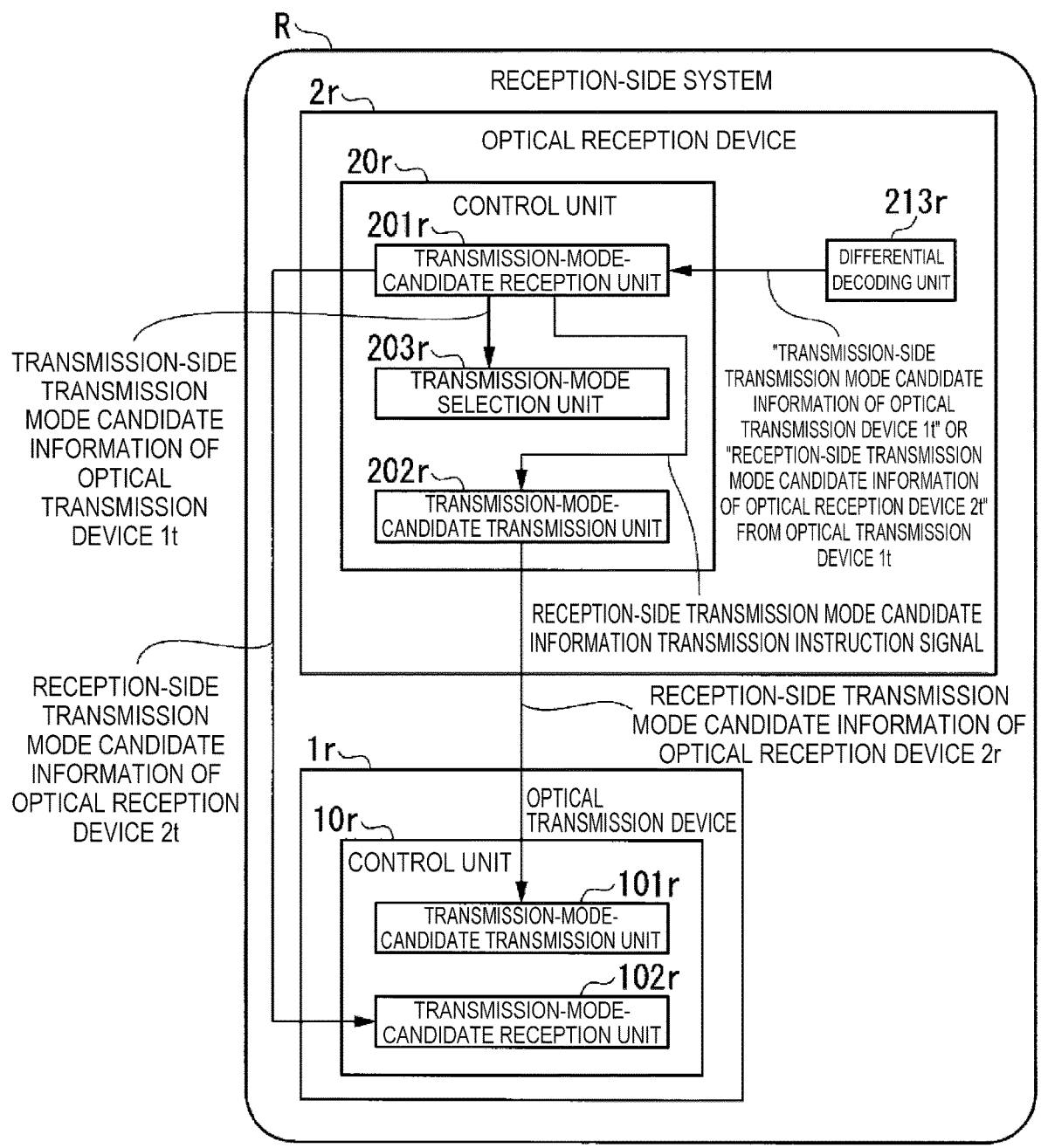
FIG. 16 is a diagram (No. 2) showing the connection relation between the optical reception device and the optical transmission device in the reception-side system in the first embodiment.

A connection relation between the optical reception device 2r and the optical transmission device 1r of the reception-side system R is a relation shown in FIG. 16. In FIG. 12, which is the configuration in the case in which selection of a transmission mode is already completed between the optical reception device 2t and the optical transmission device 1r, the differential decoding unit 213r of the optical reception device 2r outputs only a differentially decoded signal including the "transmission-side transmission mode candidate information of the optical transmission device 1t". On the other hand, when the processing shown in FIG. 14 by the optical transmission device 1r and the optical reception device 2t is performed in parallel, the differential decoding unit 213r of the optical reception device 2r further outputs a differentially decoded signal including the "reception-side transmission mode candidate information of the optical reception device 2t". Accordingly, the transmission-mode-candidate reception unit 201r of the control unit 20r needs to branch the processing based on content of information included in the differentially decoded signal output by the differential decoding unit 213r.

When the transmission-mode-candidate reception unit 201r demodulates the differentially decoded signal output by the differential decoding unit 213r and acquires the "transmission-side transmission mode candidate information of the optical transmission device 1t", the transmission-mode-candidate reception unit 201r outputs the acquired information to the transmission mode selection unit 203r. On the other hand, when the transmission-mode-candidate reception unit 201r demodulates the differentially decoded signal output by the differential decoding unit 213r and acquires the "reception-side transmission mode candidate information of the optical reception device 2t", the transmission-mode-candidate reception unit 201r outputs the acquired information to a transmission-mode-candidate reception unit 102r of the optical transmission device 1r.

As explained above, the processing shown in FIG. 14 needs to be performed in parallel between the optical transmission device 1t and the optical reception device 2r and between the optical transmission device 1r and the optical reception device 2t when the transmission mode of the optical transmission device 1t and the optical reception device 2r and transmission mode of the optical transmission device 1r and the optical reception device 2t are different. On the other hand, for example, when the optical transmission device 1t and the optical reception device 2t of the transmission-side system T are integrally configured and types of transmission modes that can be transmitted coincide and the optical reception device 2r and the optical transmission device 1r of the reception-side system R are integrally configured and types of transmission modes that can be transmitted coincide, the processing shown in FIG. 14 does not need to be performed in parallel. This is because optimum transmission modes between the optical transmission device 1t and the optical reception device 2r and between the optical transmission device 1r and the optical reception device 2t can be simultaneously selected by only the processing shown in FIG. 14 by the optical transmission device 1t of the transmission-side system T and the optical reception device 2r of the reception-side system R. However, this is based on the premise that there is no great difference between transmission quality of a path from the transmission-side system T to the reception-side system R of the optical transmission line 3 and transmission quality of a path from the reception-side system R to the transmission-side system T. This is because, when the transmission quality of the path from the reception-side system R to the transmission-side system T is greatly inferior to the transmission quality of the path from the transmission-side system T to the reception-side system R, it is likely that transmission from the optical transmission device 1r to the optical reception device 2t cannot be normally performed in the transmission mode selected by the optical transmission device 1t and the optical reception device 2r. Note that, after the processing in step SR6 of the optical reception device 2r of the reception-side system R shown in FIG. 14, the optical transmission device 1r of the reception-side system R may transmit a response signal indicating that the transmission mode selection processing is completed with a transmission mode finally selected. When the response signal is successfully received by the optical reception device 2t of the transmission-side system T, the reception-side system R and the transmission-side system T may shift to the normal operation state. "Transmission quality" indicates an OSNR at the time when the reception-side system R receives a signal.

(Other Configuration Examples of First Embodiment)

Figure 17:
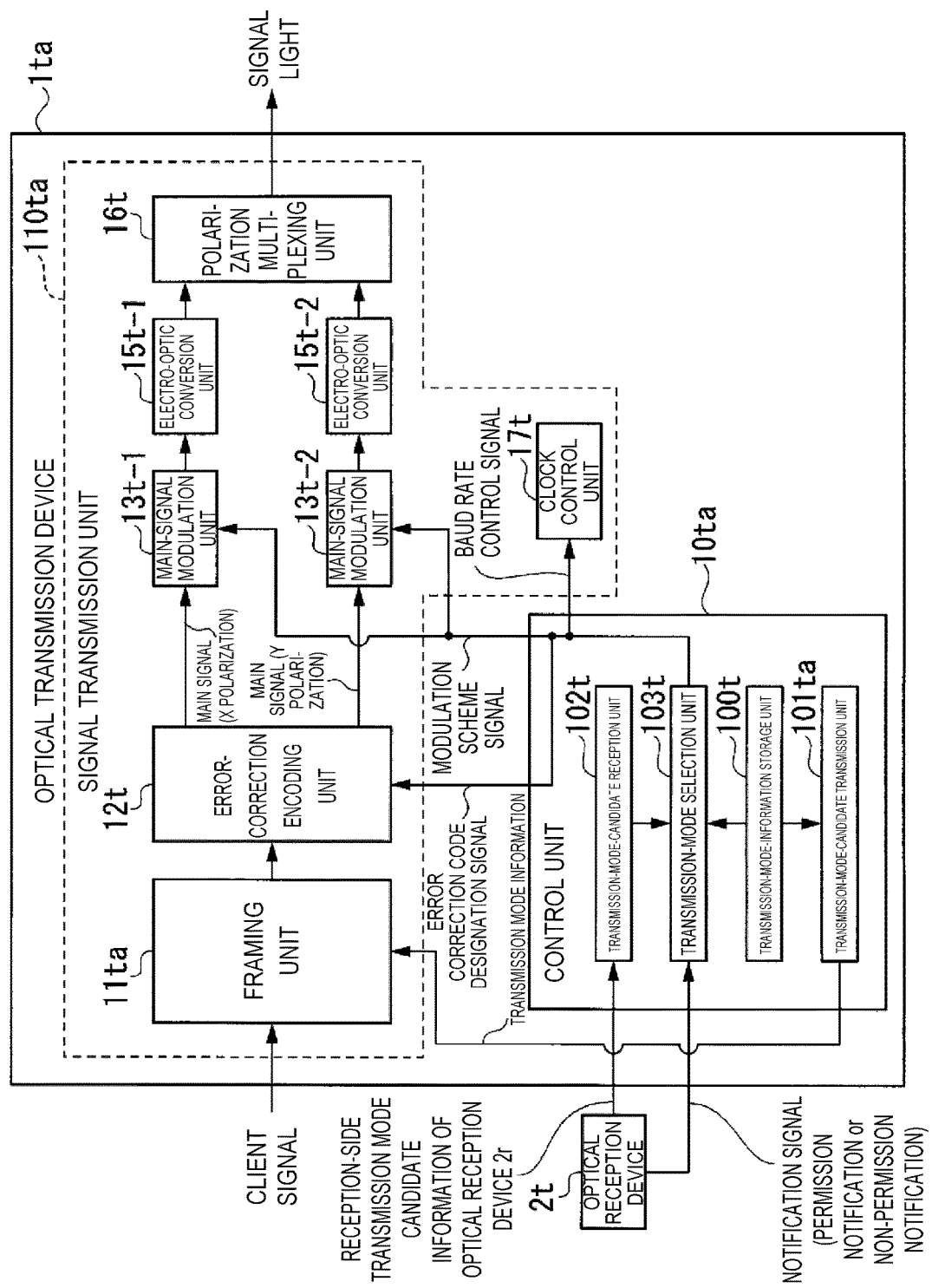
FIG. 17 is a block diagram showing an internal configuration and a connection relation with other devices of an optical transmission device in another configuration example in the first embodiment.
Figure 18:
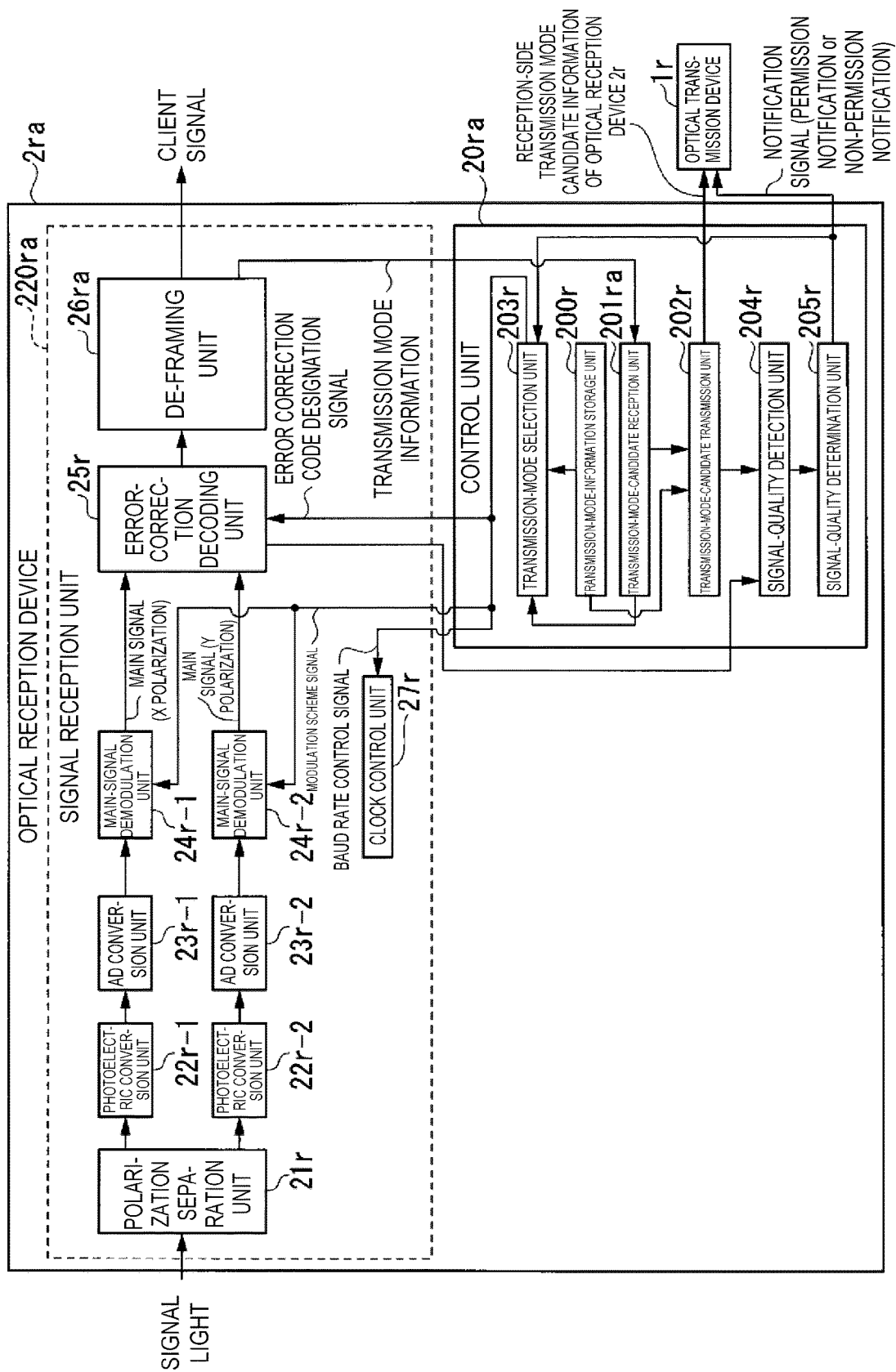
FIG. 18 is a block diagram showing an internal configuration and a connection relation with other devices of an optical reception device in another configuration example in the first embodiment.

In the optical transmission system S in the first embodiment, the optical transmission device 1t of the transmission-side system T may be replaced with an optical transmission device 1ta shown in FIG. 17 and the optical reception device 2r of the reception-side system R may be replaced with an optical reception device 2ra shown in FIG. 18.

In the optical transmission device 1ta shown in FIG. 17, the same components as the components of the optical transmission device 1t are denoted by the same reference numerals and signs. Components different from the components of the optical transmission device 1t are explained below. The optical transmission device 1ta does not include the control-information modulation unit 18t and the multiplexing units 14t-1 and 14t-2 included in the optical transmission device 1t. The optical transmission device 1ta includes a framing unit 11ta instead of the framing unit 11t and includes a control unit 10ta instead of the control unit 10t. The control unit 10ta includes a transmission-mode-candidate transmission unit 101ta instead of the transmission-mode-candidate transmission unit 101t.

Note that, in FIG. 17, a component including the framing unit 11ta, the error-correction encoding unit 12t, the main-signal modulation units 13t-1 and 13t-2, the electro-optic conversion units 15t-1 and 15t-2, the polarization multiplexing unit 16t, and the clock control unit 17t is referred to as a signal transmission unit 110ta.

The overhead portion 41 of the OTN frame 40 shown in FIG. 3 includes fields of RES (Reserved) in two parts indicated by signs 410 and 411. The RESs 410 and 411 are reservation fields used for standardization in future. The transmission-mode-candidate transmission unit 101ta outputs, to the framing unit 11ta, transmission-side transmission mode candidate information of the optical transmission device 1ta transmitted to the optical reception device 2ra. When forming the OTN frame 40 and writing information or the like used for monitoring in the overhead portion 41, the framing unit 11ta writes, in the fields of the RESs 410 and 411, transmission-side transmission mode candidate information of the optical transmission device 1ta output by the transmission-mode-candidate transmission unit 101ta. Consequently, the transmission-side transmission mode candidate information of the optical transmission device 1ta is transmitted to the optical reception device 2ra via the optical transmission line 3 as a part of a main signal.

In the optical reception device 2ra shown in FIG. 18, the same components as the components of the optical reception device 2r are denoted by the same reference numerals and signs. Components different from the components of the optical reception device 2r are explained below. The optical reception device 2ra does not include the control-information demodulation unit 210r included in the optical reception device 2r. The optical reception device 2ra includes a de-framing unit 26ra instead of the de-framing unit 26r and includes a control unit 20ra instead of the control unit 20r. The control unit 20ra includes a transmission-mode-candidate reception unit 201ra instead of the transmission-mode-candidate reception unit 201r.

Note that, in FIG. 18, a component including the polarization separation unit 21r, the photoelectric conversion units 22r-1 and 22r-2, the AD conversion units 23r-1 and 23r-2, main-signal demodulation units 24r-1 and 24r-2, the error-correction decoding unit 25r, the de-framing unit 26ra, and the clock control unit 27r is referred to as a signal reception unit 220ra.

When capturing the error-corrected OTN frame 40 output by the error-correction decoding unit 25r, the de-framing unit 26ra reads a client signal from the payload portion 42 of the OTN frame 40 and outputs the read-out client signal to the IP-based device connected to the optical reception device 2r. The de-framing unit 26ra reads the transmission-side transmission mode candidate information of the optical transmission device 1ta written in the fields of the RESs 410 and 411 of the overhead portion 41 of the OTN frame 40.

The de-framing unit 26ra outputs the read-out transmission-side transmission mode candidate information of the optical transmission device 1ta to the transmission-mode-candidate reception unit 201ra. Consequently, the transmission-mode-candidate reception unit 201ra of the optical reception device 2ra can acquire the transmission-side transmission mode candidate information of the optical transmission device 1ta transmitted by the optical transmission device 1ta.

The transmission-mode-candidate reception unit 201ra outputs the acquired transmission-side transmission mode candidate information to the transmission-mode selection unit 203r. When acquiring the transmission-side transmission mode candidate information, the transmission-mode-candidate reception unit 201ra outputs, to the transmission-mode-candidate transmission unit 202r, a reception-side transmission mode candidate information transmission instruction signal for transmitting reception-side transmission mode candidate information.

As explained above, when information is transmitted using the fields of the RESs 410 and 411 of the OTN frame 40, unlike when the pilot tone signal is used, the information cannot be demodulated and acquired on the reception side in a state in which a modulation scheme on the transmission side cannot be recognized on the reception side. Accordingly, in the optical transmission device 1ta and the optical reception device 2ra, for example, it is necessary to determine, in advance, an initial value of a transmission mode automatically set at start. For example, the transmission mode with the mode number "mode 1" having the lowest multi-value degree and the lowest baud rate is determined as the initial value in advance. When the optical transmission device 1ta transmits a main signal modulated based on the transmission mode "mode 1" of the initial value to the optical reception device 2ra, the optical reception device 2ra can demodulate the main signal received based on the transmission mode "mode 1" of the initial value and acquire information.

When information is transmitted using the fields of the RESs 410 and 411 of the OTN frame 40, unlike when the pilot tone signal is used, electric power does not concentrate on specific frequencies. Accordingly, the signal-quality detection unit 204r cannot set an SN ratio obtained from the intensity of signals having the specific frequencies or the intensity itself as a detection target of signal quality. Therefore, in the other configuration example, the signal-quality detection unit 204r detects, as information indicating signal quality, a bit error rate (BER) obtained in the error-correction decoding unit 25r. The optical transmission device 1ta and the optical reception device 2ra can be configured the same as the optical transmission device 1t shown in FIG. 2 and the optical reception device 2r shown in FIG. 9 that use the pilot tone signal. An OSNR obtained from the pilot tone signal can be detected as information indicating signal quality. The fields of the RESs 410 and 411 can be used for transmission of transmission mode information.

In the optical transmission system S shown in FIG. 1, when the optical transmission device 1t of the transmission-side system T is replaced with the optical transmission device 1ta shown in FIG. 17 and the optical reception device 2r of the reception-side system R is replaced with the optical reception device 2ra shown in FIG. 18, in transmission from the optical transmission device 1r to the optical reception device 2t in the other opposed relation, information is transmitted by the pilot tone signal. Accordingly, both of the transmission and reception using the fields of the RESs 410 and 411 of the OTN frame 40 and the transmission and reception by the pilot tone signal are concurrently used. Conversely, in the configuration shown in FIG. 1, the optical transmission device 1t and the optical reception device 2r may be kept as the configurations that use the pilot tone signal and the optical transmission device 1r and the optical reception device 2t in the other opposed relation may be replaced with the configurations that use the fields of the RESs 410 and 411 of the OTN frame 40.

In the optical transmission system S shown in FIG. 1, the optical reception device 2t of the transmission-side system T and the optical transmission device 1r of the reception-side system R may be replaced with devices having the configurations of the optical reception device 2ra and the optical transmission device 1ta that transmit and receive the transmission side and reception-side transmission mode candidate information using the OTN frame 40 explained above. With such a configuration, all transmission and reception of the transmission-side and reception-side transmission mode candidate information between the optical transmission device 1ta and the optical reception device 2ra and between the optical transmission device 1ra and the optical reception device 2ta are performed using the fields of the RESs 410 and 411 of the OTN frame 40.

An optical transmission device including both of the configuration of the optical transmission device 1*t* and the configuration of the optical transmission device 1*ta* and an optical reception device including both of the configuration of the optical reception device 2*r* and the configuration of the optical reception device 2*ra* may be applied. Consequently, the transmission-side transmission mode candidate information and the reception-side transmission mode candidate information can be transmitted using two systems of the pilot tone signal and the fields of the RESs 410 and 411 of the OTN frame 40. Therefore, reliability can be improved. In addition to improving the reliability, it is also possible to adopt a flexible embodiment of using the pilot tone signal in order to detect an OSNR as information indicating signal quality and using the fields of the RESs 410 and 411 of the OTN frame 40 for transmission of transmission mode information.

Note that, in the configuration in the first embodiment explained above, the signal-quality determination unit 205*r* of the optical reception device 2*r* transmits the notification signal to the transmission-mode selection unit 103*t* of the optical transmission device 1*t* inline. However, the configuration of the present invention is not limited to the embodiment. The notification signal may be transmitted from the optical reception device 2*r* to the optical transmission device 1*t* using the optical transmission device 1*r* of the reception-side system R and the optical reception device 2*t* of the transmission-side system T.

Second Embodiment

Figure 19:
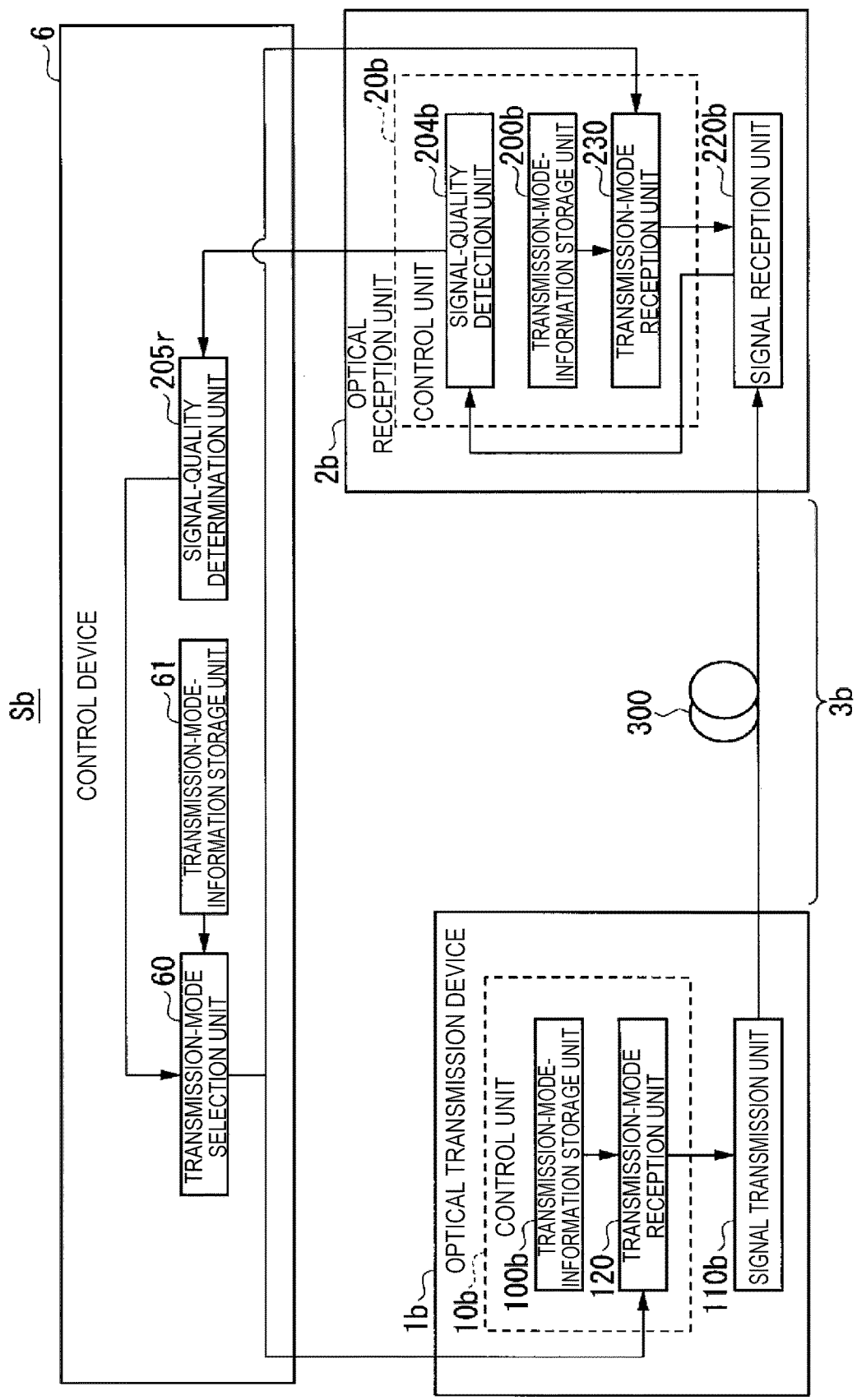
FIG. 19 is a block diagram showing a configuration of an optical transmission system in a second embodiment.

FIG. 19 is a block diagram showing a configuration of an optical transmission system Sb in a second embodiment. In the second embodiment, the same components as the components in the first embodiment are denoted by the same reference numerals and signs. Components different from the components in the first embodiment are explained below. The optical transmission system Sb includes an optical transmission device 1*b*, an optical reception device 2*b*, an optical transmission line 3*b*, and a control device (control apparatus) 6. The optical transmission line 3*b* includes the optical fiber 300 and transmits signal light output by the optical transmission device 1*b* to the optical reception device 2*b*. The control device 6 and the optical transmission device 1*b* are connected and the control device 6 and the optical reception device 2*b* are connected by a communication line such as a leased line or the Internet.

The control device 6 is, for example, a device including an SDN (Software Defined Networking) controller and an operating system of the conventional type. The control device 6 includes a transmission-mode selection unit 60, a transmission-mode-information storage unit 61, and a signal-quality determination unit 205*r*. The transmission-mode-information storage unit 61 may store, in advance, for example, the transmission-side transmission mode information table 1001*t* shown in FIG. 8 and the reception-side transmission mode information table 2001*r* shown in FIG. 11 or may collect information from any of the optical transmission device 1*b* and the optical reception device 2*b*.

The transmission-mode selection unit 60 extracts transmission mode numbers common in the transmission-side transmission mode information table 1001*t* and the reception-side transmission mode information table 2001*r* stored by the transmission-mode-information storage unit 61. The transmission-mode selection unit 60 selects a transmission mode number having the highest priority among the extracted common transmission mode numbers. As in the first embodiment, the priority is determined in advance. For example, a transmission mode number corresponding to transmission mode information including a modulation scheme having a higher multi-value degree and a higher baud rate has higher priority.

The transmission-mode selection unit 60 includes a storage region on the inside and writes the selected transmission mode number in the storage region on the inside and causes the storage region to store the transmission mode number. The transmission-mode selection unit 60 generates a transmission mode designation signal including the selected transmission mode number and transmits the generated transmission mode designation signal to the optical transmission device 1*b* and the optical reception device 2*b*. When receiving a notification signal from the signal-quality determination unit 205*r*, when a notification included in the notification signal is a signal quality non-permission notification, the transmission-mode selection unit 60 refers to the storage region on the inside and selects a transmission mode number of transmission mode information having second highest priority following transmission mode information selected at that point in time. Note that, in the second embodiment, an output destination of the notification signal of the signal-quality determination unit 205*r* is the transmission-mode selection unit 60.

The optical transmission device 1*b* includes a signal transmission unit 110*b* and a control unit 10*b*. The signal transmission unit 110*b* is connected to the optical transmission line 3*b*. For example, the signal transmission unit 110*b* has a configuration in which the framing unit 11*ta* is replaced with the framing unit 11*t* shown in FIG. 2 in the configuration of a signal transmission unit 110*ta* shown in FIG. 17.

The control unit 10*b* includes a transmission-mode reception unit 120 and a transmission-mode-information storage unit 100*b*. The transmission-mode-information storage unit 100*b* stores, in advance, the transmission-side transmission mode information table 1001*t* shown in FIG. 8. The transmission-mode reception unit 120 receives a transmission mode designation signal transmitted by the transmission-mode selection unit 60 of the control device 6 and reads transmission mode information of a transmission mode number included in the transmission mode designation signal from the transmission-side transmission mode information table 1001*t* of the transmission-mode-information storage unit 100*b*. Based on the read-out transmission mode information, the transmission-mode reception unit 120 outputs a modulation scheme signal to the main-signal modulation units 13*t*-1 and 13*t*-2 of the signal transmission unit 110*b*, outputs an error correction code designation signal to the error-correction encoding unit 12*t*, and outputs a baud rate control signal to the clock control unit 17*t*.

The optical reception device 2*b* includes a signal reception unit 220*b* and a control unit 20*b*. The signal reception unit 220*b* is connected to the optical transmission line 3*b* and has, for example, the configuration of the signal reception unit 220*r* of the optical reception device 2*r* shown in FIG. 9.

The control unit 20*b* includes a transmission-mode reception unit 230, a transmission-mode-information storage unit 200*b*, and a signal-quality detection unit 204*b*. The transmission-mode-information storage unit 200*b* stores, in advance, the reception-side transmission mode information table 2001*r* shown in FIG. 11. The transmission-mode reception unit 230 receives a transmission mode designation signal transmitted by the transmission-mode selection unit 60 of the control device 6 and reads transmission mode information of a transmission mode number included in the transmission mode designation signal from the reception-side transmission mode information table 2001r of the transmission-mode-information storage unit 200b. Based on the read-out transmission mode information, the transmission-mode reception unit 230 outputs a modulation scheme signal to the main-signal demodulation units 24r-1 and 24r-2 of the signal reception unit 220b, outputs an error correction code designation signal to the error-correction decoding unit 25r, and outputs a baud rate control signal to the clock control unit 27r.

The signal-quality detection unit 204b detects signal quality. The signal-quality detection unit 204b outputs information indicating the detected signal quality to the signal-quality determination unit 205r.

The signal-quality detection unit 204b detects, as the information indicating the signal quality, an OSNR detected from control information using a pilot tone signal. Note that a bit error rate (BER) obtained in the error-correction decoding unit 25r may be set as the information indicating the signal quality.

Like the signal-quality detection unit 204r, the signal-quality detection unit 204b may use, as a signal quality detection method, information obtained from a measurement device such as an OTDR, an optical spectrum analyzer, or a power meter.

(Transmission Mode Selection Processing in Second Embodiment)

Figure 20:
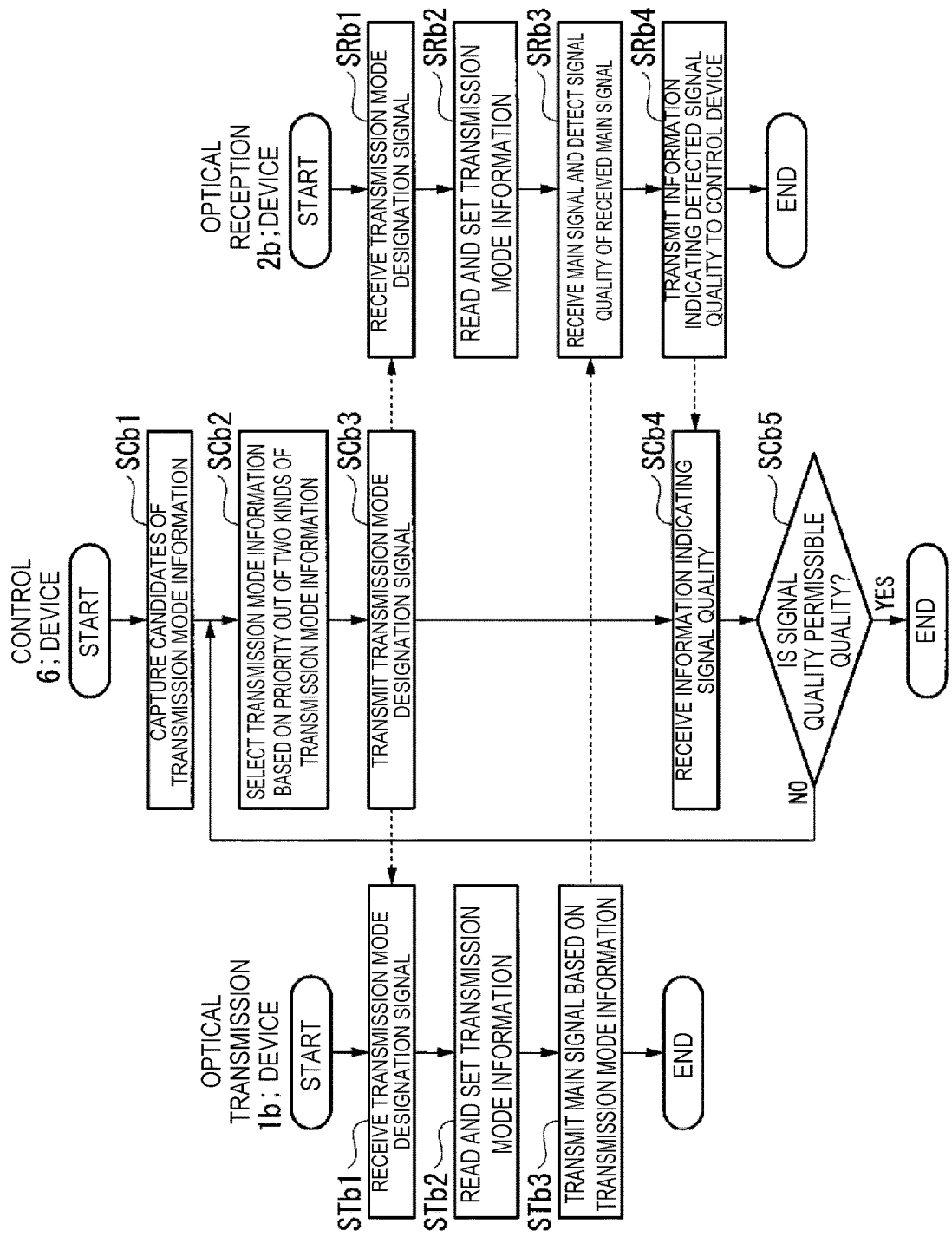
FIG. 20 is a flowchart showing a flow of transmission mode selection processing in the second embodiment.

FIG. 20 is a flowchart showing a flow of transmission mode selection processing by the optical transmission system Sb in the second embodiment. Broken line arrows indicate transmission and reception of information among the optical transmission device 1b, the control device 6, and the optical reception device 2b.

The transmission-mode selection unit 60 of the control device 6 starts the processing according to operation by a user or at timing of a start of the control device 6 or timing of connection of the optical transmission device and the optical reception device. The transmission-mode selection unit 60 reads the transmission-side transmission mode information table 1001t and the reception-side transmission mode information table 2001r from the transmission-mode-information storage unit 61 (step SCb1).

The transmission-mode selection unit 60 extracts transmission mode numbers common in the read-out transmission-side transmission mode information table 1001t and the read-out reception-side transmission mode information table 2001r. The transmission-mode selection unit 60 selects a transmission mode number having the highest priority among the extracted common transmission mode numbers and writes the selected transmission mode number in the storage region on the inside and causes the storage region to store the transmission mode number (step SCb2).

The transmission-mode selection unit 60 generates a transmission mode designation signal including the selected transmission mode number and outputs the generated transmission mode designation signal to the optical transmission device 1b and the optical reception device 2b (step SCb3). The transmission-mode reception unit 120 of the optical transmission device 1b receives the transmission mode designation signal transmitted by the transmission-mode selection unit 60 of the control device 6 (step STb1).

The transmission-mode reception unit 120 of the optical transmission device 1b reads transmission mode information corresponding to a transmission mode number included in the received transmission mode designation signal from the transmission-side transmission mode information table 1001t of the transmission-mode-information storage unit 100b. Based on the read-out transmission mode information, the transmission-mode reception unit 230 outputs a modulation scheme signal to the main-signal modulation units 13t-1 and 13t-2 of the signal transmission unit 110b, outputs an error correction code designation signal to the error-correction encoding unit 12t, and outputs a baud rate control signal to the clock control unit 17t and performs setting of a transmission mode (step STb2). The signal transmission unit 110b of the optical transmission device 1b transmits a main signal (step STb3).

The transmission-mode reception unit 230 of the optical reception device 2b receives the transmission mode designation signal transmitted by the transmission-mode selection unit 60 of the control device 6 (step SRb1). A slight time difference may be present between timing of the reception of the transmission mode designation signal in step STB1 by the optical transmission device 1b and timing of the reception of the transmission mode designation signal in step SRb1 because of a difference between the distance between the control device 6 and the optical transmission device 1b and the distance between the control device 6 and the optical reception device 2b.

The transmission-mode reception unit 230 of the optical reception device 2b also reads transmission mode information corresponding to a transmission mode number included in the received transmission mode designation signal from the reception-side transmission mode information table 2001r of the transmission-mode-information storage unit 200b. Based on the read-out transmission mode information, the transmission-mode reception unit 230 outputs a modulation scheme signal to the main-signal demodulation units 24r-1 and 24r-2 of the signal reception unit 220b, outputs an error correction code designation signal to the error-correction decoding unit 25r, and outputs a baud rate control signal to the clock control unit 27r and performs setting of a transmission mode (step SRb2).

The signal reception unit 220b of the optical reception device 2b receives a main signal transmitted by the optical transmission line 3. The signal-quality detection unit 204b of the optical reception device 2b detects signal quality of the main signal (step SRb3). It is assumed that the signal-quality detection unit 204b detects a BER as information indicating the signal quality. The signal-quality detection unit 204b transmits the detected information indicating the signal quality to the signal-quality determination unit 205r of the control device 6 (step SRb4).

The signal-quality determination unit 205r of the control device 6 receives the information indicating the signal quality from the signal-quality detection unit 204b (step SCb4). The signal-quality determination unit 205r determines, based on the information indicating the signal quality and a predetermined threshold, whether the signal quality is permissible quality (step SCb5).

When a value of the BER detected by the signal-quality detection unit 204b is smaller than the threshold, the signal-quality determination unit 205r determines that the signal quality is the permissible quality (step SCb5: Yes). When determining that the signal quality is the permissible quality, the signal-quality determination unit 205r outputs a notification signal of a signal quality permission notification to the transmission-mode selection unit 60. The transmission-mode selection unit 60 determines, as transmission mode information used in operation, transmission mode information selected at that point in time and ends the processing.

On the other hand, when the value of the BER detected by the signal-quality detection unit 204b is equal to or larger than the threshold, the signal-quality determination unit 205r determines that the signal quality is non-permissible quality (step SCb5: No). When determining that the signal quality is the non-permissible quality, the signal-quality determination unit 205r outputs a notification signal of a signal quality non-permission notification to the transmission-mode selection unit 60. When receiving the notification signal of the signal quality non-permission notification from the signal-quality determination unit 205r, the transmission-mode selection unit 60 performs processing in step SCb2 and subsequent steps. In step SCb2, the transmission-mode selection unit 60 selects, out of the common transmission mode information, a transmission mode number of transmission mode information having second highest priority following transmission mode information selected at that point in time. In step SCb3, the transmission-mode selection unit 60 generates a transmission mode designation signal including the selected transmission mode number and transmits the transmission mode designation signal to the optical transmission device 1b and the optical reception device 2b.

With the configuration in the second embodiment, a transmission-mode selection unit 60c of the control device 6 of the optical transmission system Sb selects transmission mode information in descending order of priority out of transmission mode information, which is combinations of a plurality of parameters concerning transmission performance and is a plurality of kinds of transmission mode information common to transmission performance of the optical transmission device 1b and the optical reception device 2b. The signal transmission unit 110b of the optical transmission device 1b transmits, via the optical transmission line 3b, a signal modulated based on the transmission mode information selected by the transmission-mode selection unit 60. The signal reception unit 220b of the optical reception device 2b receives the signal transmitted by the optical transmission line 3b and demodulates the received signal based on the transmission mode information selected by the transmission-mode selection unit 60. The signal-quality detection unit 204b of the optical reception device 2b detects signal quality of the signal received by the signal reception unit 220b. The signal-quality determination unit 205r of the control device 6 determines, based on the information indicating the signal quality detected by the signal-quality detection unit 204b, whether the signal quality of the signal is permissible. When the signal-quality determination unit 205r determines that the signal quality of the signal is non-permissible, the transmission-mode selection unit 60 selects transmission mode information having second highest priority.

Consequently, the control device 6 can select transmission mode information having high priority and good signal quality out of a plurality of kinds of transmission mode information common to the optical transmission device 1b and the optical reception device 2b. The control device 6 can cause the optical transmission device 1b and the optical reception device 2b to perform operation by a transmission mode indicated by the selected transmission mode information. That is, the optical transmission system Sb makes it possible to select an optimum transmission mode out of transmission modes decided by combinations of various parameters concerning a plurality of kinds of transmission performance.

In other words, in the configuration in the second embodiment, the control device 6 makes it possible to establish a link in an optimum transmission mode by selecting, out of the plurality of transmission modes common to the optical transmission device 1b and the optical reception device 2b, a transmission mode including a modulation scheme having a higher multi-value degree and a higher baud rate, and a transmission mode having an error correction code type matching between transmission and reception.

In the configuration in the second embodiment, the control device 6 selects transmission mode information and transmits a transmission mode designation signal including a transmission mode number of the selected transmission mode information to the optical transmission device 1b and the optical reception device 2. Accordingly, even in a state in which a modulation scheme on the optical transmission device 1b side cannot be recognized on the optical reception device 2b side, it is possible to perform the processing shown in FIG. 20 without performing preprocessing for, for example, determining modulation schemes on the transmission side and the reception side in advance.

Third Embodiment

Figure 21:
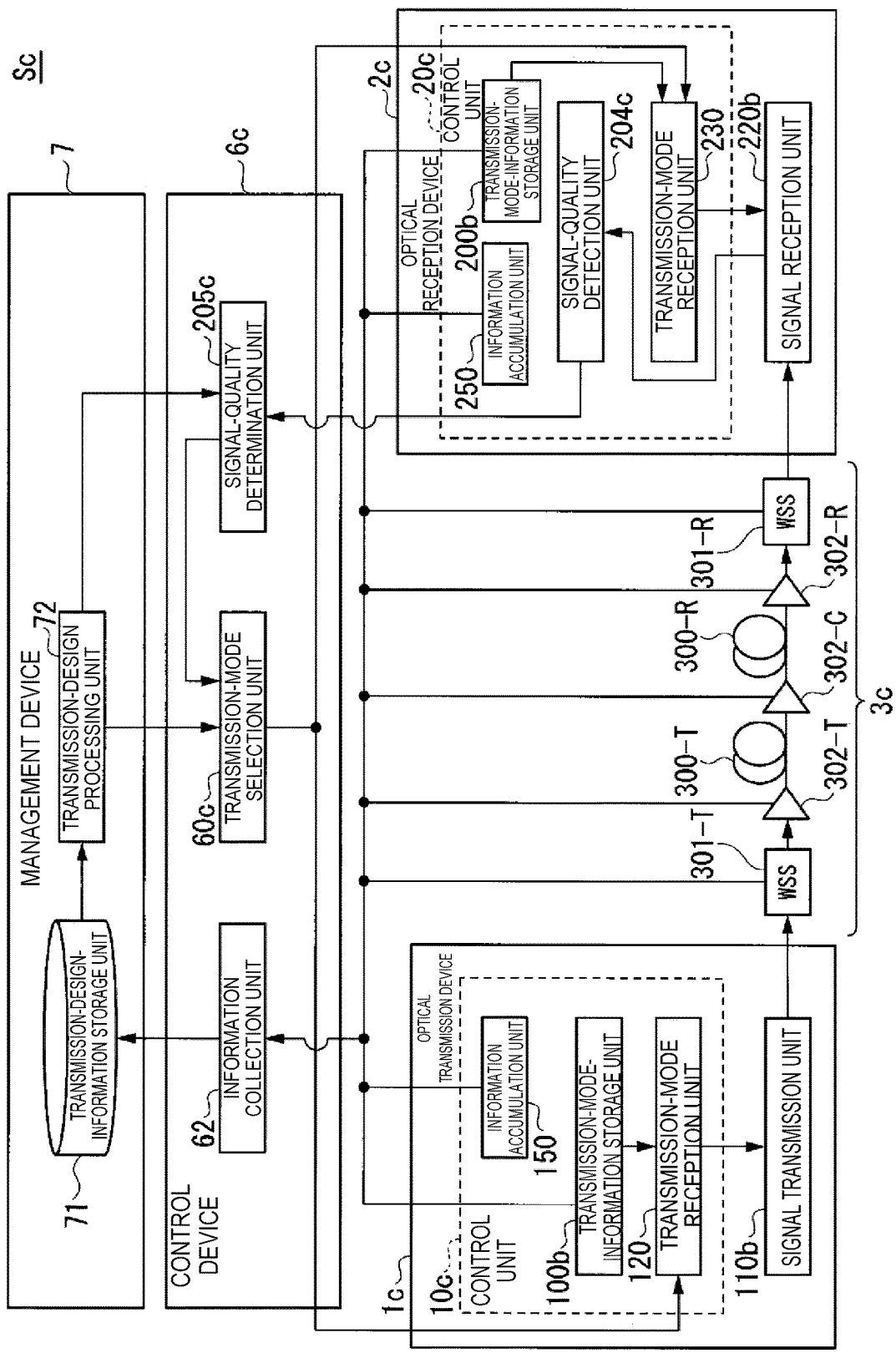
FIG. 21 is a block diagram showing a configuration of an optical transmission system in a third embodiment.

FIG. 21 is a block diagram showing the configuration of an optical transmission system Sc in a third embodiment. In the third embodiment, the same components as the components in the first and second embodiments are denoted by the same reference numerals and signs. Components different from the components in the first and second embodiments are explained below. The optical transmission system Sc includes an optical transmission device 1c, an optical reception device 2c, an optical transmission line 3c, a control device 6c, and a management device (management apparatus) 7. The management device 7 and the control device 6c are connected, the control device 6c and the optical transmission device 1c are connected, and the control device 6c and the optical reception device 2c are connected by a communication line such as a leased line or the Internet.

The optical transmission device 1c includes the signal transmission unit 110b and a control unit 10c. The control unit 10c includes the transmission-mode reception unit 120, the transmission-mode-information storage unit 100b, and an information accumulation unit 150. The information accumulation unit 150 includes a nonvolatile storage region on the inside. The information accumulation unit 150 may sequentially write and accumulate, in the storage region on the inside, information concerning the optical transmission device 1c, for example, information concerning physical characteristic parameters obtained in time series such as a transmission light level, a reception light level, a center frequency, a wavelength shift of an optical signal transmitted and received by an optical interface of the optical transmission device 1c or may monitor the information concerning the physical characteristic parameters when necessary.

The optical reception device 2c includes the signal reception unit 220b and a control unit 20c. The control unit 20c includes the transmission-mode reception unit 230, the transmission-mode-information storage unit 200b, a signal-quality detection unit 204c, and an information accumulation unit 250. The information accumulation unit 250 includes a nonvolatile storage region on the inside. The information accumulation unit 250 sequentially writes and accumulates, in the storage region on the inside, information concerning the optical reception device 2c, for example, information concerning histories of physical characteristic parameters obtained in time series such as a transmission light level, a reception light level, a center frequency, and a wavelength shift of an optical signal transmitted and received by an optical interface of the optical reception device 2c.

The signal-quality detection unit 204c detects, as information indicating signal quality, an OSNR detected from control information using a pilot tone signal. The signal-quality detection unit 204c outputs the detected information indicating the signal quality to a signal-quality determination unit 205c of the control device 6c.

Like the signal-quality detection unit 204r, the signal-quality detection unit 204c may use, as a signal quality detection method, information obtained from a measurement device such as an OTDR, an optical spectrum analyzer, or a power meter.

The optical transmission line 3c includes optical fibers 300-T and 300-R, WSSs (Wavelength Selecting Switches) 301-T and 301-R, and optical amplifiers 302-T, 302-C, and 302-R. The optical transmission line 3c transmits signal light sent by the optical transmission device 1c to the optical reception device 2c.

The WSSs 301-T and 301-R are wavelength selection switches. The WSSs 031-T and 301-R may sequentially write and accumulate, in nonvolatile storage regions on the insides, information concerning physical characteristic parameters obtained in time series such as a center frequency, a filter band width, a filter order, an insertion loss, and a polarization dependent loss (hereinafter referred to as PDL as well) of the signal light on which wavelength selection is performed or may monitor the information concerning the physical characteristic parameters when necessary.

The optical amplifiers 302-T, 302-C, and 302-R are amplifiers that amplify signal light. The optical amplifiers 302-T, 302-C, and 302-R may sequentially write and accumulate, in nonvolatile storage regions on the insides, information concerning physical characteristic parameters obtained in time series such as an input power level, an output power level, a gain, and a noise figure (hereinafter referred to "NF" as well) of the signal light being amplified or may monitor the information concerning the physical characteristic parameters when necessary.

Like the control device 6, the control device 6c is a device including an SDN controller and an operating system of the conventional type. The control device 6c includes an information collection unit 62, a transmission-mode selection unit 60c, and a signal-quality determination unit 205c. The information collection unit 62 is connected to the transmission-mode-information storage unit 100b and the information accumulation unit 150 of the optical transmission device 1c, the WSSs 301-T and 301-R, the optical amplifiers 302-T, 302-C, and 302-R, and the transmission-mode-information storage unit 200b and the information accumulation unit 250 of the optical reception device 2c via the communication line.

The information collection unit 62 reads the information concerning the physical characteristic parameters from the storage region on the inside of the information accumulation unit 150 of the optical transmission device 1c, the storage region on the inside of the information accumulation unit 250 of the optical reception device 2c, the storage regions on the insides of the WSSs 301-T and 301-R, and the storage regions on the insides of the optical amplifiers 302-T, 302-C, and 302-R and writes the read-out physical characteristic parameters in a transmission-design-information storage unit (transmission-design-information storage) 71 of the management device 7 and causes the transmission-design-information storage unit 71 to store the physical characteristic parameters.

The information collection unit 62 is capable of also reading information concerning physical characteristic parameters concerning an optical transmission line obtained in digital signal processing and writing the read-out physical characteristic parameters in the transmission-design-information storage unit 71 of the management device 7 and causing the transmission-design-information storage unit 71 to store the physical characteristic parameters. The physical characteristic parameters concerning the optical transmission line obtained in the digital signal processing include wavelength dispersion, polarization mode dispersion, a polarization dependent loss, and a nonlinear coefficient. It is possible to perform, using these physical characteristic parameters, transmission design for an optical path set in an optical transmission line connecting certain bases.

The information collection unit 62 reads, from the transmission-mode-information storage unit 100b of the optical transmission device 1c and the transmission-mode-information storage unit 200b of the optical reception device 2c, the information of the transmission-side transmission mode information table 1001t and the information of the reception-side transmission mode information table 2001r respectively stored by the transmission-mode-information storage unit 100b and the transmission-mode-information storage unit 200b. The information collection unit 62 writes the read-out information of the transmission-side transmission mode information table 1001t and the read-out information of the reception-side transmission mode information table 2001r in the transmission-design-information storage unit 71 of the management device 7 and causes the transmission-design-information storage unit 71 to store the information.

The transmission-mode selection unit 60c selects a transmission mode number having the highest priority out of a transmission mode candidate list including a plurality of kinds of transmission mode information given from the management device 7. As in the first and second embodiments, the priority is determined in advance. For example, a transmission mode number corresponding to transmission mode information including a modulation scheme having a higher multi-value degree and a higher baud rate has higher priority.

The transmission-mode selection unit 60c includes a storage region on the inside and writes the selected transmission mode number in the storage region on the inside and causes the storage region to store the transmission mode number. The transmission-mode selection unit 60c generates a transmission mode designation signal including the selected transmission mode number and transmits the generated transmission mode designation signal to the optical transmission device 1c and the optical reception device 2c. When receiving a notification signal from the signal-quality determination unit 205c, when a notification included in the notification signal is a signal quality non-permission notification, the transmission-mode selection unit 60c refers to the storage region on the inside and selects, out of the transmission mode candidate list, a transmission mode number of transmission mode information having second highest priority following transmission mode information selected at that point in time.

The signal-quality determination unit 205c receives a value of an OSNR transmitted by the management device 7 and sets the received value of the OSNR as a threshold. The signal-quality determination unit 205c determines, based on the threshold and the information indicating the signal quality received from the signal-quality detection unit 204c, whether the signal quality is permissible quality.

When determining that the signal quality is the permissible quality, the signal-quality determination unit 205c outputs a notification signal of a signal quality permission notification to the transmission-mode selection unit 60c. When determining that the signal quality is non-permissible quality, the signal-quality determination unit 205c outputs a notification signal of a signal quality non-permission notification to the transmission-mode selection unit 60c.

The management device 7 includes a transmission-design-information storage unit 71 and a transmission-design processing unit (transmission-design processor) 72. The transmission-design-information storage unit 71 stores the physical characteristic parameters of the optical transmission device 1c, the optical reception device 2c, the WSSs 301-T and 301-R, and the optical amplifiers 302-T, 302-C, and 302-R, the information of the transmission-side transmission mode information table 1001t, and the information of the reception-side transmission mode information table 2001r written by the information collection unit 62 as explained above.

The transmission-design processing unit 72 performs, based on the physical characteristic parameters, the information of the transmission-side transmission mode information table 1001t, and the information of the reception-side transmission mode information table 2001r stored by the transmission-design-information storage unit 71, transmission design processing of an entire network based on a level diagram between the optical transmission device 1c and the optical reception device 2c.

As a result of the transmission design processing, the transmission-design processing unit 72 calculates transmission quality between the optical transmission device 1c and the optical reception device 2c and selects, based on the calculated transmission quality, a plurality of kinds of transmission mode information as candidates. The transmission-design processing unit 72 generates a transmission mode candidate list including the selected plurality of kinds of transmission mode information and outputs the generated transmission mode candidate list to the transmission-mode selection unit 60c of the control device 6c. As a result of the transmission design processing, when the optical reception device 2c receives signal light transmitted by the optical transmission device 1c, the transmission-design processing unit 72 calculates an OSNR permissible as signal quality. The transmission-design processing unit 72 transmits a value of the calculated OSNR to the signal-quality determination unit 205c.

(Processing by Management Device in Third Embodiment)

Figure 22:
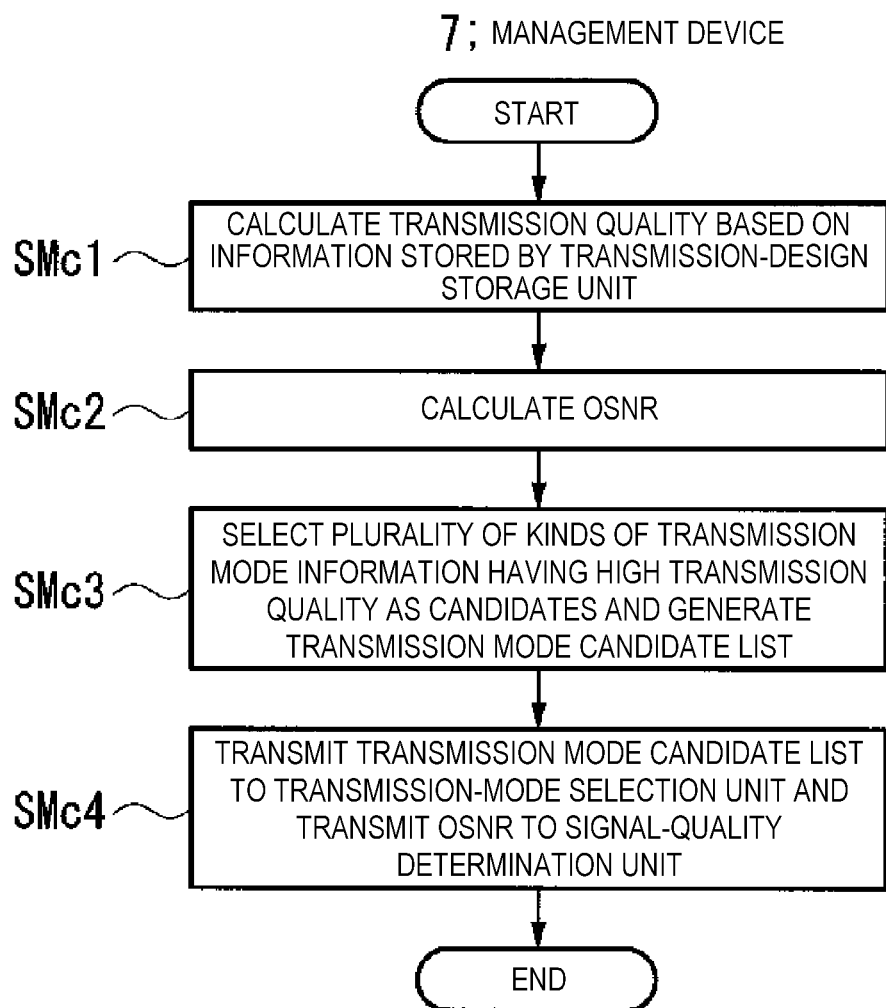
FIG. 22 is a flowchart showing a flow of processing of a management device in the third embodiment.

FIG. 22 is a flowchart showing a flow of processing by the management device 7 in the third embodiment. It is assumed that, before the flowchart shown in FIG. 22 is performed, the information concerning the physical quantity parameters of the WSSs 301-T an 301-R, the optical amplifiers 302-T, 302-C, and 302-R, the optical transmission device 1c, and the optical reception device 2c are already written in the transmission-design-information storage unit 71 by the information collection unit 62 of the control device 6c. It is also assumed that the information of the transmission-side transmission mode information table 1001t and the information of the reception-side transmission mode information table 2001r are written in the transmission-design-information storage unit 71 by the information collection unit 62 of the control device 6c.

The transmission-design processing unit 72 of the management device 7 extracts common transmission mode information from the information of the transmission-side transmission mode information table 1001t and the information of the reception-side transmission mode information table 2001r stored by the transmission-design-information storage unit 71. The transmission-design processing unit 72 performs, for each of the extracted transmission mode information, transmission design processing based on the physical characteristic parameters stored by the transmission-design-information storage unit 71 and calculates transmission quality for each of the transmission mode information (step SMc1).

When performing the transmission design processing based on the physical characteristic parameters stored by the transmission-design-information storage unit 71, the transmission-design processing unit 72 calculates an OSNR at the time when the optical reception device 2c receives signal light transmitted by the optical transmission device 1c (step SMc2).

The transmission-design processing unit 72 selects, based on the calculated transmission quality, for example, a plurality of kinds of transmission mode information, the number of which is determined in advance, as candidates in descending order of the transmission quality and generates a transmission mode candidate list including the selected transmission mode information (step SMc3).

The transmission-design processing unit 72 transmits the generated transmission mode candidate list to the transmission-mode selection unit 60c of the control device 6c and transmits a value of the calculated OSNR to the signal-quality determination unit 205c (step SMc4).

(Transmission Mode Selection Processing in Third Embodiment)

Figure 23:
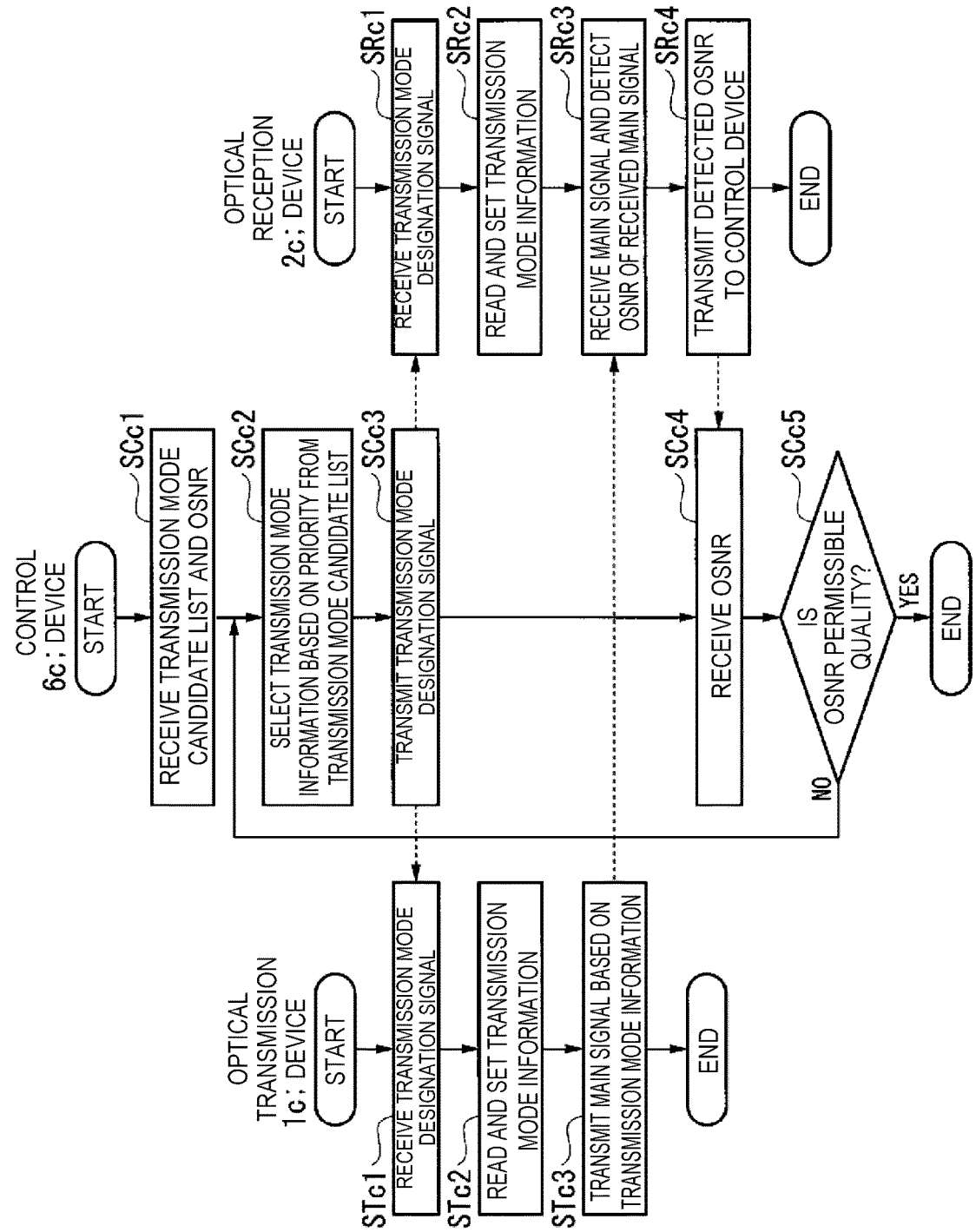
FIG. 23 is a flowchart showing a flow of transmission mode selection processing in the third embodiment.

FIG. 23 is a flowchart showing a flow of transmission mode selection processing by the optical transmission system Sc in the third embodiment. Broken line arrows indicate transmission and reception of information among the optical transmission device 1c, the control device 6c, and the optical reception device 2c.

In processing in step SMc4 in FIG. 22, the transmission-design processing unit 72 of the management device 7 transmits the generated transmission mode candidate list to the transmission-mode selection unit 60c of the control device 6c and transmits a value of the calculated OSNR to the signal-quality determination unit 205c. The transmission-mode selection unit 60c of the control device 6c receives the transmission mode candidate list. The signal-quality determination unit 205c of the control device 6c receives the value of the OSNR (step SCc1).

The transmission-mode selection unit 60c selects a transmission mode number of transmission mode information having the highest priority out of the transmission mode candidate list and writes the selected transmission mode number in the storage region on the inside and causes the storage region to store the transmission mode number (step SCc2).

The transmission-mode selection unit 60c generates a transmission mode designation signal including the selected transmission mode number and outputs the generated transmission mode designation signal to the optical transmission device 1c and the optical reception device 2c (step SCc3).

In steps STc1 to STc3 in the optical transmission device 1c, the same processing as the processing in steps STb1 to STb3 in the optical transmission device 1b in the second embodiment shown in FIG. 20 is performed. In steps SRc1 to SRc2 in the optical reception device 2c, the same processing as the processing in steps SRb1 to SRb2 in the optical reception device 2b in the second embodiment shown in FIG. 20 is performed.

The signal reception unit 220b of the optical reception device 2c receives a main signal transmitted by the optical transmission line 3c. The signal-quality detection unit 204c of the optical reception device 2c detects an OSNR of the main signal (step SRb3). The signal-quality detection unit 204c transmits a value of the detected OSNR to the signal-quality determination unit 205c of the control device 6c (step SRc4).

The signal-quality determination unit 205c of the control device 6c receives the value of the OSNR from the signal-quality detection unit 204c (step SCc4). The signal-quality determination unit 205c sets, as a threshold, the value of the OSNR received from the transmission-design processing unit 72 of the management device 7 in step SCc1 and determines, based on the threshold and the value of the OSNR received from the signal-quality detection unit 204c, whether the signal quality is permissible quality (step SCb5).

For example, when the value of the OSNR detected by the signal-quality detection unit 204c is equal to or larger than the threshold, the signal-quality determination unit 205c determines that the signal quality is permissible quality (step SCc5: Yes). When determining that the signal quality is the permissible quality, the signal-quality determination unit 205c outputs a notification signal of a signal quality permission notification to the transmission-mode selection unit 60c. The transmission-mode selection unit 60c determines, as transmission mode information used in operation, transmission mode information selected at that point in time and ends the processing.

On the other hand, when the value of the OSNR is smaller than the threshold, the signal-quality determination unit 205c determines that the signal quality is non-permissible quality (step SCc5: No). When determining that the signal quality is the non-permissible quality, the signal-quality determination unit 205c outputs a notification signal of a signal quality non-permission notification to the transmission-mode selection unit 60c. When receiving the notification signal of the signal quality non-permission notification from the signal-quality determination unit 205c, the transmission-mode selection unit 60c performs processing in step SCc2 and subsequent steps. In step SCc2, the transmission-mode selection unit 60c selects, out of the transmission mode candidate list, a transmission mode number of transmission mode information having second highest priority following transmission mode information selected at that point in time. In step SCc3, the transmission-mode selection unit 60c generates a transmission mode designation signal including the selected transmission mode number and transmits the transmission mode designation signal to the optical transmission device 1c and the optical reception device 2c.

With the configuration of the third embodiment explained above, in the management device 7 of the optical transmission system Sc, the transmission-design processing unit 72 calculates, for each of a plurality of kinds of transmission mode information common to transmission performance of the optical transmission device 1c and the optical reception device 2c, transmission quality based on the physical characteristic parameters stored by the transmission-design-information storage unit 71. The transmission-design processing unit 72 generates a transmission mode candidate list including a plurality of kinds of transmission mode information selected based on the calculated transmission quality and transmits the generated transmission mode candidate list to the transmission-mode selection unit 60c of the control device 6c. Consequently, the transmission-mode selection unit 60c in the third embodiment is capable of selecting a transmission mode that has high transmission quality calculated by the transmission design based on the physical characteristic parameters of the various modules included in the optical transmission line 3c, the optical transmission device 1c, and the optical reception device 2c and that is an optimum transmission mode having high priority and a large value of an OSNR.

Fourth Embodiment

Figure 24:
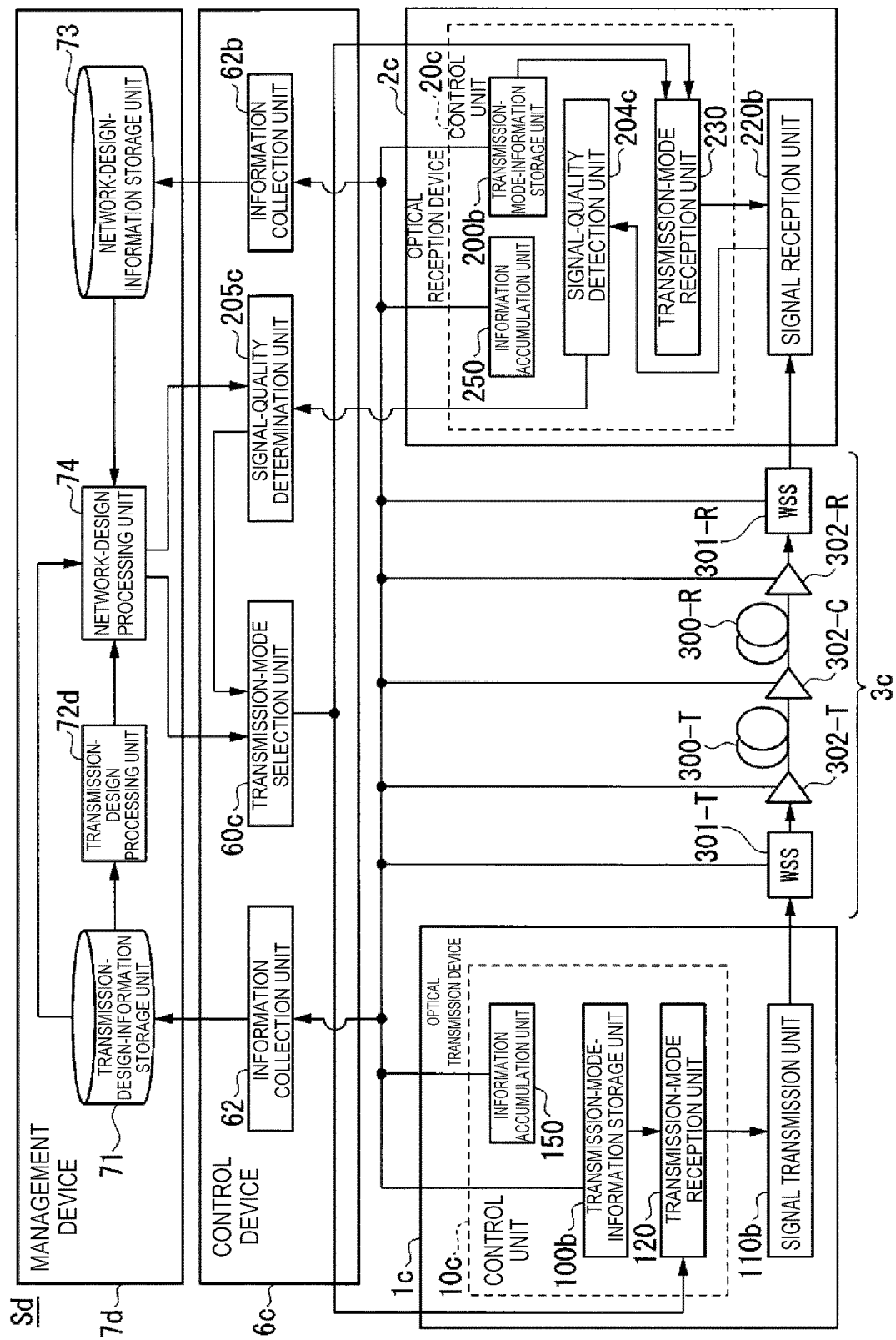
FIG. 24 is a block diagram showing a configuration of an optical transmission system in a fourth embodiment.

FIG. 24 is a block diagram showing a configuration of an optical transmission system Sd in a fourth embodiment. In the fourth embodiment, the same components as the components in the first to third embodiments are denoted by the same reference numerals and signs. Components different from the components in the first to third embodiments are explained below. The optical transmission system Sd includes the optical transmission device 1c, the optical reception device 2c, the optical transmission line 3c, the control device 6c, and a management device 7d. The management device 7d and the control device 6c are connected, the control device 6c and the optical transmission device 1c are connected, and the control device 6c and the optical reception device 2c are connected by a communication line such as a leased line or the Internet.

The management device 7d includes the transmission-design-information storage unit 71, a transmission-design processing unit 72d, a network-design processing unit 74, and a network-design-information storage unit (network-design-information storage) 73.

Like the transmission-design processing unit 72, the transmission-design processing unit 72d performs transmission design processing and generates a transmission mode candidate list. The transmission-design processing unit 72d outputs the generated transmission mode candidate list to the network-design processing unit 74. Like the transmission-design processing unit 72, when receiving signal light transmitted by the optical transmission device 1c, the transmission-design processing unit 72d calculates an OSNR permissible as signal quality. The transmission-design processing unit 72d transmits a value of the calculated OSNR to the network-design processing unit 74. The network-design-information storage unit 73 stores topology information, node information, path information, and the like of the optical transmission line 3 in advance. Information such as topology information, node information, and path information of a network of the optical transmission line 3 may be collected using an information collection unit 62b of the control device 6c. Consequently, it is possible to always collect network information including optical frequency use efficiency at that point in time.

The network-design processing unit 74 captures the transmission mode candidate list and the value of the OSNR output by the transmission-design processing unit 72. The network-design processing unit 74 performs, for each of transmission mode information included in the transmission mode candidate list, using the information stored by the network-design-information storage unit 73, accommodation design processing for calculating an optical path for improving optical frequency use efficiency. The optical frequency use efficiency means efficiently using limited optical frequency resources and represents, for example, a ratio of a frequency allocated to a certain signal. The network-design processing unit 74 adds, for example, based on the optical frequency use efficient of each of the transmission mode information obtained as a result of the accommodation design processing, information indicating priority for each of the transmission mode information included in the transmission mode candidate list. The network-design processing unit 74 outputs the transmission mode candidate list added with the information indicating the priority to the transmission-mode selection unit 60c.

The network-design processing unit 74 outputs the value of the OSNR output by the transmission-design processing unit 72 to the signal-quality determination unit 205c.

(Processing by Management Device in Fourth Embodiment)

Figure 25:
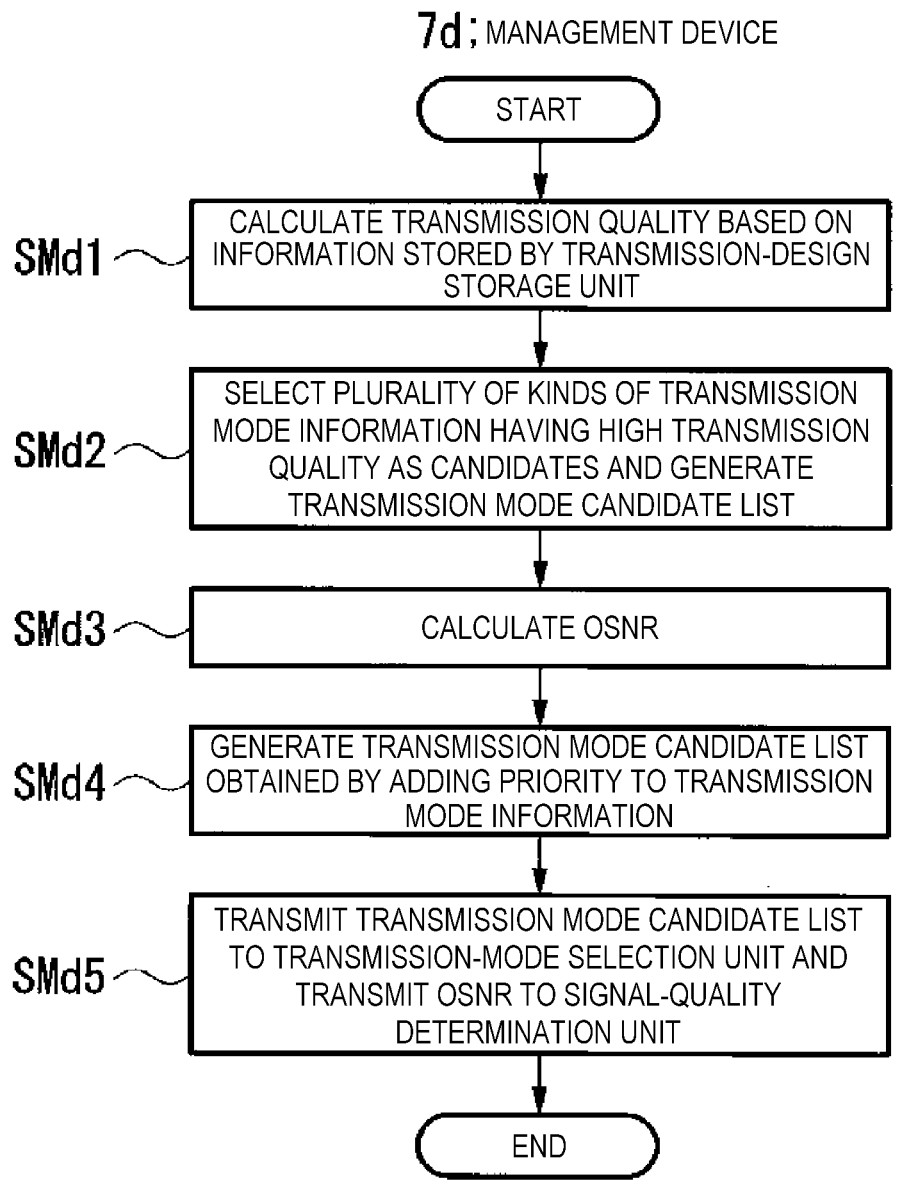
FIG. 25 is a flowchart showing a flow of processing of a management device in the fourth embodiment.

FIG. 25 is a flowchart showing a flow of processing by the management device 7d in the fourth embodiment. Before the flowchart shown in FIG. 25 is performed, the information concerning the physical characteristic parameters of the WSSs 301-T and 301-R, the optical amplifiers 302-T, 302-C, and 302-R, the optical transmission device 1c, and the optical reception device 2c are already written in the transmission-design-information storage unit 71 by the information collection unit 62 of the control device 6c. The information of the transmission-side transmission mode information table 1001t and the information of the reception-side transmission mode information table 2001r are written in the transmission-design-information storage unit 71 by the information collection unit 62 of the control device 6c.

The transmission-design processing unit 72d of the management device 7d extracts common transmission mode information from the information of the transmission-side transmission mode information table 1001t and the information of the reception-side transmission mode information table 2001r. The transmission-design processing unit 72d performs transmission design processing based on the physical characteristic parameters stored by the transmission-design-information storage unit 71 and calculates transmission quality for each of the extracted transmission mode information (step SMd1).

The transmission-design processing unit 72d selects, based on the calculated transmission quality, as candidates, a plurality of kinds of transmission mode information, the number of which is determined in advance, in descending order of the transmission quality, generates a transmission mode candidate list including the selected transmission mode information, and outputs the generated transmission mode candidate list to the network-design processing unit 74 (step SMd2).

When performing the transmission design processing based on the physical characteristic parameters stored by the transmission-design-information storage unit 71, the transmission-design processing unit 72d calculates an OSNR at the time when the optical reception device 2c receives signal light transmitted by the optical transmission device 1c (step SMd3). The transmission-design processing unit 72d outputs a value of the calculated OSNR to the network-design processing unit 74.

The network-design processing unit 74 captures the transmission mode candidate list and the value of the OSNR output by the transmission-design processing unit 72d. The network-design processing unit 74 performs, for each of the transmission mode information included in the captured transmission mode candidate list, using the information stored by the network-design-information storage unit 73, accommodation design processing for calculating an optical path for improving the optical frequency use efficiency. The network-design processing unit 74 adds, based on the optical frequency use efficiency for each of the transmission mode information obtained as a result of the accommodation design processing, information indicating priority to the transmission mode information such that the priority is higher in descending order of the optical frequency use efficiency (step SMd4).

The network-design processing unit 74 outputs the generated transmission mode candidate list to the transmission-mode selection unit 60c. The network-design processing unit 74 outputs the OSNR calculated by the transmission-design processing unit 72 to the signal-quality determination unit 205c (step SMd5).

As the transmission mode selection processing in the fourth embodiment, the same processing as the processing shown in FIG. 23 is performed except that the processing in step SCc2 of the control device 6c in the transmission mode selection processing in the third embodiment shown in FIG. 23 is replaced with processing explained below. That is, in the fourth embodiment, the information indicating the priority is added to the transmission mode information included in the transmission mode candidate list. Accordingly, in processing in first step SCc2, the transmission-mode selection unit 60c selects, according to the information indicating the priority added to the transmission mode information included in the transmission mode candidate list, a transmission mode number corresponding to transmission mode information having the highest priority. The transmission-mode selection unit 60c writes the selected transmission mode number in the storage region on the inside and causes the storage region to store the transmission mode number. In processing in second and subsequent step SCc2, the transmission-mode selection unit 60c selects, in the transmission mode candidate list, a transmission mode number having second highest priority following the transmission mode number stored in the storage region on the inside and writes the selected transmission mode number in the storage region on the inside and causes the storage region to store the transmission mode number.

With the configuration of the fourth embodiment, in the management device 7d of the optical transmission system Sd, the network-design processing unit 74 calculates, for each of the transmission mode information included in the transmission mode candidate list generated by the transmission-design processing unit 72d, information indicating priority based on the information stored by the network-design-information storage unit 73. The transmission-mode selection unit 60c of the control device 6c selects transmission mode information in descending order of the priority according to the information indicating the priority calculated by the network-design processing unit 74.

Fifth Embodiment

Figure 26:
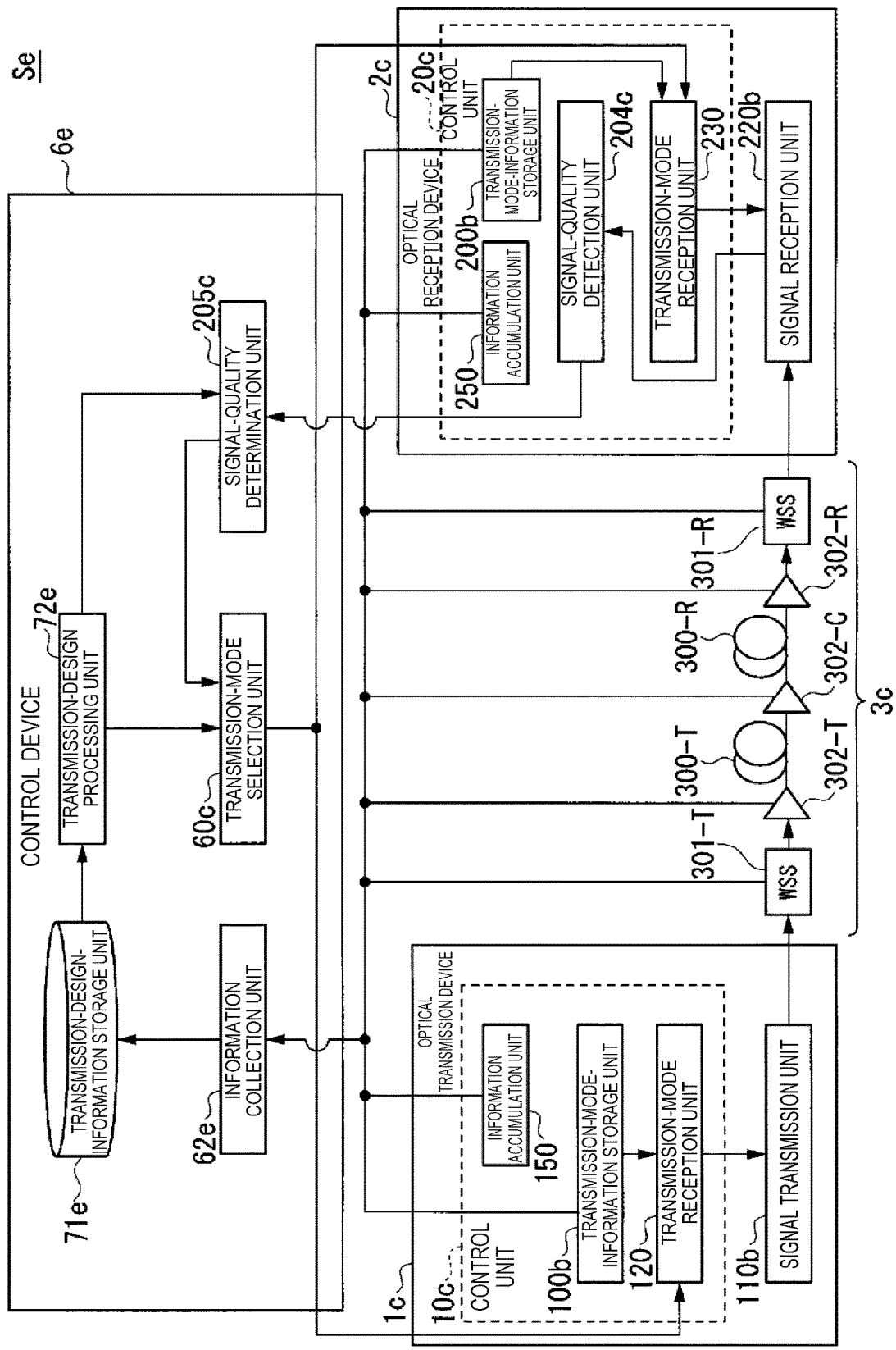
FIG. 26 is a block diagram showing a configuration of an optical transmission system in a fifth embodiment.

FIG. 26 is a block diagram showing the configuration of an optical transmission system Se in a fifth embodiment. In the fifth embodiment, the same components as the components in the first to fourth embodiments are denoted by the same reference numerals and signs. Components different from the components in the first to fourth embodiments are explained below. The optical transmission system Se includes the optical transmission device 1c, the optical reception device 2c, the optical transmission line 3c, and a control device 6e. The control device 6e and the optical transmission device 1c are connected and the control device 6e and the optical reception device 2c are connected by a communication line such as a leased line or the Internet.

The fifth embodiment is different from the third embodiment in that the control device 6e includes an information collection unit 62e instead of the information collection unit 62 and further includes a transmission-design-information storage unit 71e and a transmission-design processing unit 72e and in that the optical transmission system Se does not include the management device 7.

The information collection unit 62e is connected to the transmission-mode-information storage unit 100b and the information accumulation unit 150 of the optical transmission device 1c, the WSSs 301-T and 301-R, the optical amplifiers 302-T, 302-C, and 302-R, and the transmission-mode-information storage unit 200b and the information accumulation unit 250 of the optical reception device 2c via the communication line.

The information collection unit 62e reads the information concerning the physical characteristic parameters from the storage region on the inside of the information accumulation unit 150 of the optical transmission device 1c, the storage region on the inside of the information accumulation unit 250 of the optical reception device 2c, the storage regions on the insides of the WSSs 301-T and 301-R, and the storage regions on the insides of the optical amplifiers 302-T, 302-C, and 302-R and writes the read-out physical characteristic parameters in the transmission-design-information storage unit 71e and causes the transmission-design-information storage unit 71e to store the physical characteristic parameters.

The information collection unit 62e is capable of also reading information concerning physical characteristic parameters concerning an optical transmission line obtained in digital signal processing and writing the read-out physical characteristic parameters in the transmission-design-information storage unit 71e and causing the transmission-design-information storage unit 71e to store the physical characteristic parameters. The physical characteristic parameters concerning the optical transmission line obtained in the digital signal processing include wavelength dispersion, polarization mode dispersion, a polarization dependent loss, and a nonlinear coefficient. It is possible to perform transmission design for an optical path set in an optical transmission line connecting certain bases using these physical characteristic parameters.

The information collection unit 62e reads, from the transmission-mode-information storage unit 100b of the optical transmission device 1c and the transmission-mode-information storage unit 200b of the optical reception device 2c, the information of the transmission-side transmission mode information table 1001t and the information of the reception-side transmission mode information table 2001r respectively stored by the transmission-mode-information storage unit 100b and the transmission-mode-information storage unit 200b. The information collection unit 62e writes the read-out information of the transmission-side transmission mode information table 1001t and the read-out information of the reception-side transmission mode information table 2001r in the transmission-design-information storage unit 71e and causes the transmission-design-information storage unit 71e to store the information.

The transmission-design-information storage unit 71e stores the physical characteristic parameters of the optical transmission device 1c, the optical reception device 2c, the WSSs 301-T and 301-R, and the optical amplifiers 302-T, 302-C, and 302-R, the information of the transmission-side transmission mode information table 1001t, and the information of the reception-side transmission mode information table 2001r written by the information collection unit 62e.

The transmission-design processing unit 72e performs, based on the physical characteristic parameters, the information of the transmission-side transmission mode information table 1001t, and the information of the reception-side transmission mode information table 2001r stored by the transmission-design-information storage unit 71e, transmission design processing of an entire network based on a level diagram between the optical transmission device 1c and the optical reception device 2c.

As a result of the transmission design processing, the transmission-design processing unit 72e calculates transmission quality between the optical transmission device 1c and the optical reception device 2c and selects, based on the calculated transmission quality, a plurality of kinds of transmission mode information as candidates. The transmission-design processing unit 72e generates a transmission mode candidate list including the selected plurality of kinds of transmission mode information and outputs the generated transmission mode candidate list to the transmission-mode selection unit 60c. As a result of the transmission design processing, when the optical reception device 2c receives signal light transmitted by the optical transmission device 1c, the transmission-design processing unit 72e calculates an OSNR permissible as signal quality. The transmission-design processing unit 72e outputs a value of the calculated OSNR to the signal-quality determination unit 205c.

As explained above, the control device 6e in the fifth embodiment includes the transmission-design-information storage unit 71e and the transmission-design processing unit 72e to thereby execute the processing shown in FIG. 22.

With the configuration in the fifth embodiment explained above, it is possible to perform transmission design even if a management device is not used. As a result, it is possible to improve operability, for example, facilitate application to data center interconnect for connecting data centers point-to-point.

Sixth Embodiment

Figure 27:
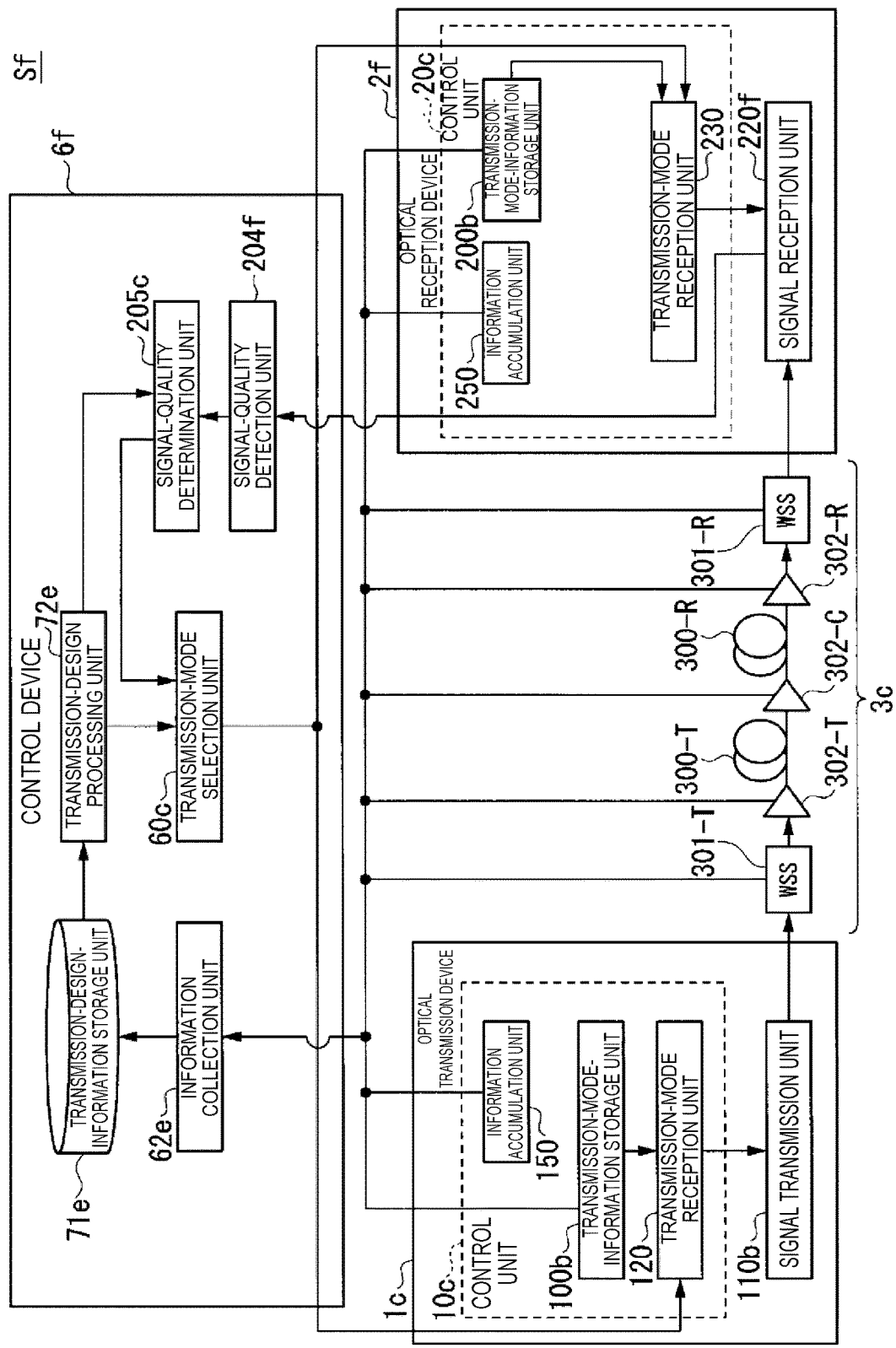
FIG. 27 is a block diagram showing a configuration of an optical transmission system in a sixth embodiment.

FIG. 27 is a block diagram showing a configuration of an optical transmission system Sf in a sixth embodiment. In the sixth embodiment, the same components as the components in the first to fifth embodiments are denoted by the same reference numerals and signs. Components different from the components in the first to fifth embodiments are explained below. The optical transmission system Sf includes the optical transmission device 1c, an optical reception device 2f, the optical transmission line 3c, and a control device 6f. The control device 6f and the optical transmission device 1c are connected and the control device 6f and the optical reception device 2f are connected by a communication line such as a leased line or the Internet.

The sixth embodiment is different from the fifth embodiment in that the control device 6e further includes a signal-quality detection unit 204f and in that the optical reception device 2f includes a signal reception unit 220f instead of the signal reception unit 220b and does not include the signal-quality detection unit 204c.

The signal reception unit 220f receives a main signal transmitted by the optical transmission line 3c. The signal reception unit 220f demodulates the received main signal based on transmission mode information selected by the transmission-mode selection unit 60c. The signal reception unit 220f outputs the demodulated main signal to the signal-quality detection unit 204f of the control device 6f.

The signal-quality detection unit 204f detects, using a pilot tone signal, an OSNR as information indicating signal quality from the main signal output from the signal reception unit 220f. The signal-quality detection unit 204f outputs the detected information indicating the signal quality to the signal-quality determination unit 205c.

Like the signal-quality detection unit 204r, the signal-quality detection unit 204f may use, as a signal quality detection method, information obtained from a measurement device such as an OTDR, an optical spectrum analyzer, or a power meter.

With the configuration in the sixth embodiment explained above, it is unnecessary to prepare a large number of signal-quality detection units for each optical reception device $2f$. One signal-quality detection unit only has to be prepared in the control device $6f$. Accordingly, it is possible to reduce cost in the entire system when the number of optical reception devices $2f$ increases. It is also possible to achieve improvement of functionality for, for example, transferring raw data as received in the signal reception unit $220f$ to the control device $6f$ and analyzing the raw data to a high degree with machine learning using a deep neural network.

As explained above, the modulation schemes increase and the baud rate becomes variable according to the improvement of the functions of the DSP for optical transmission. Therefore, an occupied frequency band is variously different depending on a transmission mode. Amid expansion of an optical transparent region with electric relay reduced by the development of the optical technology, topology of a network has been complicated from Point-to-Point to ring and mesh. The transmission-mode selection unit $60c$ in the fourth embodiment improves the optical frequency use efficiency and performs the accommodation design processing for achieving efficiency of frequency resources in the entire network in addition to the viewpoint of transmission design and then imparts priority to the transmission mode information and selects the transmission mode information in order from the transmission mode information that has high priority. Accordingly, it is possible to select a transmission mode having high transmission quality and that is an optimum transmission mode having high optical frequency use efficiency and a large value of an OSNR.

Note that, in the first to sixth embodiments explained above, the transmission mode information is the information obtained by combining the modulation scheme, the baud rate, and the error correction code type. However, the information may be any parameters if the parameters are parameters concerning transmission performance. For example, parameters such as the number of carriers may be included in the information.

When an error correction technique is developed anew, the new error correction technique may be added to the error correction code type of the transmission mode information as a parameter and may be made selectable.

In the configuration in the first embodiment explained above, only the transmission mode number is included in the transmission-side transmission mode candidate information and the reception-side transmission mode candidate information and transmitted. However, the configuration of the present invention is not limited to the embodiment. The transmission mode information itself may be included in the transmission-side transmission mode candidate information and the reception-side transmission mode candidate information.

In the second to sixth embodiments, the transmission-mode selection units $60$ and $60c$ include the transmission mode number in the transmission mode designation signal and transmit the transmission mode number. However, the transmission mode information may be included in the transmission mode designation signal and transmitted. Consequently, the optical transmission devices $1b$ and $1c$ do not need to include the transmission-mode-information storage unit $100b$. Similarly, the optical reception devices $2b$, $2c$, and $2f$ do not need to include the transmission-mode-information storage unit $200b$. Instead, in the third to sixth embodiments, the information of the transmission-side transmission mode information table $1001t$ stored by the transmission-mode-information storage unit $100b$ and the information of the reception-side transmission mode information table $2001r$ stored by the transmission-mode-information storage unit $200b$ are stored in the transmission-design-information storage unit $71$ in advance.

In the first embodiment explained above, the transmission-mode-information storage unit $100t$ is configured to store the transmission-side transmission mode information table $1001t$ in advance. However, the configuration of the present invention is not limited to the embodiment. For example, the control unit $10t$ may include a writing processing unit that receives operation by the user and writes information in the transmission-mode-information storage unit $100t$. The writing processing unit may receive operation by the user and writes the transmission-side transmission mode information table $1001t$ in the transmission-mode-information storage unit $100t$. Further, when ending the writing of the transmission-side transmission mode information table $1001t$, the writing processing unit may transmit a start instruction signal for causing the optical transmission system S to start the processing in step ST1 shown in FIG. 1 to the transmission-mode-candidate transmission unit $101t$ and cause the optical transmission system S to start the processing shown in FIG. 14.

In the first to sixth embodiments, the example is explained in which the OTN frame $40$ recommended by ITU-T G.709 shown in FIG. 3 is used. However, other frames including a reservation field may be applied.

In the first to fourth embodiments, the signal-quality detection unit $204r$ is included in the insides of the optical reception devices $2r$ and $2ra$ and the signal-quality detection units $204t$, $204b$, and $204c$ are included in the insides of the optical reception devices $2t$, $2b$, and $2c$. However, the signal-quality detection units $204r$, $204t$, $204b$, and $204c$ may be included in an external device such as a measurement device.

In the third and sixth embodiments, the OSNR is used for the determination of the signal quality. However, a BER may be used.

In the third and fourth embodiments, the transmission-design processing unit $72$ or the network-design processing unit $74$ calculates the OSNR serving as the threshold. However, the OSNR may not be calculated and a predetermined threshold may be given to the signal-quality determination unit $205c$.

In the third and fourth embodiments, an interface between the management devices $7$ and $7d$ and the control device $6c$, an interface between the control device $6c$ and the optical transmission device $1c$, an interface between the control device $6c$ and the optical reception device $2c$, and an interface between the control device $6c$ and the various modules of the optical transmission line $3c$, that is, the WSSs $301$-T and $301$-R and the optical amplifiers $302$-T, $302$-C, and $302$-R are based on the premise that an API (Application Programming Interface) is applied. However, the interfaces may be an interface of the conventional type such as TL-1 (Transaction Language 1).

In the configurations in the first to sixth embodiments, the signal-quality determination units $205r$ and $205c$ perform the determination processing using the threshold. The control-information detection unit $211r$ and the transmission-mode-candidate reception unit $201r$ also perform the determination processing using the threshold. In these kinds of determination processing, the determination processing for determining "whether a value exceeds the threshold", "whether a value is smaller than the threshold", "whether a value is equal to or larger than the threshold", and "whether a value is equal to or smaller than the threshold" is only an example. According to a type of information indicating signal quality set as a determination target and a method of deciding the threshold, the determination processing may be respectively replaced with determination processing for determining "whether a value is equal to or larger than the threshold", "whether a value is equal to or smaller than the threshold", "whether a value exceeds the threshold", and "whether a value is smaller than the threshold".

In the first to fourth embodiments, the signal-quality detection unit 204r, the signal-quality detection unit 204b, and the signal-quality detection unit 204c may detect, as signal quality, bit error information obtained from the error-correction decoding units 25r and 220b.

In the first and second embodiments, the transmission mode candidate information may be included in the control information.

In the first to sixth embodiments, when selecting a transmission mode number having the highest priority among the common transmission mode numbers, the transmission-mode selection unit 103t, the transmission-mode selection unit 203t, the transmission-mode selection unit 60, and the transmission-mode selection unit 60c select candidates such that a transmission capacity is maximized. However, the transmission-mode selection unit 103t, the transmission-mode selection unit 203t, the transmission-mode selection unit 60, and the transmission-mode selection unit 60c may select, as a transmission mode number having high priority, a number of a transmission mode in which power consumption decreases or a number of a transmission mode in which the optical frequency use efficiency is improved. When being configured in this way, first, the transmission-mode selection unit 103t, the transmission-mode selection unit 203t, the transmission-mode selection unit 60, and the transmission-mode selection unit 60c select transmission mode numbers of candidates of a transmission capacity requested during transmission and reception among the common transmission mode numbers. The transmission capacity requested during the transmission and reception may be set in advance. For example, if the transmission capacity requested during the transmission and reception is 200 G, transmission mode numbers of the transmission capacity 200 G are four transmission mode numbers: "mode 7", "mode 8", "mode 13", and "mode 14". The transmission-mode selection unit 103t, the transmission-mode selection unit 203t, the transmission-mode selection unit 60, and the transmission-mode selection unit 60c select a transmission mode in which power consumption decreases or a transmission mode in which the optical frequency use efficiency is improved among the selected candidates of the transmission capacity requested during the transmission and reception. The transmission mode in which power consumption decreases or the transmission mode in which the optical frequency use efficiency is improved may be set in advance according to any combination of a modulation scheme, a baud rate, and an error correction code type.

In the first to sixth embodiments, functional units including the name of "storage unit", that is, the transmission-mode-information storage units 100t, 100r, 200r, 200t, 100b, 200b, and 61, the transmission-design-information storage unit 71, and a network-design-information storage unit 73 are nonvolatile storage regions. Among the functional units included in the control-information modulation unit 18t and the control-information demodulation unit 210r in the first embodiment and the control units 10t, 10r, 20r, 20t, 10ta, 20ra, 10b, 20b, 10c, and 20c in the first to fourth embodiments, the functional units other than the functional units including the name of "storage unit" may be, for example, functional units configured by a program being executed by a processor such as a CPU (Central Processing Unit).

Therefore, the control-information modulation unit 18t and the control-information demodulation unit 210r in the embodiments explained above and the functional units including the name of "control unit", that is, the control units 10t, 10r, 20r, 20t, 10ta, 20ra, 10b, 20b, 10c, and 20c in the first to fourth embodiments may be realized by a computer. In that case, the control-information modulation unit 18t and the control-information demodulation unit 210r and the control units 10t, 10r, 20r, 20t, 10ta, 20ra, 10b, 20b, 10c, and 20c may be realized by recording a program for realizing the functions in a computer-readable recording medium, causing a computer system to read the program recorded in the recording medium, and executing the program. Note that the "computer system" includes an OS and hardware such as peripheral devices. The "computer-readable recording medium" means a portable medium such as a flexible disk, a magneto-optical disk, ROM, or CD-ROM or a storage device such as a hard disk incorporated in the computer system. Further, the "computer-readable recording medium" may include a medium that dynamically holds the program for a short time like a communication line in the case in which the program is transmitted via a network such as the Internet or a communication line such as a telephone line or a medium that holds the program for a fixed time like a volatile memory inside the computer system functioning as a server or a client in that case. The program may be a program for realizing a part of the functions explained above, may be a program that can realize the functions in a combination with a program already recorded in the computer system, or may be a program realized using a programmable logic device such as an FPGA (Field Programmable Gate Array).

The embodiments of the present invention are explained in detail above with reference to the drawings. However, specific configurations are not limited to the embodiments. Design and the like in a range not departing from the gist of the present invention are also included.

INDUSTRIAL APPLICABILITY

In a DSP including a variety of transmission modes according to improvement of functions, the present invention makes it possible to select optimum transmission modes including not only a modulation scheme but also various parameters such as a baud rate, an error correction code type, and the number of carriers.

REFERENCE SIGNS LIST 1t, 1r optical transmission device (optical transmission apparatus)
2r, 2t optical reception device (optical reception apparatus)
3 optical transmission line
4T, 4R multiplexing unit
9 communication line
T transmission-side system
R reception-side system
S optical transmission system
300 optical fiber

The invention claimed is:

1. A transceiver comprising:

a transmission-mode-candidate transmitter configured to transmit to transmission apparatus to be communicated with transmission mode candidate information including transmission mode information which is a combination of a plurality of parameters related to transmission performance of the transceiver;

a transmission-mode-candidate receiver configured to receive transmission mode candidate information including transmission mode information which is a combination of a plurality of parameters related to transmission performance of the transmission apparatus to be communicated with;

a transmission-mode selector configured to select transmission mode information in descending order of priority out of transmission mode information common to the transmission mode candidate information of the transceiver and the transmission mode candidate information of the transmission apparatus to be communicated with;

a signal transmitter configured to transmit, to the transmission apparatus to be communicated with, a signal modulated based on the selected transmission mode information;

a signal receiver configured to receive signal light transmitted from the transmission apparatus to be communicated with and demodulate the received signal light based on the transmission mode information selected by the transmission-mode selector;

a signal-quality detector configured to detect signal quality of the received signal light received by the signal receiver; and a signal-quality determiner configured to determine based on information indicating the signal quality detected by the signal-quality detector, whether the signal quality of the received signal light is permissible;

wherein the when the signal-quality determiner determines that the signal quality of the signal is non-permissible, the transmission-mode selector is configured to select the transmission mode information having second highest priority.

2. The transceiver according to claim 1, wherein the transmission mode candidate information is superimposed on a pilot tone signal which is a signal sequence in which electric power concentrates on one or more specific frequencies, and is transmitted and received.

* * * * *